United States Patent
Takeda et al.

(10) Patent No.: US 12,322,116 B2
(45) Date of Patent: Jun. 3, 2025

(54) VIDEO MAGNIFICATION USING ANISOTROPY MEASURE FOR NOISE REDUCTION

(71) Applicant: NIPPON TELEGRAPH AND TELEPHONE CORPORATION, Tokyo (JP)

(72) Inventors: Shoichiro Takeda, Musashino (JP); Kazuki Okami, Musashino (JP); Megumi Isogai, Musashino (JP); Hideaki Kimata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 401 days.

(21) Appl. No.: 17/614,200

(22) PCT Filed: May 31, 2019

(86) PCT No.: PCT/JP2019/021824
§ 371 (c)(1),
(2) Date: Nov. 24, 2021

(87) PCT Pub. No.: WO2020/240854
PCT Pub. Date: Dec. 3, 2020

(65) Prior Publication Data
US 2022/0237825 A1    Jul. 28, 2022

(51) Int. Cl.
*G06T 7/207* (2017.01)
*G06T 5/50* (2006.01)
(Continued)

(52) U.S. Cl.
CPC ............. *G06T 7/207* (2017.01); *G06T 5/50* (2013.01); *G06T 5/70* (2024.01); *G06T 7/90* (2017.01);
(Continued)

(58) Field of Classification Search
CPC .. G06T 7/207; G06T 7/20; G06T 5/50; G06T 5/70; G06T 5/00; G06T 2207/20182; G06T 2207/20016; G06T 2207/10024
See application file for complete search history.

(56) References Cited

U.S. PATENT DOCUMENTS 9,811,901 B2 * 11/2017 Wu .................. G06T 7/0012
2014/0276099 A1 * 9/2014 Kirenko ............ A61B 5/0077
                                                        600/476

OTHER PUBLICATIONS

Hao-Yuwu, Michael Rubinstein, Eugene Shih, John Guttag, Fredo Durand, William Freeman. "Eulerian Video Magnification for Revealing Subtle Changes in the World". SIGGRAPH. (2012).
(Continued)

*Primary Examiner* — Geoffrey E Summers
(74) *Attorney, Agent, or Firm* — Harness, Dickey & Pierce, P.L.C.

(57) ABSTRACT

An image processing apparatus includes a change detection unit configured to detect color or luminance change for each of different resolutions among changes in color or luminance in a color or luminance image, and a reliability estimation unit configured to estimate reliability of the detected color or luminance change based on temporal color or luminance change in the color or luminance image. The reliability estimation unit estimates the reliability based on a diffusion result of the temporal color or luminance change in the color or luminance image. The reliability has a greater value when the diffusion result shows anisotropy.

3 Claims, 31 Drawing Sheets

(51) Int. Cl.
*G06T 5/70* (2024.01)
*G06T 7/90* (2017.01)
(52) U.S. Cl.
CPC .......... *G06T 2207/10024* (2013.01); *G06T 2207/20016* (2013.01); *G06T 2207/20182* (2013.01)

(56) References Cited

OTHER PUBLICATIONS

Shoichiro Takeda, Kazuki Okami, Dan Mikami, Megumi Isogai, Hideaki Kimata, "Jerk-Aware Video Acceleration Magnification", IEEE International Conference on Computer Vision and Pattern Recognition (2018).

* cited by examiner

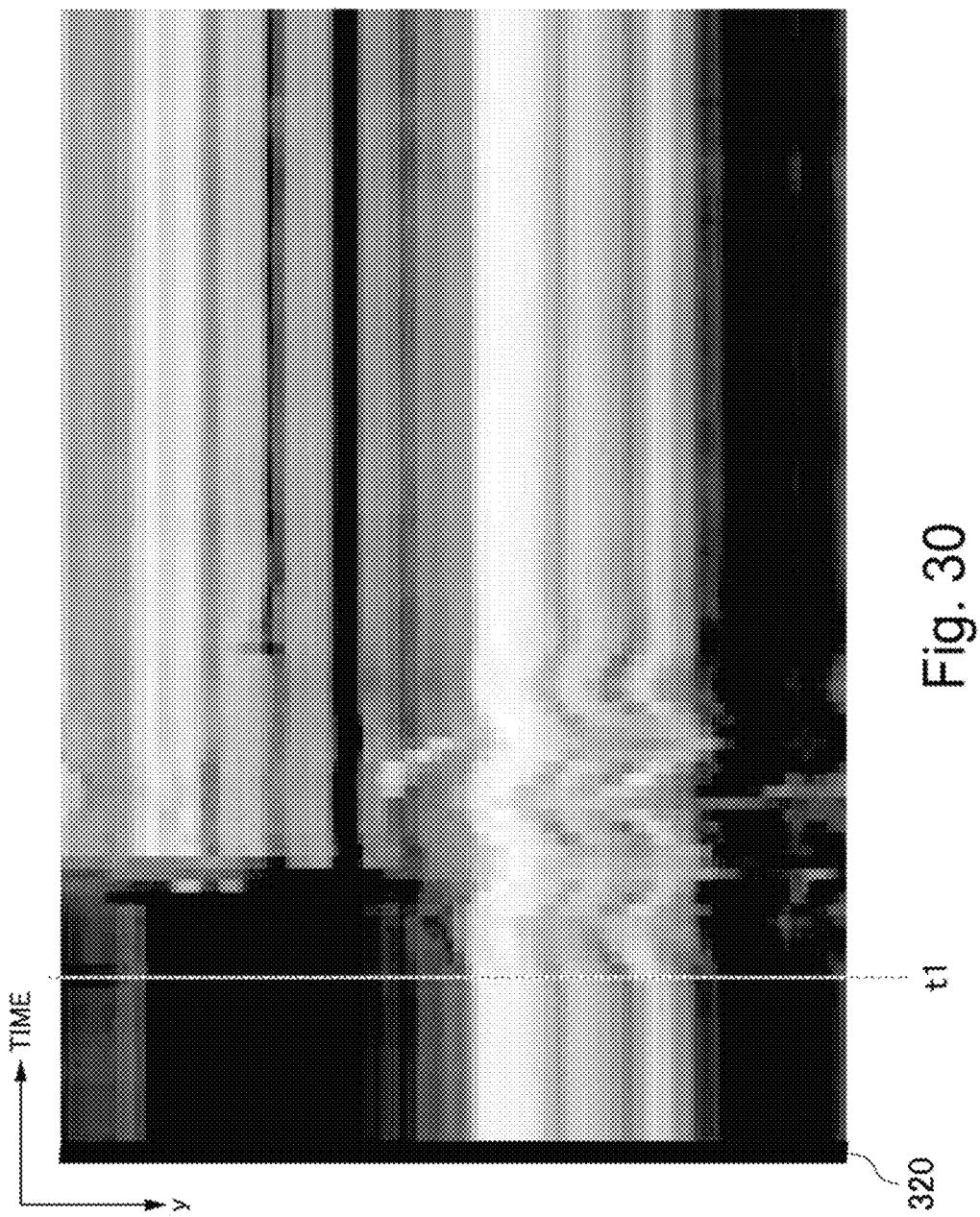

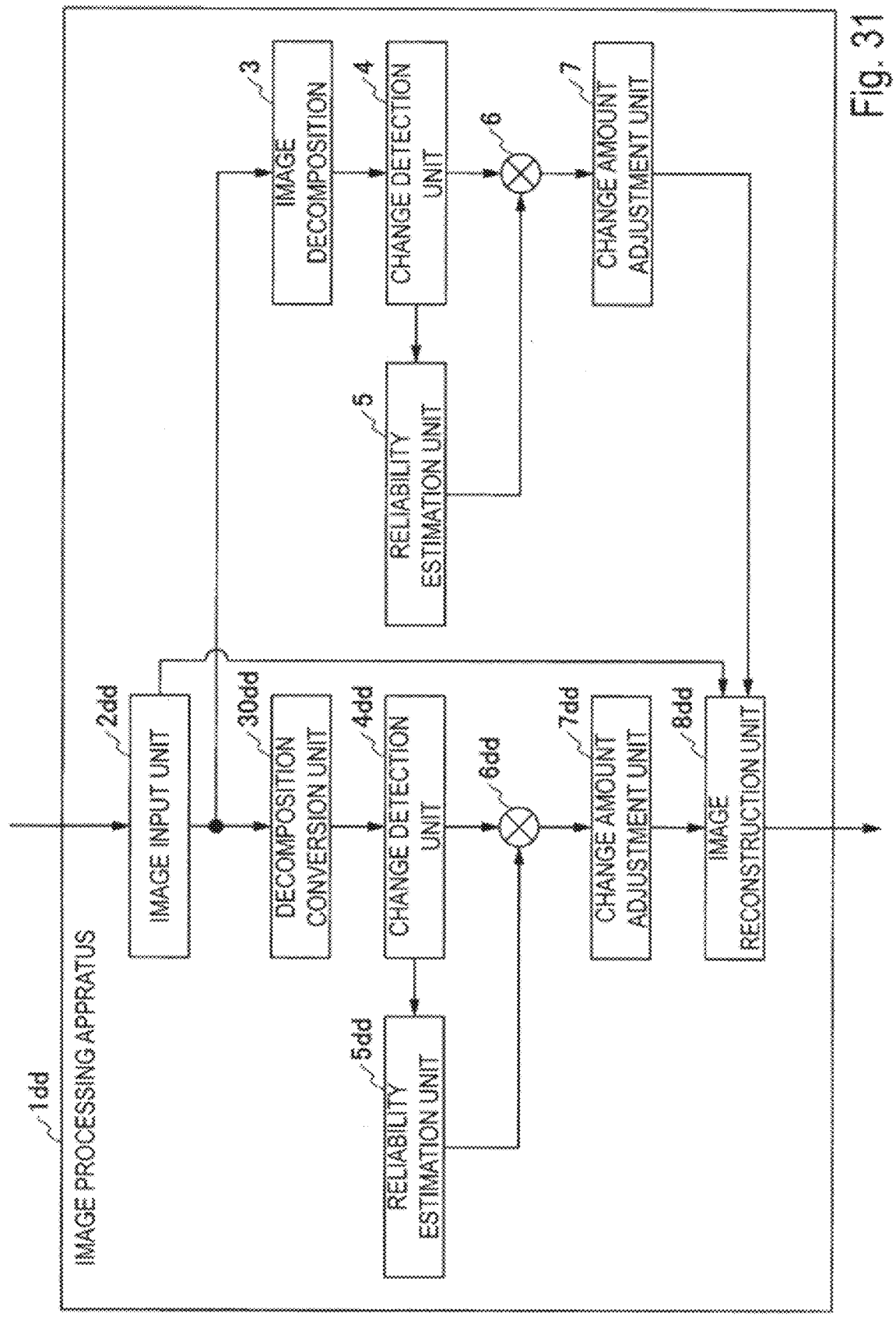

VIDEO MAGNIFICATION USING ANISOTROPY MEASURE FOR NOISE REDUCTION

CROSS-REFERENCE TO RELATED APPLICATIONS

This application is a 371 U.S. National Phase of International Application No. PCT/JP2019/021824 filed on May 31, 2019. The entire disclosure of the above application is incorporated herein by reference.

TECHNICAL FIELD

The present disclosure relates to an image processing apparatus, an image processing method, and a program.

BACKGROUND ART

There is a technology capable of detecting a minute color or luminance change of an image in a frame of a moving image in an image processing apparatus and emphasizing or attenuating the detected minute color or luminance change. A technique for adjusting the amount of minute color or luminance change of the image by the emphasis or attenuation is referred to as "video magnification". The image processing apparatus may visualize a physical phenomenon that is not captured by human vision in the frames of the moving image by emphasis in the video magnification. The image processing apparatus may also remove unnecessary image fluctuations (for example, shakes, ground vibrations, and the like) mixed in the frames of the moving image from the frames by attenuation in the video magnification.

The image processing apparatus applies a temporal filter to a frame when detecting a minute color or luminance change in a moving image. This makes it possible for the image processing apparatus to detect a minute color or luminance change of an image of a subject (see Non Patent Documents 1 and 2).

CITATION LIST

Non Patent Document

Non Patent Document 1: Hao-YuWu, Michael Rubinstein, Eugene Shih, John Guttag, Fredo Durand, William Freeman. "Eulerian Video Magnification for Revealing Subtle Changes in the World." SIGGRAPH. (2012)

Non Patent Document 2: Shoichiro Takeda, Kazuki Okami, Dan Mikami, Megumi Isogai, Hideaki Kimata. "Jerk-Aware Video Acceleration Magnification." IEEE International Conference on Computer Vision and Pattern Recognition (2018).

SUMMARY OF THE INVENTION

Technical Problem

However, in technologies described in Non Patent Literatures 1 and 2, there is a problem in that an image processing apparatus adjusts not only an amount of meaningful minute color or luminance change, but also an amount of change in random noise mixed in an image due to thermal noise of an image sensor or the like (meaningless minute color or luminance change). Because the quality of the image deteriorates when the amount of change in the random noise is adjusted, it is necessary to reduce the adjustment of the random noise mixed in the moving image using the image processing apparatus.

In view of the above circumstances, an object of the present disclosure is to provide an image processing apparatus, an image processing method, and a program capable of reducing adjustment of random noise mixed in a moving image when adjusting an amount of minute color or luminance change of the moving image.

Means to Solve Problems

An aspect of the present disclosure is an image processing apparatus including: a change detection unit configured to detect predetermined color or luminance change for each of different resolutions among changes in color or luminance in a color or luminance image; and a reliability estimation unit configured to estimate reliability of the detected color or luminance change based on temporal color or luminance change in the color or luminance image.

In the image processing apparatus according to the aspect of the present disclosure, the reliability estimation unit estimates the reliability based on a diffusion result of the temporal color or luminance change in the color or luminance image.

In the image processing apparatus according to the aspect of the present disclosure, the reliability has a greater value when the diffusion result shows anisotropy.

The image processing apparatus according to the aspect of the present disclosure further includes: a multiplication unit configured to multiply the detected color or luminance change by the reliability; and a change amount adjustment unit configured to adjust an amount of color or luminance change multiplied by the reliability.

An aspect of the present disclosure is an image processing method executed by an image processing apparatus, the image processing method including: a change detection step of detecting color or luminance change for each of different resolutions among changes in color or luminance in a color or luminance image; and a reliability estimation step of estimating reliability of the detected color or luminance change based on temporal color or luminance change in the color or luminance image.

An aspect of the present disclosure is a program for causing a computer to function as the image processing apparatus.

Effects of the Invention

According to the present disclosure, it is possible to reduce adjustment of random noise mixed in a moving image when adjusting an amount of minute color or luminance change of the moving image.

BRIEF DESCRIPTION OF DRAWINGS

FIG. 30 is a diagram illustrating an example of pixel values of a pixel group in which an amount of motion change has been adjusted based on a variance value of change in a change direction per unit time in the fifth embodiment.

FIG. 31 is a diagram illustrating a configuration example of an image processing apparatus according to the fifth embodiment.

DESCRIPTION OF EMBODIMENTS

Embodiments of the present disclosure will be described in detail with reference to the drawings.

First Embodiment

Figure 1:
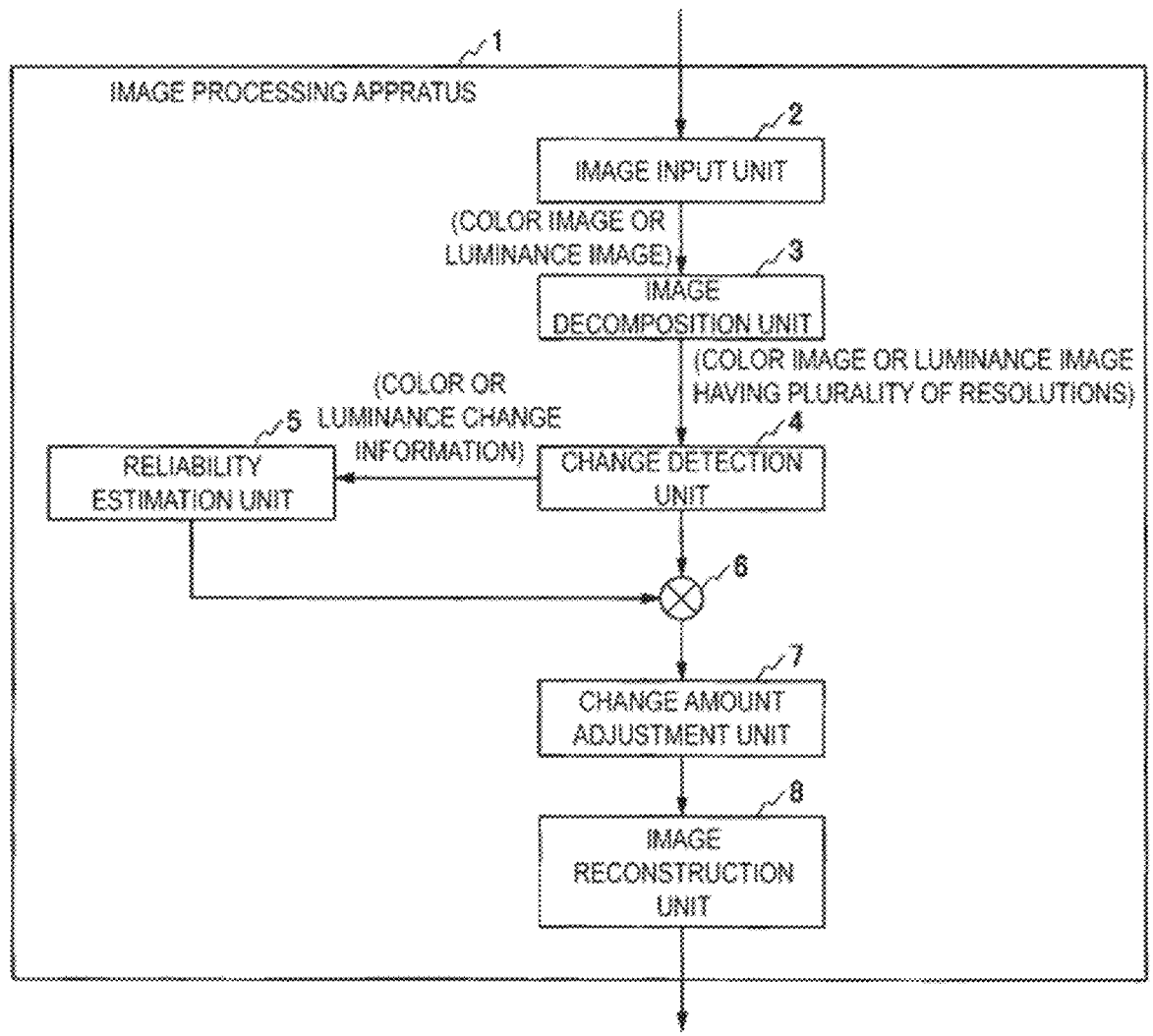
FIG. 1 is a diagram illustrating a configuration example of an image processing apparatus according to a first embodiment.

FIG. 1 is a diagram illustrating a configuration example of an image processing apparatus 1 according to a first embodiment. The image processing apparatus 1 is an apparatus that executes a predetermined image processing on a moving image. The predetermined image processing is, for example, image processing of video magnification. The image processing apparatus 1 performs predetermined image processing on a moving image to emphasize or attenuate specific minute color or luminance change of a subject. The image processing apparatus 1 emphasizes or attenuates a selected pixel value in the moving image to emphasize or attenuate a specific minute color or luminance change of the subject. Here, the selected pixel value is a pixel value of the color or luminance selected as a processing target in advance, and is, for example, any one of a pixel value of R, a pixel value of G, a pixel value of B, a pixel value of Y, a pixel value of E, and a pixel value of Q. The pixel values of Y, E, and Q are values indicating brightness converted from RGB.

The image processing apparatus 1 includes an image input unit 2, an image decomposition unit 3, a change detection unit (change detector) 4, a reliability estimation unit (reliability estimator) 5, a change amount adjustment unit (change amount adjuster) 7, and an image reconstruction unit 8. Each functional unit may be provided as a single functional unit in combination, or may be divided and provided as multiple functional units.

A processor such as a central processing unit (CPU) executes a program stored in a memory which is a nonvolatile recording medium (non-transitory recording medium), and thus, a part or all of functional units of the image processing apparatus 1 is realized. The program may be recorded in a computer-readable recording medium. The computer-readable recording medium is, for example, a portable medium such as a flexible disk, a magneto-optical disk, a read only memory (ROM), or a compact disc read only memory (CD-ROM), or a non-transitory storage medium such as a storage device such as a hard disk drive built into a computer system. The program may be transmitted via an electrical communication line. A part or all of the functional units of the image processing apparatus 1 may be realized by using hardware including an electronic circuit (or circuitry) using a large scale integration circuit (LSI), an application specific integrated circuit (ASIC), a programmable logic device (PLD), or a field programmable gate array (FPGA).

Hereinafter, an image representing luminance information of a frame of the moving image is referred to as a "luminance image". Hereinafter, an image representing color information of the frame of the moving image is referred to as a "color image".

The image input unit 2 receives multiple frames of a moving image that is an image processing target and information on color or luminance selected as a processing target. Alternatively, the image input unit 2 receives a color image or a luminance image after conversion of the frames of the moving image to an arbitrary luminance space or color space. The image input unit 2 outputs an original-resolution color image or luminance image that is an image processing target and information on the selected color or luminance to the image decomposition unit 3. In the following description, a case in which the original-resolution color image is input will be described as an example. Processing is the same when the luminance image is input instead of the color image as when the color image is input.

The image decomposition unit 3 receives the original-resolution color image that is an image processing target and information on the selected color. The image decomposition unit 3 decomposes a color image having information on the selected color in the original-resolution color image at time t of the received moving image into different resolutions. Specifically, the image decomposition unit 3 repeats a process of convolving the Gaussian filter with respect to the color image having the information on the selected color in the received original-resolution color image and then performing downsampling multiple times to decompose the received original-resolution color image into multiple resolutions. Downsampling is a process of reducing the resolution based on an amount of downsampling. The amount of downsampling has a value smaller than 1 (for example, ½). The image decomposition unit 3 outputs a color image having different resolutions to the change detection unit 4.

Figure 2:
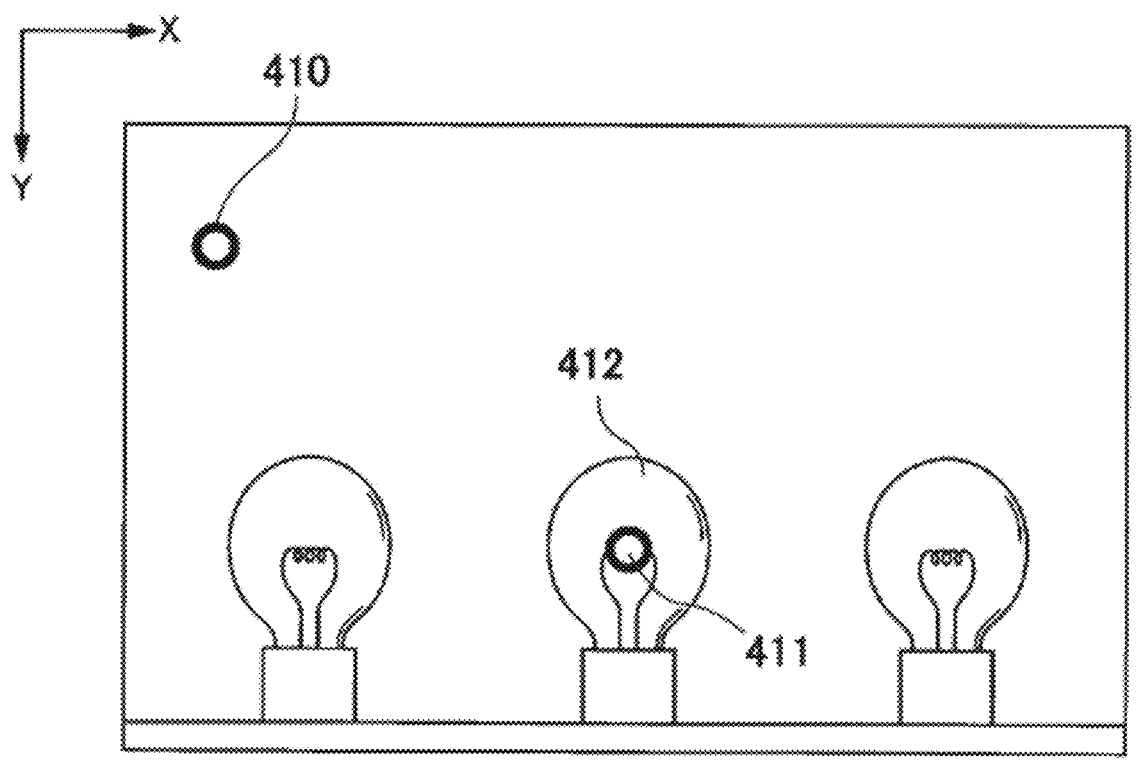
FIG. 2 is a diagram illustrating an example of pixels in a frame of a moving image in the first embodiment.

FIG. 2 is a diagram illustrating an example of pixels in a frame of a moving image. Hereinafter, an x coordinate in a horizontal direction and a y coordinate in a vertical direction are determined in the frame of the moving image. In the frame illustrated in FIG. 2, a state in which three light bulbs are lit is imaged. The frame illustrated in FIG. 2 includes a pixel 410, a pixel 411, and a light bulb image 412. The pixel 410 is a pixel included in a background image captured in a first partial region of the frame. The pixel 411 is a pixel included in the light bulb image 412 captured in a second partial region of the frame.

Figure 3:
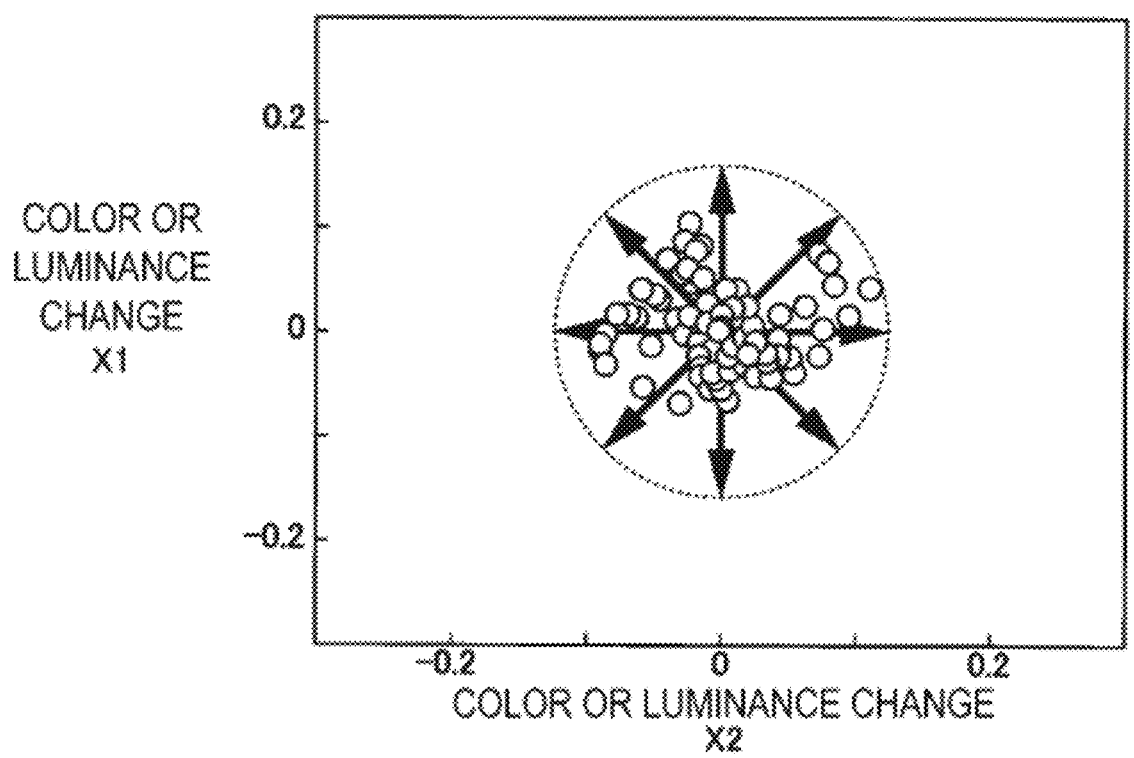
FIG. 3 is a diagram illustrating a first example (isotropic diffusion) of variance of minute color or luminance changes in the first embodiment.

FIG. 3 is a diagram illustrating isotropic diffusion of the minute color or luminance change. In FIG. 3, a vertical axis indicates change in color or luminance of a certain pixel x1 in a frame, and a horizontal axis indicates change in color or luminance of a certain pixel x2 in the frame. The minute color or luminance change illustrated in FIG. 3 is a temporal minute change in color or luminance in a color image or luminance image. A meaningless change in minute color or luminance is the isotropic diffusion, as in an example illustrated in FIG. 3.

Figure 4:
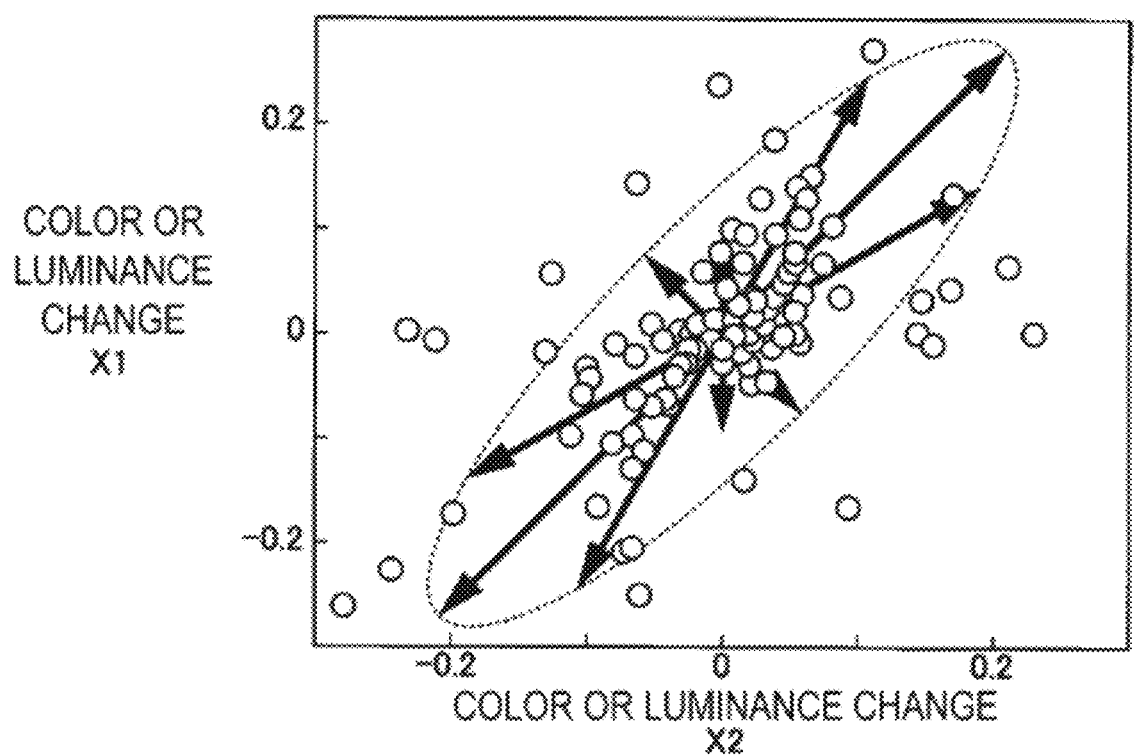
FIG. 4 is a diagram illustrating a second example (anisotropic diffusion) of variance of minute color or luminance changes in the first embodiment.

FIG. 4 is a diagram illustrating anisotropic diffusion of the minute color or luminance change. In FIG. 4, a vertical axis indicates change in color or luminance of a certain pixel x1 in a frame, and a horizontal axis indicates change in color or luminance of a certain pixel x2 in the frame. A minute color or luminance change illustrated in FIG. 4 is a temporal minute color or luminance change in a color image or luminance image. A meaningful minute color or luminance change is the anisotropic diffusion. An amount of change in the meaningful minute color or luminance change changes so that a time distribution is biased in a specific direction.

Hereinafter, a symbol above a letter in equations is written immediately before the letter. For example, the symbol "^" above the letter "C" in the equations is written immediately before the letter "C" as in "^C." For example, the symbol "−" above the letter "t" in the equations is written immediately before the letter "t" as in "(−)t." For example, the symbol "~" above the letter "C" in the equations is written immediately before the letter "C" as in "~C."

Referring back to FIG. 1, the description of the configuration example of the image processing apparatus 1 will be continued. The change detection unit 4 receives the color image having each resolution output from the image decomposition unit 3. The change detection unit 4 detects minute change in color in the color image having each resolution based on the received color image having each resolution. The change detection unit 4 outputs information indicating the detected minute color or luminance change in the color image or luminance image (hereinafter referred to as "color or luminance change information") to the reliability estimation unit 5 and the multiplication unit (multiplier) 6 for each resolution.

The reliability estimation unit 5 receives the color or luminance change information. The reliability estimation unit 5 estimates the reliability of the minute color or luminance change "B″(x, y, t)" based on the received color or luminance change information. The reliability of the minute color or luminance change is reliability of a minute color or luminance change that occurs in a pixel value of an image due to a physical phenomenon other than random noise. The reliability estimation unit 5 estimates the reliability so that the reliability of the minute color or luminance change occurring in the pixel value of the image due to the random noise mixed in the image due to, for example, thermal noise of the image sensor is lower than the reliability of the minute color or luminance change that occurs in the pixel value of the image due to the physical phenomenon other than the random noise. The reliability estimation unit 5 outputs the estimated reliability to the multiplication unit 6. The reliability estimation unit 5 outputs the estimated reliability to the multiplication unit 6. The reliability estimated by the reliability estimation unit 5 in the present embodiment becomes higher when a time distribution of the minute color or luminance change indicates anisotropy. In other words, the reliability becomes higher when a diffusion result indicates anisotropy.

The multiplication unit 6 receives the color or luminance change information and the reliability. The multiplication unit 6 multiplies the received color or luminance change information by the reliability for each pixel, and outputs a result of the multiplication (a multiplication result) to the change amount adjustment unit 7. The multiplication unit 6 multiplies the color or luminance change information by the reliability so that the minute color or luminance change "^C″(x, y, t, θ)" occurring in the pixel value of the image due to the physical phenomenon other than random noise is detected with high accuracy.

The change amount adjustment unit 7 receives the multiplication result (color or luminance change multiplied by the reliability) output by the multiplication unit 6. The change amount adjustment unit 7 executes video magnification for the received multiplication result of the multiplication unit 6. That is, the change amount adjustment unit 7 adjusts a change amount of minute color or luminance change multiplied by the reliability through emphasis or attenuation. Thus, the change amount adjustment unit 7 generates an image in which the amount of minute color or luminance change has been adjusted (hereinafter referred to as "adjusted image"), for each resolution. The change amount adjustment unit 7 outputs multiple adjusted images having different resolutions to the image reconstruction unit 8.

The image reconstruction unit 8 (image combination unit) receives the multiple adjusted images having different resolutions. The image reconstruction unit 8 (image combination unit) reconstructs an image based on the received adjusted images. Specifically, the image reconstruction unit 8 adjusts sizes of the multiple adjusted images having different resolutions to the same size, and performs addition to reconstruct an image in which the minute color or luminance change is emphasized. When the conversion to the color space or the luminance space has been performed, the image reconstruction unit 8 performs inverse conversion thereof to obtain a final video output. The image reconstruction unit 8 outputs an image finally adjusted by using the video magnification as the combination result to a predetermined external device.

The predetermined external device is, for example, a device that executes image processing other than the video magnification, a device that executes image recognition (hereinafter, referred to as an "image recognition device"), or a display device. When the predetermined external device is the image recognition device, the image recognition device may use, as a feature for image recognition, the combination result (image finally adjusted by using the video magnification).

Next, the image processing apparatus 1 will be described in detail. The image input unit 2 acquires the multiple frames of the moving image that is an image processing target and information on color or luminance selected as a processing target. The image input unit 2 outputs an original-resolution color image or luminance image that is an image processing target and the information on the selected color or luminance to the image decomposition unit 3.

The image decomposition unit 3 decomposes the color image of the information on the selected color among the original-resolution color images in time t of the received moving image into different resolutions. The image decomposition unit 3 outputs a color image having different resolutions to the change detection unit 4.

The change detection unit 4 detects minute change in color in the color image in the color image having each resolution. When a luminance image having each resolution is input, the change detection unit 4 detects a minute change in the luminance in the luminance image having each resolution. The change detection unit 4 convolves a temporal filter "H(t)" having a frequency response with a minute change to be emphasized with respect to the color or luminance change "I''(x, y, t))" in the video having each resolution obtained in the image decomposition unit 3 or multiplies the color or luminance change by a spatiotemporal filter "J(x, y, t)" for removing large change to detect the minute color or luminance change "B''(x, y, t)" as in Equation (1) below. The change detection unit 4 may not multiply the color or luminance change by the spatiotemporal filter "J(x, y, t)." That is, when the change detection unit 4 detects the minute color or luminance change "B''(x, y, t)," the change detection unit 4 may not use the spatiotemporal filter "J(x, y, t)."

$$B''(x, y, t) = J(x, y, t) \circ (H(t) \otimes I''(x, y, t)) \qquad (1)$$

In Equation (1), among operators, an operator including a mark "x" in a mark "∘" indicates a convolution operator, and an operator "∘" indicates multiplication (element product). H(t) indicates a bandpass filter, and "J(x, y, t)" is a jerk filter for the purpose of removing only abrupt change, which is a representative example. A filter that is used by the change detection unit 4 is not limited thereto.

The minute color or luminance change "B''(x, y, t)" obtained by the change detection unit 4 includes a "meaningful" minute color or luminance change caused by a natural phenomenon or a physical phenomenon and a "meaningless" minute color or luminance change derived from noise mixed in an imaging process like the random noise mixed in the image due to, for example, thermal noise of the image sensor shared as in Equation (2) below. The noise mixed in the imaging process is, for example, thermal noise, camera shake, ground vibration, or the like.

$$B''(x, y, t) = \hat{B}''(x, y, t) + \tilde{B}''(x, y, t) \qquad (2)$$

In Equation (2), "^B''(x, y, t)" indicates a "meaningful" minute color or luminance change, and "~B''(x, y, t)" indicates a "meaningless" minute color or luminance change.

The reliability estimation unit 5 uses the minute color or luminance change "B''(x, y, t)" obtained by a change detection unit 4 to estimate the reliability of the minute color or luminance change "B''(x, y, t)." Specifically, the reliability estimation unit 5 evaluates a temporal behavior (time distribution) of the minute color or luminance change "B''(x, y, t)" obtained by the change detection unit 4 to estimate the reliability of the minute color or luminance change. Considering a video region $(-)x \in R^{(h \times w)} = R^d$ around a certain place (x, y) and a time width "(−)t" around a certain time t with respect to the minute color or luminance change "B''(x, y, t)" output from the change detection unit 4, a diffusion equation regarding the minute color or luminance change "B''((−)x, (−)t)" can be formulated as in Equation (3) below.

$$f(B''(\bar{x}, \bar{t})) = \frac{1}{(2\pi)^{d/2}|D|^{1/2}} \exp\left(-\frac{1}{2} B''(\bar{x})^T D^{-1} B''(\bar{x})\right) \qquad (3)$$

In Equation (3), "f(B''((−)x, (−)t))" indicates the time distribution of the minute color or luminance change, and "D" indicates a diffusion tensor matrix in the time width "(−)t." From Equation (3) above, the diffusion tensor matrix can be obtained as in Equation (4) below.

$$D = \text{cov}(B''(\bar{x}, \bar{t})) \qquad (4)$$

In Equation (4), "cov(X)" means that a variance-covariance matrix of an X matrix is calculated. Thereafter, the reliability estimation unit 5 performs eigenvalue decomposition on "D" to obtain a fractional anisotropy (hereinafter referred to as "FA"), which is a feature quantity regarding the time distribution of the minute color or luminance change, from Equation (5) below.

$$FA^n(x, y, t) := \sqrt{\frac{d}{d-1}} \cdot \sqrt{\frac{\sum_{i=1}^{n}(\lambda_i - \bar{\lambda})^2}{\sqrt{\sum_{i=1}^{n}\lambda_i^2}}} \qquad (5)$$

In Equation 5, $(\lambda_1, \ldots, \lambda_d)$ are eigenvalues of "D," "$(-)\lambda$" is an average thereof, and "d" indicates the number of pixels that are processing targets. Here, the number "d" of pixels that are processing targets is the number of pixels to be adjusted. "FA" is a feature quantity that is "1" when the time distribution indicates anisotropy and "0" when the time distribution indicates isotropy. The "meaningful" minute color or luminance change caused by a natural phenomenon or physical phenomenon has a biased time distribution in a specific direction and has high anisotropy. Thus, the "meaningful" minute color or luminance change indicates a FA value close to "1." On the other hand, the "meaningless" minute color or luminance change derived from noise mixed in the imaging process has a time distribution diffused in random directions, has low anisotropy, and has high isotropy. Thus, the "meaningless" minute color or luminance change has an FA value close to "0." Thus, the reliability estimation unit 5 estimates the reliability of the minute color or luminance change based on Equation (6) below using the FA.

$$FAF^n_{\sigma,\gamma}(x, y, t) = (Norm(G_\sigma \otimes FA^n(x, y, t)))^\gamma \qquad (6)$$

In Equation (6), "$FAF_{\sigma,\gamma}^n(x, y, t)$" is the spatiotemporal filter indicating the reliability of the minute color or luminance change, "$G_\sigma$" is a function for spatially smoothing "$FAF_{\sigma,\gamma}^n(x, y, t)$," and the parameter "$\sigma$" is a parameter indicating the strength of smoothing. Further, "Norm(X)" indicates that a value of the argument "X" is normalized to a range from 0 to 1. A method of spatially smoothing the parameter "$G_\sigma$," and a method of normalization are not limited to specific methods. The reliability "$FAF_{\sigma,\gamma}^n(x, y, t)$" indicates reliability of the minute color or luminance change in a region including the coordinates (x, y) in a range from 0 to 1. The reliability of the minute color or luminance change becomes higher when the value becomes greater.

The multiplication unit 6 multiplies the color or luminance change information by the reliability estimated by the reliability estimation unit 5 for each pixel or each region. More specifically, the multiplication unit 6 multiplies the reliability "$FAF_{\sigma,\gamma}^n(x, y, t)$" shown in Equation (6) by "$B^n(x, y, t)$" shown in Equation (1), as in Equation (7) below.

$$\hat{B}^n(x, y, t) = FAF^n_{\sigma,\gamma}(x, y, t) \circ B^n(x, y, t) \qquad (7)$$

According to Equation (7), the minute color or luminance change "$\hat{B}n(x, y, t)$" that occurs in the pixel value of the image due to the physical phenomenon other than the random noise is detected with high accuracy.

The change amount adjustment unit 7 multiplies the minute color or luminance change "$\hat{B}^n(x, y, t)$" obtained using Equation (7) by the predetermined adjustment rate (emphasis rate) "a." That is, the change amount adjustment unit 7 multiplies the minute color or luminance change "$\hat{B}^n(x, y, t)$" derived with high accuracy as in Equation (7) by the predetermined adjustment rate (emphasis rate) "$\alpha$," as in Equation (8) below. The change amount adjustment unit 7 adds the change "$I^n(x, y, t)$" in color or luminance of a change source of the original color or luminance to a multiplication result to derive the change "$\hat{I}^n(x, y, t)$" in color or luminance in which the amount of gentle and minute color or luminance change has been adjusted (for example, emphasized or attenuated), as in Equation (8).

$$\hat{I}^n(x, y, t) = I^n(x, y, t) + \alpha \cdot \hat{B}^n(x, y, t) \qquad (8)$$

By doing this, the change amount adjustment unit 7 adjusts the amount of detected minute color or luminance change. The adjustment rate may be the same or different for each resolution, direction, time, or position.

When the minute color or luminance is emphasized, the predetermined adjustment rate "$\alpha$" is set to a positive value greater than 0. When the minute color or luminance is attenuated, the predetermined adjustment rate "$\alpha$" is set to a negative value smaller than 0. An upper limit value and a lower limit value of "$\alpha$" may not be specifically determined. However, for example, when the minute color or luminance is attenuated, a value of the predetermined adjustment rate "$\alpha$" in a case in which a value of an original minute color or luminance change "$I^n(x, y, t)$" becomes 0 is set as the lower limit value of "$\alpha$." When "$\alpha$" is set to 0, the minute color or luminance change is not adjusted.

The image reconstruction unit 8 (image combination unit) reconstructs the image. The image reconstruction unit 8 obtains Equation (8) for each resolution, and performs addition in the resolution direction while performing upsampling to perform conversion to color or luminance information in which only the "meaningful" minute color or luminance change is emphasized and reconstruct the original-resolution image. When conversion to a color space or a luminance space has been performed, the image reconstruction unit 8 can perform inverse conversion thereof to obtain a final video output.

Figure 5:
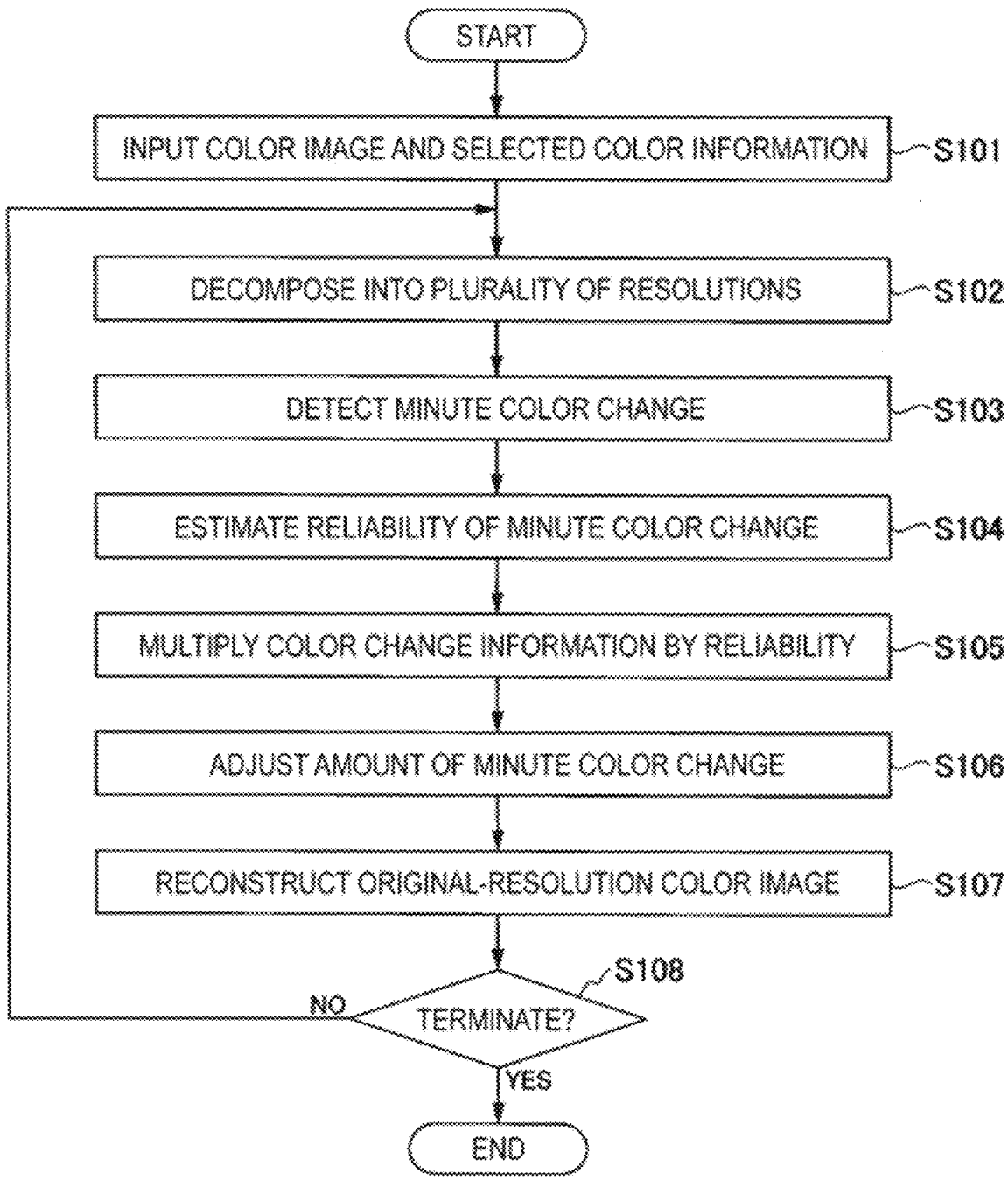
FIG. 5 is a flowchart illustrating an operation example of the image processing apparatus according to the first embodiment.

Next, an operation example of the image processing apparatus 1 will be described. FIG. 5 is a flowchart illustrating an operation example of the image processing apparatus 1 according to a first embodiment. A case in which the original-resolution color image that is an image processing target and the information on the selected color are input to the image input unit 2 will be described with reference to FIG. 5 as an example. When the original-resolution luminance image that is an image processing target and the information on the selected luminance are input to the image input unit 2, it is only required that the original-resolution color image is read as the original-resolution luminance image and the color information is read as the luminance information in the processing of FIG. 5.

The image input unit 2 receives the original-resolution color image that is an image processing target and the information on the selected color (step S101). The image input unit 2 outputs the original-resolution color image and the information on the selected color to the image decomposition unit 3. The image decomposition unit 3 decomposes the color image having the information on the selected color among the original-resolution color images in time t of the received moving image into different resolutions (step S102). The image decomposition unit 3 outputs the color image having each resolution to the change detection unit 4.

The change detection unit 4 detects the minute change in color in the color image having each resolution based on the color image output from the image decomposition unit 3 (step S103). The change detection unit 4 outputs the detected minute change in the color of each resolution as color or luminance change information to the reliability estimation unit 5 and the multiplication unit 6.

The reliability estimation unit 5 estimates the reliability "$FAF_{o,\gamma}''(x, y, t)$" of the minute color or luminance change "$B''(x, y, t)$" based on the color or luminance change information output from the change detection unit 4 (step S104). The reliability estimation unit 5 outputs the estimated reliability "$FAF_{o,\gamma}''(x, y, t)$" to the multiplication unit 6.

The multiplication unit 6 multiplies the color or luminance change information output from the change detection unit 4 by the reliability "$FAF_{o,\gamma}''(x, y, t)$" output from the reliability estimation unit 5 (step S105). The multiplication unit 6 outputs a multiplication result to the change amount adjustment unit 7. The change amount adjustment unit 7 uses the multiplication result output from the multiplication unit 6 to adjust the amount of minute color or luminance change multiplied by the reliability through emphasis or attenuation (step S106). The change amount adjustment unit 7 outputs information on the amount of minute color or luminance change to the image reconstruction unit 8. The image reconstruction unit 8 reconstructs the original-resolution color image based on multiple adjusted images having different resolutions (step S107).

The image decomposition unit 3 determines whether or not the image processing apparatus 1 terminates the processing based on, for example, an instruction obtained from the user (step S108). In accordance with a determination that the image processing apparatus 1 continues the processing (step S108: NO), each functional unit of the image processing apparatus 1 returns the processing to step S102. In accordance with a determination that the image processing apparatus 1 terminates the processing (step S108: YES), each functional unit of the image processing apparatus 1 ends the processing.

As described above, the image processing apparatus 1 of the first embodiment includes the change detection unit 4 and the reliability estimation unit 5. The change detection unit 4 detects a predetermined color or luminance change from among color or luminance changes in the color or luminance image having multiple resolutions. The reliability estimation unit 5 estimates the reliability "$FAF_{o,\gamma}''(x, y, t)$" of the detected color or luminance change based on temporal color or luminance change in the color or luminance image.

Thus, the image processing apparatus 1 can more accurately detect the "meaningful" minute color or luminance change among the detected minute changes in the video. Thus, the image processing apparatus 1 can adjust the amount of "meaningful" minute color or luminance change. Thus, the image processing apparatus 1 can reduce the adjustment of the random noise mixed in the moving image when adjusting the amount of minute color or luminance change of the moving image.

Second Embodiment

A second embodiment differs from the first embodiment in that the image processing apparatus emphasizes or attenuates a minute motion change, in addition to a specific minute color or luminance change of a subject. In the second embodiment, differences from the first embodiment will be described.

Figure 6:
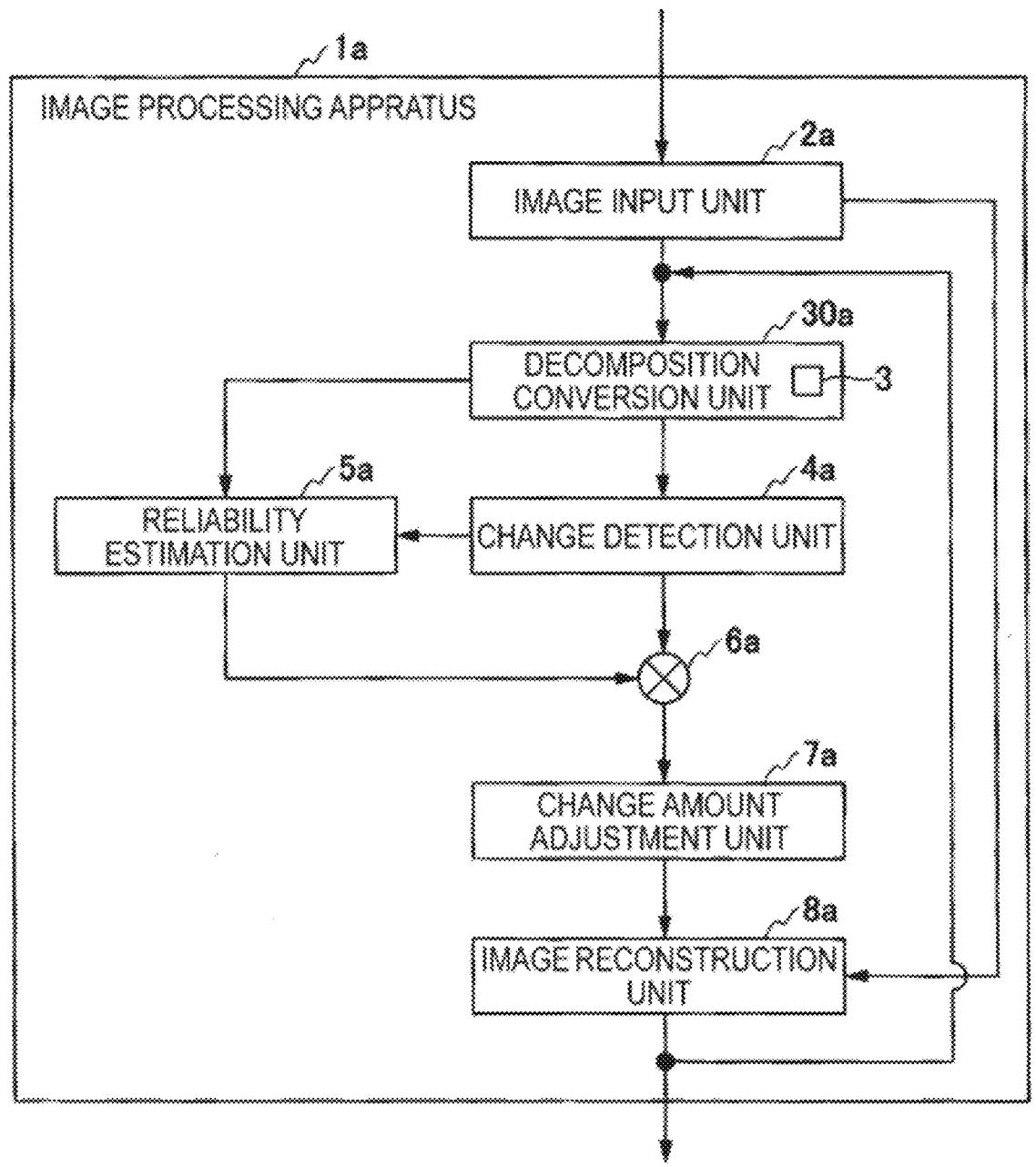
FIG. 6 is a diagram illustrating a configuration example of an image processing apparatus according to a second embodiment.

FIG. 6 is a diagram illustrating a configuration example of an image processing apparatus 1a according to the second embodiment. The image processing apparatus 1a is an apparatus that executes a predetermined image processing on a moving image. The image processing apparatus 1a executes predetermined image processing on the moving image to emphasize or attenuate a specific minute color or luminance change of the subject and a specific minute motion change of the subject.

The image processing apparatus 1a includes an image input unit 2a, a decomposition conversion unit 30a, a change detection unit 4a, a reliability estimation unit 5a, a multiplication unit 6a, a change amount adjustment unit 7a, and an image reconstruction unit 8a. The decomposition conversion unit 30a includes an image decomposition unit 3.

In the second embodiment, the image processing apparatus 1a sequentially executes first image processing and second image processing. That is, the image processing apparatus 1a executes the first image processing on the moving image, and further executes the second image processing on the moving image. An execution order of the first image processing and the second image processing may be reversed.

In the first image processing, each functional unit of the image processing apparatus 1a executes the same processing as each functional unit of the image processing apparatus 1 of the first embodiment. That is, the image processing apparatus 1a executes the first image processing on the moving image to emphasize or attenuate a specific minute color or luminance change of the subject.

The image processing apparatus 1a executes the second image processing on the moving image to emphasize or attenuate a specific minute motion change of the subject. In the second image processing, the adjustment rate "α" of the phase change is 0.

Next, a process of emphasizing or attenuating the specific minute motion change of the subject will be described.

Figure 7:
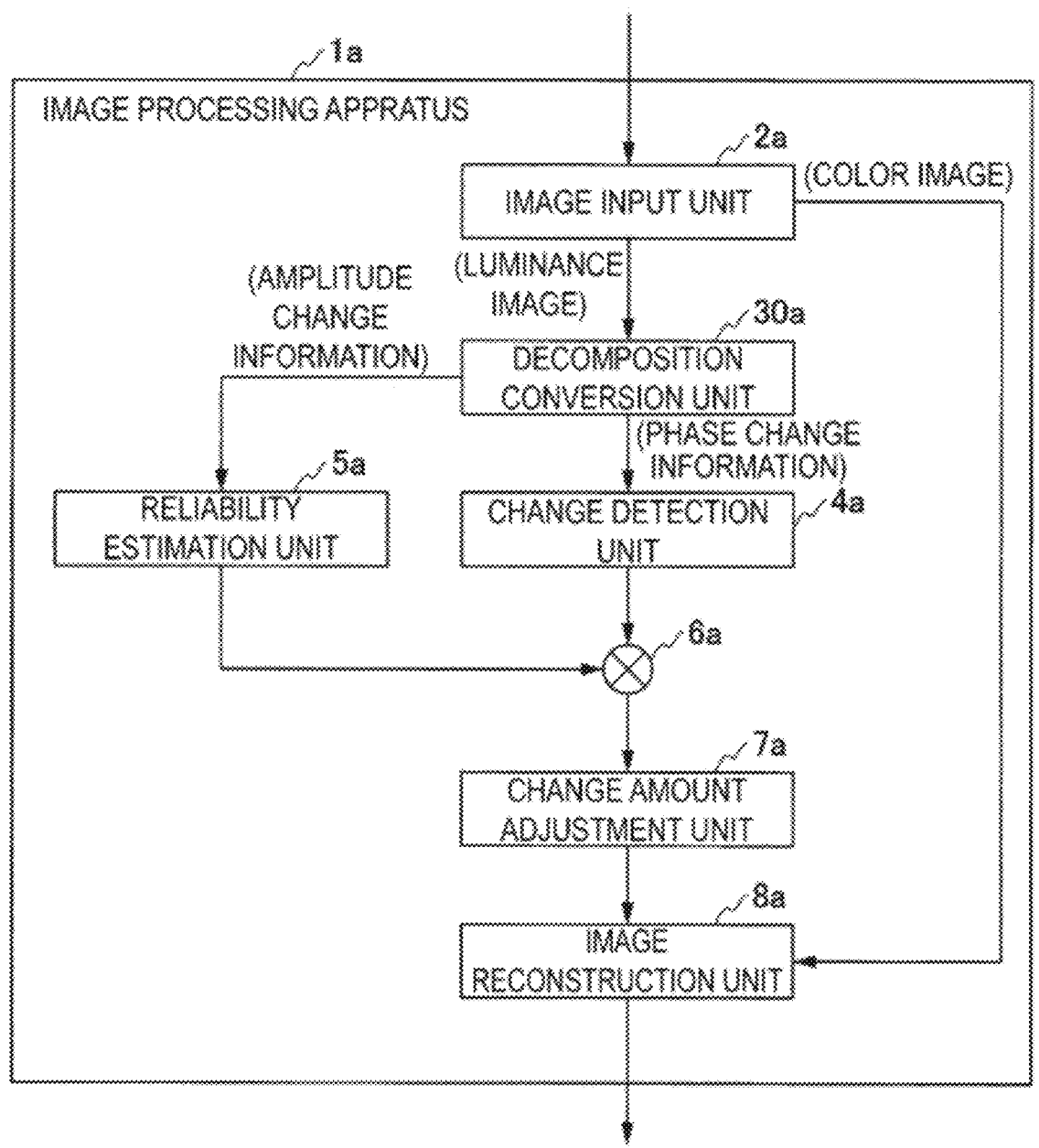
FIG. 7 is a diagram illustrating a configuration example of each functional unit that emphasizes or attenuates the specific minute motion change of the subject in the second embodiment.

FIG. 7 is a diagram illustrating a configuration example of each functional unit that emphasizes or attenuates the specific minute motion change of the subject in the second embodiment. The image processing apparatus 1a includes an image input unit 2a, a decomposition conversion unit 30a, a change detection unit 4a, a reliability estimation unit 5a, a multiplication unit 6a, a change amount adjustment unit 7a, and an image reconstruction unit 8a as respective functional units that emphasize or attenuate the specific minute motion change of the subject in the second embodiment.

The image input unit 2a receives multiple frames of the moving image as the image processing target. The image input unit 2a generates the luminance images and the color images for each frame from the multiple received frames of the moving image. The image input unit 2a outputs an original-resolution luminance image that is an image processing target to the decomposition conversion unit 30a. The image input unit 2a outputs an original-resolution color image that is an image processing target to the image reconstruction unit 8a.

The decomposition conversion unit 30a receives the original-resolution luminance image. The decomposition conversion unit 30a converts luminance change of a pixel at the coordinates (x, y) in the original-resolution luminance image at time t of the received moving image to a phase change and amplitude change of each piece of luminance information in multiple directions determined in advance and decomposes the moving image into different resolutions. The multiple directions determined in advance are, for example, multiple directions extending radially from the pixel at the coordinates (x, y) in the frame. For the multiple spatial directions extending radially, for example, 360 degrees around the pixels in the frame are equally divided into 22.5 degrees. The decomposition conversion unit 30a outputs information indicating the phase change of each piece of luminance information in the multiple directions determined in advance as phase change information to the change detection unit 4a, and outputs information indicating the amplitude change of each piece of luminance information in the multiple directions determined in advance as amplitude change information to the reliability estimation unit 5a.

The change detection unit 4a receives the phase change information. The change detection unit 4a detects a minute phase change "$C^n(x, y, t, \theta)$" in the luminance image having each resolution based on the received phase change information. The change detection unit 4a outputs information indicating the minute phase change in the detected luminance image (hereinafter referred to as "minute phase change information") to the multiplication unit 6a for each resolution.

The reliability estimation unit 5a receives the amplitude change information. The reliability estimation unit 5a estimates reliability of the minute phase change "$C^n(x, y, t, \theta)$" based on the received amplitude change information. The reliability of the minute phase change is reliability of the minute phase change that occurs in the pixel value of the image due to a physical phenomenon other than random noise. The reliability estimation unit 5a estimates the reliability so that the reliability of the minute phase change occurring in the pixel value of the image due to the random noise mixed in the image due to, for example, thermal noise of the image sensor is lower than the reliability of the minute phase change occurring in the pixel value of the image due to the physical phenomenon other than the random noise. The reliability estimation unit 5a outputs the estimated reliability to the multiplication unit 6a. The reliability estimated by the reliability estimation unit 5a in the present embodiment becomes higher when the amplitude change becomes larger.

The multiplication unit 6a receives the minute phase change information and the reliability. The multiplication unit 6a multiplies the received minute phase change information by the reliability for each pixel, and outputs a result of the multiplication (a multiplication result) to the change amount adjustment unit 7a. When the multiplication unit 6a multiplies the minute phase change information by the reliability, the minute phase change occurring in the pixel value of the image due to the physical phenomenon other than the random noise is detected with high accuracy.

The change amount adjustment unit 7a receives the multiplication result (the phase change multiplied by the reliability) output by the multiplication unit 6a. The change amount adjustment unit 7a executes video magnification for the received multiplication result of the multiplication unit 6a. That is, the change amount adjustment unit 7a adjusts an amount of minute phase change (motion change) multiplied by the reliability through emphasis or attenuation. Thus, the change amount adjustment unit 7a generates a luminance image in which the amount of minute motion change has been adjusted (hereinafter referred to as an "adjusted luminance image") for each resolution. The change amount adjustment unit 7a outputs multiple adjusted luminance images having different resolutions to the image reconstruction unit 8a.

The image reconstruction unit 8a (image combination unit) receives the multiple adjusted luminance images having different resolutions and the original-resolution color image. The image reconstruction unit 8a (image combination unit) reconstructs an image based on the received adjusted luminance image.

The image reconstruction unit 8a combines the reconstructed original-resolution luminance image and the original-resolution color image. The image reconstruction unit 8a outputs an image finally adjusted by using the video magnification as the combination result to a predetermined external device.

Next, the image processing apparatus 1a will be described in detail. The image input unit 2a acquires multiple frames of the moving image as the image processing target. The image input unit 2a generates, a original-resolution luminance image "$I(x, y, t)$" and a original-resolution color image from the multiple acquired frames. "x" represents an x-coordinate in the frame of the moving image (such as the luminance image or the like). "y" represents a y-coordinate in the frame of the moving image (such as the luminance image). "t" represents a time of a frame of a temporal moving image. The image input unit 2a outputs the original-resolution luminance image "$I(x, y, t)$" to the decomposition conversion unit 3a. The image input unit 2a outputs a original-resolution color image to the image reconstruction unit 8a.

The decomposition conversion unit 3a uses a complex phase filter (CSF) for a luminance change "$I(x, y, t)$" of a video at a certain place (x, y) and a certain time t of the received original-resolution luminance image to convert and decompose the luminance change "$I(x, y, t)$" of the video into an amplitude change "$A^n(x, y, t, \theta)$" and a phase change "$\varphi^n(x, y, t, \theta)$" in a certain resolution "n" and a certain direction "$\theta$", as in Equation (9) below. The parameter "n" indicates the resolution. In the present embodiment, the configuration using the CSF is shown, but the filter is not limited thereto. However, in the following embodiment, a case in which the CSF is used will be described.

$$\psi_\theta^n \otimes I(x, y, t) = A^n(x, y, t, \theta)e^{i\varphi^n(x,y,t,\theta)} \qquad (9)$$

Among the operators shown in Equation (9), an operator including a mark "x" in a mark "o" indicates a convolution operator, and "$\psi_\theta^n$" indicates a CSF at a certain resolution "n" and a certain direction "$\theta$."

The change detection unit 4a detects minute change in luminance in the generated luminance image having each resolution. The change detection unit 4a convolves a temporal filter "$H(t)$" having a frequency response with a minute change to be emphasized with respect to the phase change "$\varphi^n(x, y, t, \theta)$" for each direction in the video having each resolution obtained in the decomposition conversion unit 3a or multiplies the phase change by the spatiotemporal filter "$J(x, y, t)$" for removing large change to detect the minute phase change "$C^n(x, y, t, \theta)$" as in Equation (10) below. The change detection unit 4a may not multiply the phase change by the spatiotemporal filter "$J(x, y, t)$." That is, when the change detection unit 4a detects the minute phase change "$C^n(x, y, t, \theta)$", the change detection unit 4a may not use the spatiotemporal filter "$J(x, y, t)$."

$$C^n(x, y, t, \theta) = J(x, y, t) \circ (H(t) \otimes \phi^n(x, y, t, \theta)) \qquad (10)$$

The operator "o" in Equation (10) indicates multiplication (element product). H(t) indicates a bandpass filter, and "$J(x, y, t)$" is a jerk filter for the purpose of removing only abrupt change, which is a representative example. The filter used by the change detection unit 4a is not limited thereto.

The minute phase change "$C^n(x, y, t, \theta)$" obtained by the change detection unit 4a includes a "meaningful" minute phase change caused by a natural phenomenon or a physical phenomenon and a "meaningless" minute phase change derived from noise mixed in an imaging process like the random noise mixed in the image due to, for example, thermal noise of the image sensor shared as in Equation (11) below. The noise mixed in the imaging process is, for example, thermal noise, camera shake, ground vibration, or the like.

$$C^n(x, y, t, \theta) = \tilde{C}^n(x, y, t, \theta) + \check{C}^n(x, y, t, \theta) \tag{11}$$

In Equation (11), "$\hat{C}^n(x, y, t, \theta)$" indicates a "meaningful" minute phase change, and "$\sim C^n(x, y, t, \theta)$" indicates a "meaningless" minute phase change.

The reliability estimation unit 5a uses the amplitude change obtained by the change detection unit 4a to estimate the reliability of the minute phase change "$C^n(x, y, t, \theta)$." First, the amplitude change "$A^n(x, y, t, \theta)$" at a certain resolution n and a certain direction θ is integrated over multiple resolutions, as in Equation (12) below in order to consider a difference in the resolution of the amplitude change.

$$\tilde{A}^n(x, y, t, \theta) = \max_{-N_n \leq i \leq N_n}(Z(A^n(x, y, t, \theta)), res(Z(A^{n+i}(x, y, t, \theta)), n)) \tag{12}$$

In Equation (12), "$N^n$" determines how many resolutions are to be used for this integration. Further, "Z(A)" is a function for representing a z-transform for transforming a parameter "A" into a z-score. By using this function, it becomes possible to standardize and compare amplitude changes of different scales among multiple resolutions. "$res(A^{(n+i)}, n)$" is a function for resizing the amplitude change at resolution "n+i" (i is an integer equal to or greater than 1) to the resolution "n." A scheme regarding the standardization used in Z(A) or resizing used in "$res(A^{(n+i)}, n)$" is not limited thereto.

The reliability estimation unit 5a uses a result of Equation (12) in which the amplitude changes of multiple resolutions have been integrated, to estimate the reliability of the minute phase change that becomes higher when the amplitude change becomes larger, as in Equation (13) below.

$$HEAR_\sigma^n(x, y, t, \theta) = Norm(G_\sigma \otimes \tilde{A}^n(x, y, t, \theta)) \tag{13}$$

In Equation (13), "$HEAR_\sigma^n(x, y, t, \theta)$" indicates the reliability of the minute phase change, "$G_\sigma$" is a function for spatially smoothing "$\hat{A}^n(x, y, t, \theta)$", and the parameter "σ" is a parameter indicating the strength of smoothing. Further, "Norm (X)" indicates that a value of the argument "X" is normalized to a range from 0 to 1. A method of spatially smoothing the parameter "$G_\sigma$" and a method of normalization are not limited to specific methods. The reliability "$HEAR_\sigma^n(x, y, t, \theta)$" indicates reliability of the minute phase change in a region including the coordinates (x, y) in a range from 0 to 1. The reliability of the minute phase change becomes higher when the value becomes greater.

The multiplication unit 6a multiplies the minute phase change information by the reliability estimated by the reliability estimation unit 5a for each pixel. More specifically, the multiplication unit 6a multiplies the reliability "$HEAR_\sigma^n(x, y, t, \theta)$" shown in Equation (13) by "$C^n(x, y, t)$" shown in Equation (10), as in Equation (14) below.

$$\hat{C}^n(x, y, t, \theta) = HEAR_\sigma^n(x, y, t, \theta) \circ C^n(x, y, t, \theta) \tag{14}$$

According to Equation (14), the minute phase change "$\hat{C}^n(x, y, t)$" that occurs in the pixel value of the image due to the physical phenomenon other than the random noise is detected with high accuracy.

The change amount adjustment unit 7a multiplies the minute phase change "$\hat{C}^n(x, y, t)$" obtained using Equation (14) by the predetermined adjustment rate (emphasis rate) "α." That is, the change amount adjustment unit 7a multiplies the minute phase change "$\hat{C}^n(x, y, t)$" obtained with high accuracy as in Equation (14) by the predetermined adjustment rate (emphasis rate) "α", as in Equation (15) below. The change amount adjustment unit 7a adds an original phase change "$\varphi^n(x, y, t, \theta)$" to the multiplication result to derive a phase change "$\hat{\varphi}^n(x, y, t, \theta)$" in which the amount of gentle and minute phase change has been adjusted (for example, emphasized or attenuated), as in Equation (15).

$$\hat{\varphi}^n(x, y, t, \theta) = \varphi^n(x, y, t, \theta) + \alpha \cdot \hat{C}^n(x, y, t, \theta) \tag{15}$$

By doing this, the change amount adjustment unit 7a adjusts the amount of change of the detected subtle phase change. The adjustment rate may be the same or different for each resolution, direction, time, or position.

When the subtle phase change is emphasized, the predetermined adjustment rate "α" is a positive value larger than 0. When the subtle phase change is attenuated, the predetermined adjustment rate "α" is a negative value smaller than 0. An upper limit value and a lower limit value of "α" may not be specifically determined. However, for example, when the minute phase change is attenuated, a value of the predetermined adjustment rate "α" in a case in which a value of the original phase change "$\varphi^n(x, y, t)$" becomes 0 is set as the lower limit value of "α." When "α" is set to 0, the subtle phase change is not adjusted.

The image reconstruction unit 8a solves Equation (15) for each resolution and direction. The image reconstruction unit 8a applies the inverse filter of the CSF to the adjusted phase change "$\hat{\varphi}^n(x, y, t, \theta)$" obtained for each resolution and direction to perform conversion to luminance information in which the minute motion change has been emphasized. Thereafter, it is possible to obtain a final video output through addition to a color video.

The image reconstruction unit 8a (image combination unit) reconstructs an image. The image reconstruction unit 8a acquires the multiple adjusted luminance images having different resolutions from the change amount adjustment unit 7a. The image reconstruction unit 8a combines the multiple adjusted luminance images having different resolutions to reconstruct the original-resolution luminance image. Specifically, the image reconstruction unit 8a performs conversion to the multiple adjusted luminance images having different resolutions and the luminance information in which the minute motion change has been emphasized by applying the inverse filter of the CSF for each direction, and combination to reconstruct the original-resolution luminance image.

The image reconstruction unit 8a acquires the original-resolution color image from the image input unit 2a. The image reconstruction unit 8a combines the reconstructed original-resolution luminance image and the original-resolution color image. The image reconstruction unit 8a outputs an image finally adjusted by using the video magnification as the combination result to a predetermined external device.

The image reconstruction unit 8a combines the original-resolution image in which the color or luminance change has been emphasized with the reconstructed original-resolution luminance image. For example, the image reconstruction unit 8a generates an average image of the original-resolution image in which the color or luminance change has been emphasized and the reconstructed original-resolution luminance image.

Figure 8:
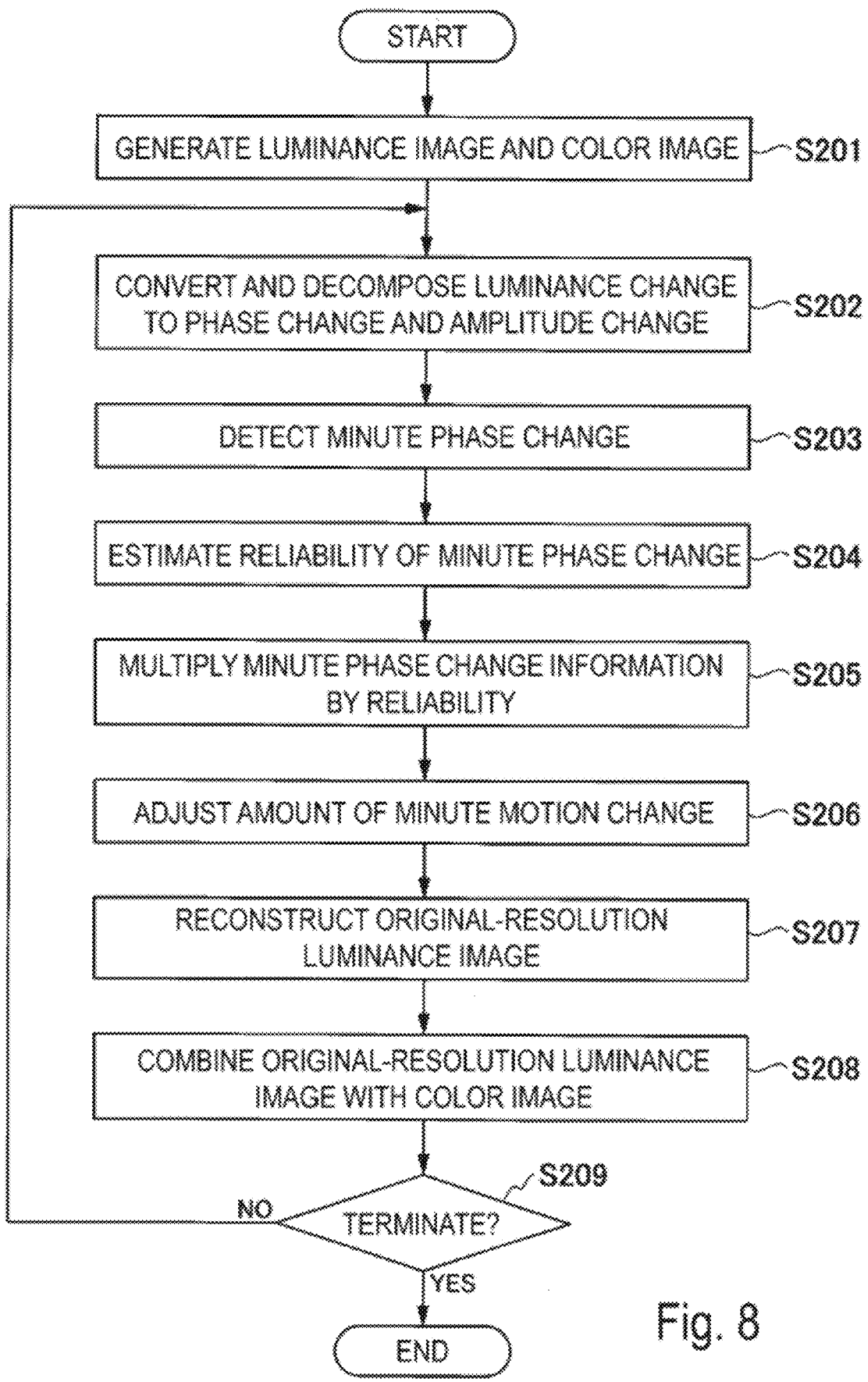
FIG. 8 is a flowchart illustrating an operation example of the image processing apparatus according to the second embodiment.

Next, an operation example of the image processing apparatus 1a will be described. FIG. 8 is a flowchart illustrating an operation example of the image processing apparatus 1a according to the second embodiment. The image input unit 2a generates the luminance images and the color images from the multiple frames of the moving image (step S201). The image input unit 2a outputs the original-resolution luminance image to the decomposition conversion unit 3a. The image input unit 2a outputs a original-resolution color image to the image reconstruction unit 8a. The decomposition conversion unit 3a converts the luminance change to a phase conversion and an amplitude change based on the original-resolution luminance image output from the image input unit 2a, and decomposes the luminance image into multiple resolutions (step S202). The decomposition conversion unit 3a outputs the phase change information of each resolution to the change detection unit 4a. The decomposition conversion unit 3a outputs the amplitude change information of each resolution to the reliability estimation unit 5a.

The change detection unit 4a detects a minute change in the luminance in the luminance image having each resolution based on the phase change information output from the decomposition conversion unit 3a (step S203). The change detection unit 4a outputs minute phase change information of each resolution to the multiplication unit 6a. The reliability estimation unit 5a estimates the reliability "$HEAR_\sigma''$ (x, y, t, θ)" of the minute phase change "$C''(x, y, t)$" based on the amplitude change information output from the decomposition conversion unit 3a (step S204). The reliability estimation unit 5a outputs the estimated reliability "$HEAR_\sigma''(x, y, t, θ)$" to the multiplication unit 6a.

The multiplication unit 6a multiplies the minute phase change information output from the change detection unit 4a by the reliability "$HEAR_\sigma''(x, y, t, θ)$" output from the reliability estimation unit 5a (step S205). The multiplication unit 6a outputs a multiplication result to the change amount adjustment unit 7a. The change amount adjustment unit 7a uses the multiplication result output from the multiplication unit 6a to adjust the amount of minute motion change multiplied by the reliability through emphasis or attenuation (step S206). The change amount adjustment unit 7a outputs information on the amount of motion change to the image reconstruction unit 8a. The image reconstruction unit 8a reconstructs the original-resolution luminance image based on the multiple adjusted luminance images having different resolutions (step S207). The image reconstruction unit 8a combines the reconstructed original-resolution luminance image with the original-resolution color image (step S208).

The decomposition conversion unit 3a determines whether or not the image processing apparatus 1a terminates the processing based on, for example, an instruction obtained from the user (step S209). In accordance with a determination that the image processing apparatus 1a continues the processing (step S209: NO), each functional unit of the image processing apparatus 1a returns the processing to step S202. In accordance with a determination that the image processing apparatus 1a ends the processing (step S209: YES), each functional unit of the image processing apparatus 1a terminates the processing.

As described above, the image processing apparatus 1a of the second embodiment includes the change detection unit 4a and the reliability estimation unit 5a. The change detection unit 4a detects a predetermined amount of phase change among the phase changes in the luminance image having multiple resolutions. The reliability estimation unit 5a estimates the reliability "$HEAR_\sigma''(x, y, t, θ)$" of the detected phase change.

This makes it possible for the image processing apparatus 1a to more accurately detect a "meaningful" minute phase change among the detected minute changes in the video. Thus, the image processing apparatus 1a can adjust the amount of change in the "meaningful" minute phase change. Thus, the image processing apparatus 1a can reduce the adjustment of the random noise mixed in the moving image when adjusting the amount of minute motion change of the moving image.

Figure 9:
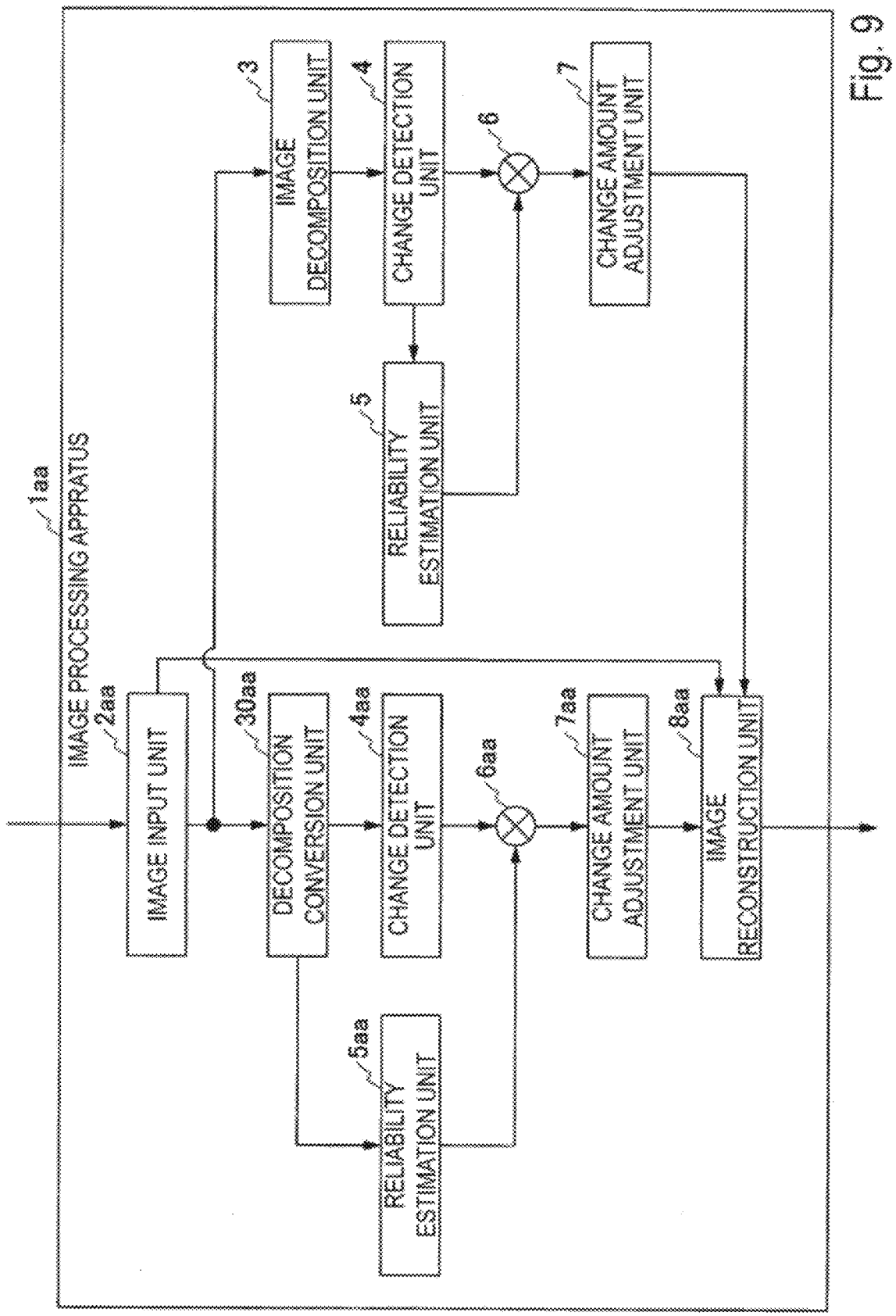
FIG. 9 is a diagram illustrating a configuration example of the image processing apparatus according to the second embodiment.

The image processing apparatus according to the second embodiment may be configured to execute a process of adjusting the amount of minute color or luminance change, which is executed by the image processing apparatus 1 according to the first embodiment, and a process of adjusting a specific minute motion change of the subject, which has been described in the second embodiment, in parallel. FIG. 9 illustrates a configuration in the case of such a configuration. FIG. 9 is a diagram illustrating a configuration example of the image processing apparatus 1aa according to the second embodiment. The image processing apparatus 1aa includes an image input unit 2aa, a decomposition conversion unit 30aa, a change detection unit 4aa, a reliability estimation unit 5aa, a multiplication unit 6aa, a change amount adjustment unit 7aa, an image reconstruction unit 8aa, an image decomposition unit 3, a change detection unit 4, a reliability estimation unit 5, a multiplication unit 6, and a change amount adjustment unit 7.

The image processing apparatus 1aa executes the first image processing and the second image processing in parallel. The image processing apparatus 1aa executes the first image processing for the moving image to emphasize or attenuate minute color or luminance change of the subject. In the first image processing executed by the image processing apparatus 1aa, the image input unit 2aa, the image decomposition unit 3, the change detection unit 4, the reliability estimation unit 5, the multiplication unit 6, the change amount adjustment unit 7, and the image reconstruction unit 8aa execute the same processing as those of the respective functional units of the image processing apparatus 1 in the first embodiment.

The image processing apparatus 1aa executes the second image processing for the moving image to emphasize or attenuate the minute motion change of the subject. In the second image processing executed by the image processing apparatus 1aa, the image input unit 2aa, the decomposition conversion unit 30aa, the change detection unit 4aa, the reliability estimation unit 5aa, the multiplication unit 6aa, the change amount adjustment unit 7aa, and the image reconstruction unit 8aa execute the same processing as those of the functional units having the same names illustrated in FIG. 7.

The image reconstruction unit 8aa acquires multiple images having different resolutions from the change amount adjustment unit 7aa. The image reconstruction unit 8aa combines the multiple images having different resolutions to reconstruct an original-resolution luminance image. The image reconstruction unit 8aa may acquire an original-resolution color image from the image input unit 2aa. The image reconstruction unit 8aa may combine the reconstructed original-resolution luminance image with the original-resolution color image.

The image reconstruction unit 8aa acquires the original-resolution image in which the color or luminance change has been emphasized from the change amount adjustment unit 7. The image reconstruction unit 8aa combines the original-resolution image in which the color or luminance change has been emphasized with the reconstructed original-resolution luminance image. For example, the image reconstruction unit 8aa generates an average image of the original-resolution image in which the color or luminance change has been emphasized and the reconstructed original-resolution luminance image.

Third Embodiment

A third embodiment differs from the first embodiment and the second embodiment in that the image processing apparatus emphasizes or attenuates the minute motion change based on the reliability obtained based on the temporal behavior of the minute phase change, in addition to the specific minute color or luminance change of the subject. In the third embodiment, differences from the first and second embodiments will be described.

Figure 10:
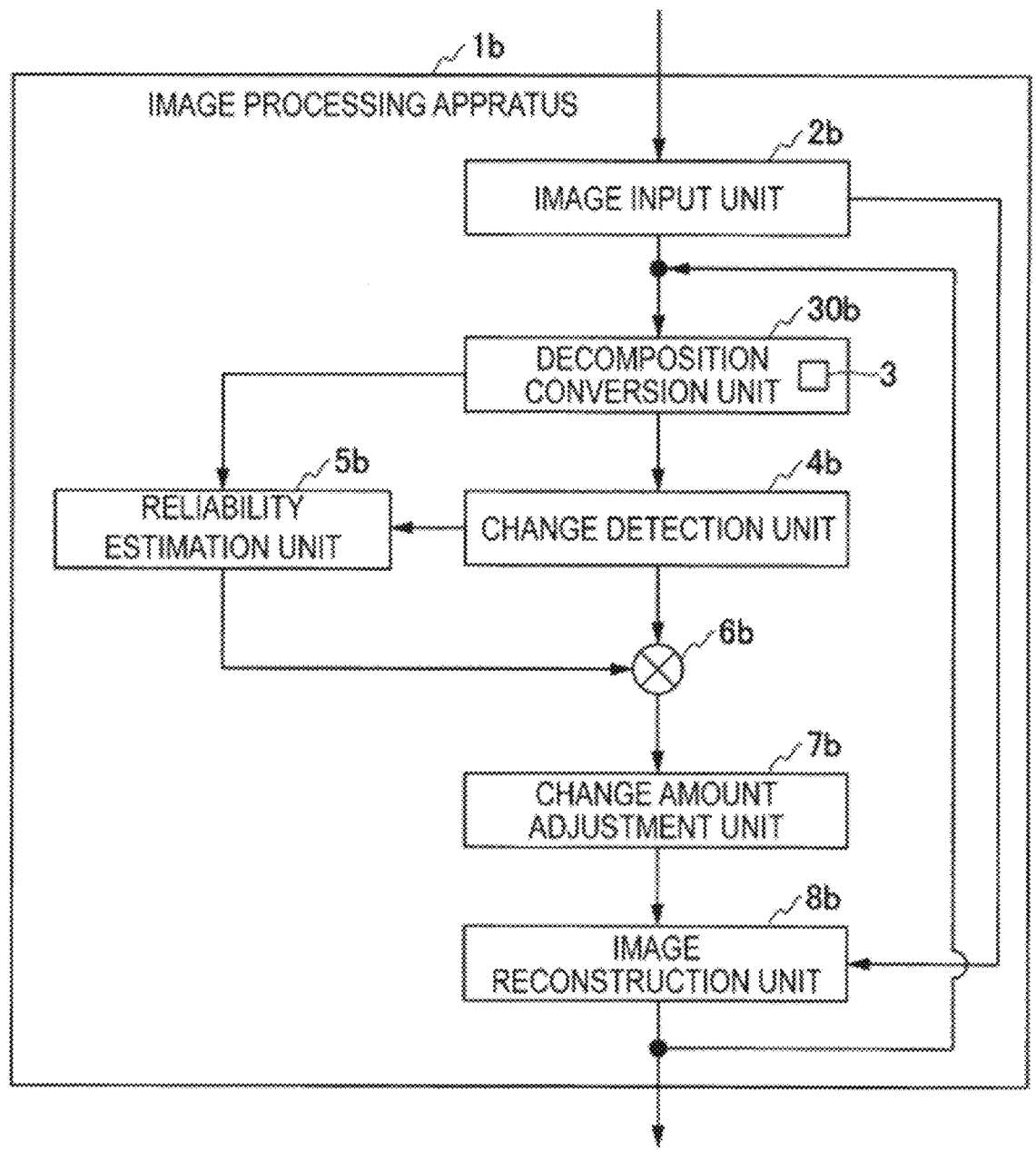
FIG. 10 is a diagram illustrating a configuration example of an image processing apparatus according to a third embodiment.

FIG. 10 is a diagram illustrating a configuration example of an image processing apparatus 1b according to third embodiment. The image processing apparatus 1b is an apparatus that executes a predetermined image processing on a moving image. The image processing apparatus 1b executes predetermined image processing on the moving image to emphasize or attenuate a specific minute color or luminance change of the subject and a specific minute motion change of the subject.

The image processing apparatus 1b includes an image input unit 2b, a decomposition conversion unit 30b, a change detection unit 4b, a reliability estimation unit 5b, a multiplication unit 6b, a change amount adjustment unit 7b, and an image reconstruction unit 8b. The decomposition conversion unit 30b includes an image decomposition unit 3.

In the third embodiment, the image processing apparatus 1b sequentially executes first image processing and second image processing. That is, the image processing apparatus 1b executes the first image processing on the moving image, and further executes the second image processing on the moving image. An execution order of the first image processing and the second image processing may be reversed.

In the first image processing, each functional unit of the image processing apparatus 1b executes the same processing as each functional unit of the image processing apparatus 1 of the first embodiment. That is, the image processing apparatus 1b executes the first image processing on the moving image to emphasize or attenuate a specific minute color or luminance change of the subject.

The image processing apparatus 1b executes the second image processing on the moving image to emphasize or attenuate the specific minute motion change of the subject based on the reliability obtained based on the temporal behavior of the minute phase change In the second image processing, the adjustment rate "α" of the phase change is 0.

Next, a process of emphasizing or attenuating the specific minute motion change of the subject based on the reliability obtained based on the temporal behavior of the minute phase change will be described.

Figure 11:
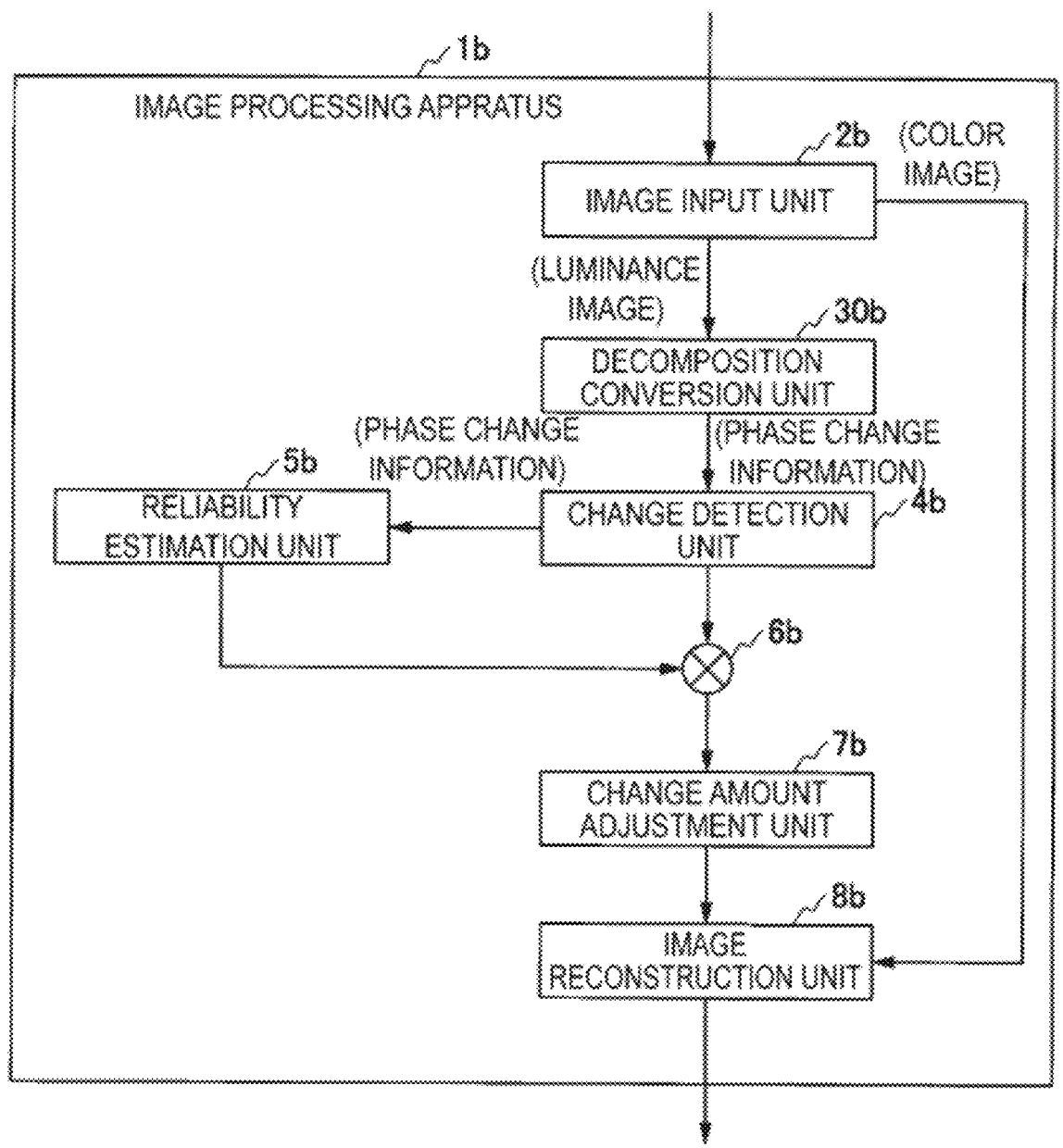
FIG. 11 is a diagram illustrating a configuration example of each functional unit that emphasizes or attenuates specific minute motion change of a subject in the third embodiment.

FIG. 11 is a diagram illustrating a configuration example of each functional unit that emphasizes or attenuates the specific minute motion change of the subject in the third embodiment. The image processing apparatus 1b includes an image input unit 2b, a decomposition conversion unit 30b, a change detection unit 4b, a reliability estimation unit 5b, a multiplication unit 6b, a change amount adjustment unit 7b, and an image reconstruction unit 8b, as respective functional units that emphasize or attenuate a specific minute motion change of a subject in the third embodiment.

The image input unit 2b receives multiple frames of the moving image as the image processing target. The image input unit 2b generates the luminance images and the color images for each frame from the multiple frames of the input moving image. The image input unit 2b outputs an original-resolution luminance image that is an image processing target to the decomposition conversion unit 30b. The image input unit 2b outputs an original-resolution color image that is an image processing target to the image reconstruction unit 8b.

The decomposition conversion unit 30b receives the original-resolution luminance image. The decomposition conversion unit 30b converts luminance change of a pixel at the coordinates (x, y) in the original-resolution luminance image at time t of the received moving image to a phase change and amplitude change of each piece of luminance information in multiple directions determined in advance and decomposes the moving image into different resolutions. The decomposition conversion unit 30b outputs information indicating the phase change of each piece of luminance information in the multiple directions determined in advance as phase change information to the change detection unit 4b.

Figure 12:
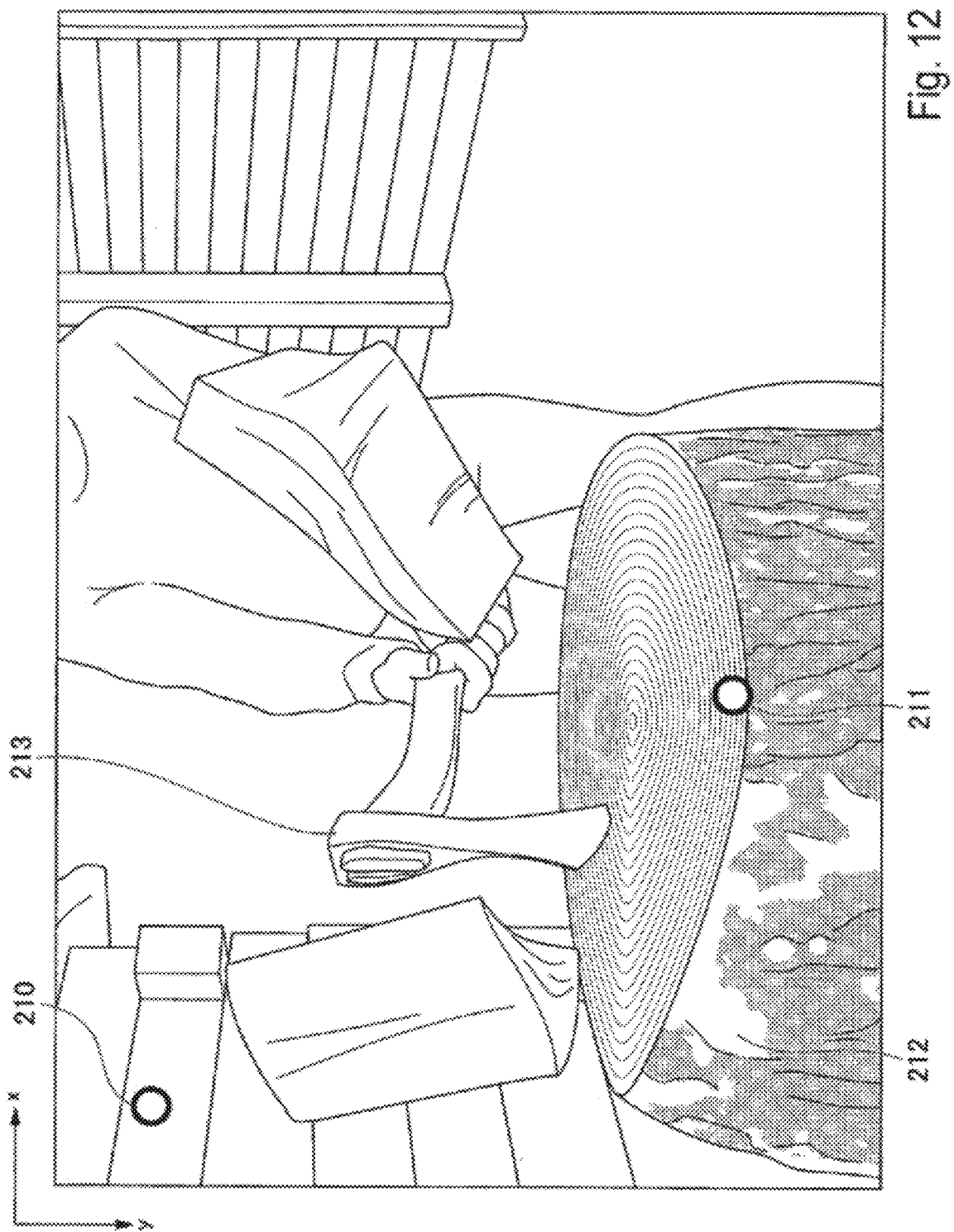
FIG. 12 is a diagram illustrating an example of pixels in a frame of a moving image in the third embodiment.

FIG. 12 is a diagram illustrating an example of pixels in a frame of a moving image. Hereinafter, an x-coordinate in a horizontal direction and a y-coordinate in a vertical direction are determined in the frame of the moving image. In the frame illustrated in FIG. 12, an operation of an ax being lowered onto a stump (an operation of chopping wood) is imaged. The frame illustrated in FIG. 12 includes a pixel 210, a pixel 211, a stump image 212, and an ax image 213. The pixel 210 is a pixel included in an image of a wall captured in a first partial region of a frame. The pixel 211 is a pixel included in the stump image 212 captured in a second partial region of the frame.

Figure 13:
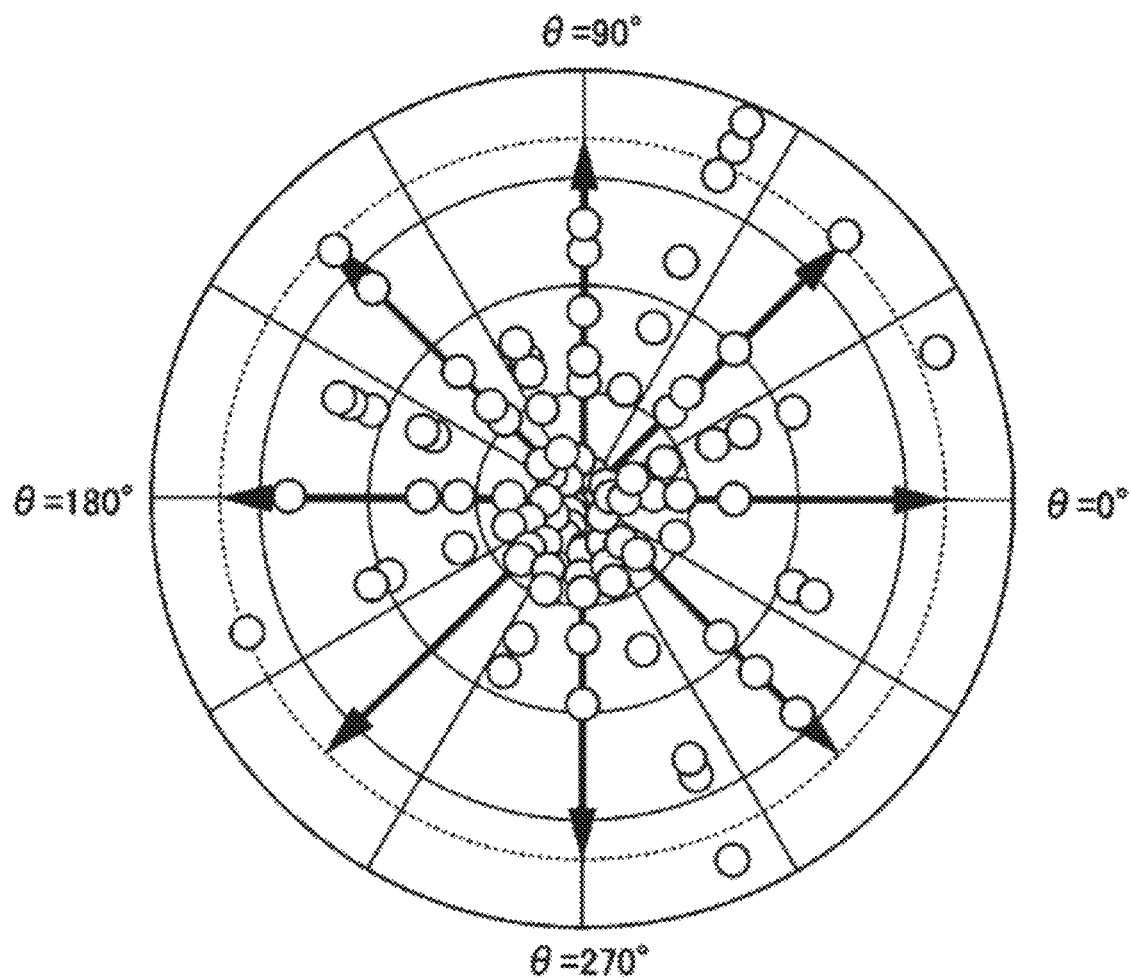
FIG. 13 is a diagram illustrating isotropic diffusion of minute phase changes in the third embodiment.

FIG. 13 is a diagram illustrating isotropic diffusion of the minute phase change. The minute phase change illustrated in FIG. 13 is a minute phase change in luminance information of the pixel 210. A distance from an origin of a graph illustrated in FIG. 13 indicates an amount of phase change of the luminance information of the pixel 210. In FIG. 13, a predetermined spatial direction "θ" is, for example, an angle (0.0°, 22.5°, 45.0°, 67.5°, 90.0°, . . . ) at an interval of 22.5°.

The meaningless minute phase change is isotropic diffusion, as in the example illustrated in FIG. 13. The amount of phase change changes, for example, like "0.2" in a direction of "θ=90 degrees" at time t1 and "0.2" in a direction of "θ=67.5 degrees" at time t2.

Figure 14:
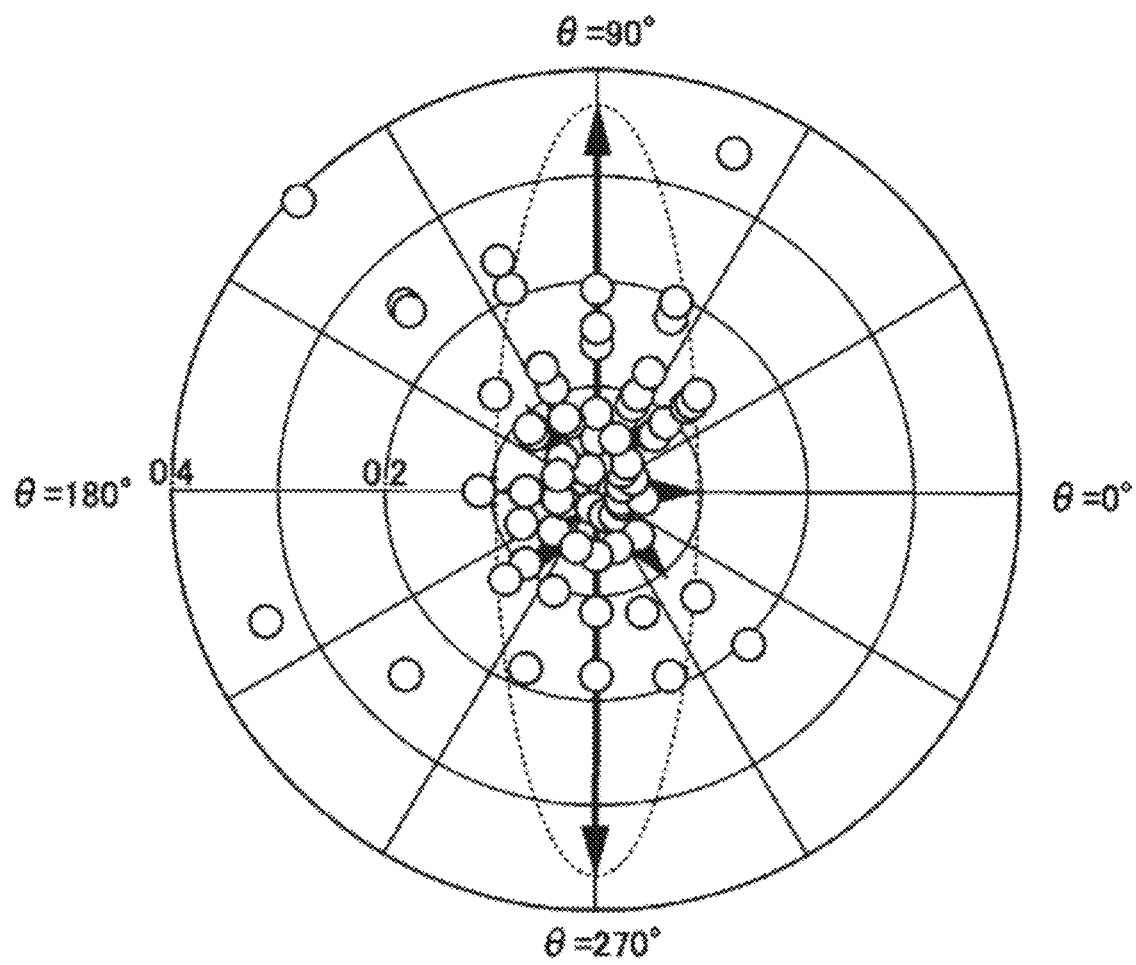
FIG. 14 is a diagram illustrating anisotropic diffusion of minute phase changes in the third embodiment.

FIG. 14 is a diagram illustrating anisotropic diffusion of the minute phase change. The minute phase change illustrated in FIG. 14 is a minute phase change in the luminance information of the pixel 211. A distance from an origin of a graph illustrated in FIG. 14 indicates an amount of phase change of the luminance information of the pixel 211. In FIG. 14, a predetermined spatial direction "θ" is, for example, an angle (0.0°, 22.5°, 45.0°, 67.5°, 90.0°, . . . ) at an interval of 22.5°.

In a time zone "(−)t" including time t, a meaningful minute phase change occurs in a spatial direction of a small number of axe among multiple axes in the spatial direction. In FIG. 14, a variance is large with respect to an axis (y-axis) of, for example, "θ=90°" among "θ" in the spatial direction. The meaningful minute phase change is anisotropic diffusion, as in the example illustrated in FIG. 14. The amount of meaningful minute phase change changes so that the time distribution is biased in a specific direction.

In a meaningful motion, spatial directions θ of the phase changes are close to each other at a specific time within a unit time. For example, in a vibration in a vertical direction of the stump collided with the ax, the spatial directions θ of the phase changes become, for example, 90 degrees at specific times (t1, t2, . . . ) according to a vibration period.

Referring back to FIG. 11, description of a configuration example of the image processing apparatus 1b will be continued. The change detection unit 4b receives the phase change information. The change detection unit 4b detects the minute phase change "C″(x, y, t, θ)" in the luminance image having each resolution based on the received phase change information. The change detection unit 4b outputs minute phase change information that is information indicating the minute phase change in the detected luminance image to the reliability estimation unit 5b and the multiplication unit 6b for each resolution.

The reliability estimation unit 5b receives the minute phase change information. The reliability estimation unit 5b estimates the reliability of the minute phase change "C″(x, y, t, θ)" based on the received minute phase change information. The reliability estimation unit 5b estimates the reliability so that the reliability of the minute phase change occurring in the pixel value of the image due to the random noise mixed in the image due to, for example, thermal noise of the image sensor is lower than the reliability of the minute phase change occurring in the pixel value of the image due to the physical phenomenon other than the random noise. The reliability estimation unit 5b outputs the estimated reliability to the multiplication unit 6b.

The reliability estimated by the reliability estimation unit 5b in the present embodiment has a higher value when the temporal behavior of the minute phase change "C″(x, y, t, θ)" shows higher correlation between neighboring regions. That is, the reliability estimated by the reliability estimation unit 5b in the present embodiment has a higher value when the time distribution of the minute phase change shows anisotropy. In other words, the reliability estimated by the reliability estimation unit 5b in the present embodiment has a higher value when the diffusion result shows anisotropy.

The multiplication unit 6b receives the minute phase change information and the reliability. The multiplication unit 6b multiplies the received minute phase change information by the reliability for each pixel, and outputs a result of the multiplication (a multiplication result) to the change amount adjustment unit 7b. When the multiplication unit 6b multiplies the minute phase change information by the reliability, the minute phase change "^C″(x, y, t, θ)" occurring in the pixel value of the image due to the physical phenomenon other than the random noise is detected with high accuracy.

The change amount adjustment unit 7b receives the multiplication result (the phase change multiplied by the reliability) output by the multiplication unit 6b. The change amount adjustment unit 7b executes video magnification for the received multiplication result of the multiplication unit 6b. That is, the change amount adjustment unit 7b adjusts an amount of minute phase change (motion change) multiplied by the reliability through emphasis or attenuation. Thus, the change amount adjustment unit 7b generates a luminance image in which the amount of minute motion change has been adjusted (hereinafter referred to as an "adjusted luminance image") for each resolution. The change amount adjustment unit 7b outputs multiple adjusted luminance images having different resolutions to the image reconstruction unit 8b.

The image reconstruction unit 8b (image combination unit) receives the multiple adjusted luminance images having different resolutions and the original-resolution color image. The image reconstruction unit 8b (image combination unit) reconstructs an image based on the received adjusted luminance image. Specifically, the image reconstruction unit 8b performs conversion to the multiple adjusted luminance images having different resolutions and the luminance information in which the minute motion change has been emphasized by applying an inverse filter of the CSF for each direction, and combination to reconstruct the original-resolution luminance image.

The image reconstruction unit 8b combines the reconstructed original-resolution luminance image and the original-resolution color image. The image reconstruction unit 8b outputs an image finally adjusted by using the video magnification as the combination result to a predetermined external device.

Next, the image processing apparatus 1b will be described in detail. The image input unit 2b acquires multiple frames of the moving image as the image processing target. The image input unit 2b generates, a original-resolution luminance image "I(x, y, t)" and a original-resolution color image from the multiple acquired frames. The image input unit 2b outputs the original-resolution luminance image "I(x, y, t)" to the decomposition conversion unit 3b. The image input unit 2b outputs a original-resolution color image to the image reconstruction unit 8b.

The decomposition conversion unit 3b uses a CSF for a luminance change "I(x, y, t)" of a video at a certain place (x, y) and a certain time t of the received original-resolution luminance image to convert and decompose the luminance change "I(x, y, t)" of the video into an amplitude change "A″(x, y, t, θ)" and a phase change "φ″(x, y, t, θ)" in a certain resolution "n" and a certain direction (θ), as in Equation (9) above.

The change detection unit 4b detects minute change in luminance in the generated luminance image having each resolution. The change detection unit 4b convolves a temporal filter "H(t)" having a frequency response with a minute change to be emphasized with respect to the phase change "φ″(x, y, t, θ)" for each direction in the video having each resolution obtained in the decomposition conversion unit 3b or multiplies the phase change by the spatiotemporal filter "J(x, y, t)" for removing large change to detect the minute phase change "C″(x, y, t, θ)" as in Equation (10) above. The change detection unit 4b may not multiply the phase change by the spatiotemporal filter "J(x, y, t)." That is, when the change detection unit 4b detects the minute phase change "C″(x, y, t, θ)", the change detection unit 4b may not use the spatiotemporal filter "J(x, y, t)."

The minute phase change "$C^n(x, y, t, \theta)$" obtained by the change detection unit 4b includes a "meaningful" minute phase change caused by a natural phenomenon or a physical phenomenon and a "meaningless" minute phase change derived from noise mixed in an imaging process like the random noise mixed in the image due to, for example, thermal noise of the image sensor shared as in Equation (3) above. The noise mixed in the imaging process is, for example, thermal noise, camera shake, ground vibration, or the like.

The reliability estimation unit 5b uses the minute phase change "$C^n(x, y, t, \theta)$" obtained by the decomposition conversion unit 30b to estimate the reliability of the minute phase change "$C^n(x, y, t, \theta)$." Specifically, the reliability estimation unit 5b evaluates a temporal behavior (time distribution) of the minute phase change "$C^n(x, y, t, \theta)$" obtained by the change detection unit 4b to estimate the reliability of the minute phase change. Considering a video region $(-)x \in R^{(h \times w)} = R^d$ around a certain place (x, y) and a time width "(-)t" around a certain time t with respect to the minute phase change "$C^n(x, y, t, \theta)$" output from the change detection unit 4b, a diffusion equation regarding the minute phase change "$C^n(x, y, t, \theta)$" can be formulated as in Equation (16) below while noting that the phase change depends on the direction $\theta$.

$$f(C^n(\bar{x}, \bar{t}, \theta)) = \frac{1}{(2\pi)^{d/2}|D|^{1/2}} \exp\left(-\frac{1}{2} C^n(\theta)^T D^{-1} C^n(\theta)\right) \quad (16)$$

In Equation (16), "$f(C^n((-)x, (-)t, \theta))$" indicates the time distribution of the minute phase change, and "D" indicates a diffusion tensor matrix in a time width "(-)t." Assuming that similar phase changes occur within the time width "(-)t" in the video region "(-)x", when these changes can be summarized as a spatiotemporal data sample "s", Equation (16) can be changed as in Equation (17) below.

$$f(C^n(\theta, s)) = \frac{3}{(2\pi)^{d/2}|D|^{1/2}} \exp\left(-\frac{1}{2} C^n(\theta)^T D^{-1} C^n(\theta)\right) \quad (17)$$

From Equation (17) above, the diffusion tensor matrix can be obtained as in Equation (18) below.

$$D = \text{cov}(C^n(\theta, s)) \quad (18)$$

In Equation (18), "cov(X)" means that a variance-covariance matrix of an X matrix is calculated. Thereafter, the reliability estimation unit 5b performs eigenvalue decomposition on "D" to obtain a fractional anisotropy (hereinafter referred to as "FA"), which is a feature quantity regarding the time distribution of the minute phase change, from Equation (19) below.

$$FA^n(x, y, t) = \sqrt{\frac{d}{d-1}} \cdot \frac{\sqrt{\sum_{i=1}^{n}(\lambda_i - \bar{\lambda})^2}}{\sqrt{\sum_{i=1}^{n} \lambda_i^2}} \quad (19)$$

In Equation (19), $(\lambda_1, \ldots, \lambda_d)$ is an eigenvalue of "D", and "$(-)\lambda$" is an average thereof. "FA" is a feature quantity having "1" when the time distribution indicates anisotropy and "0" when the time distribution indicates isotropy. The "meaningful" minute phase change caused by a natural phenomenon or physical phenomenon has a biased time distribution in a specific direction and has high anisotropy. Thus, the "meaningful" minute phase change indicates a FA value close to "1." On the other hand, the "meaningless" minute phase change derived from noise mixed during the imaging process has a time distribution diffused in random directions, has low anisotropy, and has high isotropy. Thus, the "meaningless" minute phase change has an FA value close to "0." Thus, the reliability estimation unit 5b estimates the reliability of the minute phase change based on Equation (20) below using the FA.

$$FAF^n_{\sigma,\gamma}(x, y, t) = (\text{Norm}(G_\sigma \otimes FA^n(x, y, t)))^\gamma \quad (20)$$

In Equation (20), "$FAF^n_{\sigma,\gamma}(x, y, t)$" is the spatiotemporal filter indicating the reliability of the minute phase change, "$G_\sigma$" is a function for spatially smoothing "$FAF^n_{\sigma,\gamma}(x, y, t)$", and the parameter "$\sigma$" is a parameter indicating the strength of smoothing. Further, "Norm (X)" indicates that a value of the argument "X" is normalized to a range from 0 to 1. A method of spatially smoothing the parameter "$G_\sigma$" and a method of normalization are not limited to specific methods. The reliability "$FAF^n_{\sigma,\gamma}(x, y, t)$" indicates reliability of the minute phase change in a region including the coordinates (x, y) in a range from 0 to 1. The reliability of the minute phase change becomes higher when the value becomes greater.

The multiplication unit 6b multiplies the minute phase change information by the reliability estimated by the reliability estimation unit 5b for each pixel. More specifically, the multiplication unit 6b multiplies the reliability "$FAF^n_{\sigma,\gamma}(x, y, t)$" shown in Equation (20) by "$C^n(x, y, t)$" shown in Equation (10), as in Equation (21) below.

$$\hat{C}^n(x, y, t, \theta) = FAF^n_{\sigma,\gamma}(x, y, t) \circ C^n(x, y, t, \theta) \quad (21)$$

According to Equation (21), the minute phase change "$\hat{C}^n(x, y, t)$" that occurs in the pixel value of the image due to the physical phenomenon other than the random noise is detected with high accuracy.

The change amount adjustment unit 7b multiplies the minute phase change "$\hat{C}^n(x, y, t)$" obtained using Equation (21) by the predetermined adjustment rate (emphasis rate) "$\alpha$." That is, the change amount adjustment unit 7b multiplies the minute phase change "$\hat{C}^n(x, y, t)$" derived with high accuracy as in Equation (21) by the predetermined adjustment rate (emphasis rate) "$\alpha$" as in Equation (22) below. The change amount adjustment unit 7b adds the original phase change "$\varphi^n(x, y, t, \theta)$" to a result of the multiplication to derive the phase change "$\hat{\varphi}^n(x, y, t, \theta)$" in which the amount of gentle and minute phase change has been adjusted (for example, emphasized or attenuated), as in Equation (22).

$$\hat{\varphi}^n(x, y, t, \theta) = \varphi^n(x, y, t, \theta) + \alpha \cdot \hat{C}^n(x, y, t, \theta) \quad (22)$$

Thus, the change amount adjustment unit 7b adjusts an amount of detected minute phase change. The adjustment rate may be the same or different for each resolution, direction, time, or position.

The image reconstruction unit 8b solves Equation (22) for each resolution and direction. The image reconstruction unit 8b applies a CSF inverse filter to the adjusted phase change "$\varphi''(x, y, t, \theta)$" obtained for each resolution and direction to perform conversion to luminance information in which the minute motion change has been emphasized. Thereafter, it is possible to obtain a final video output through addition to a color video.

The image reconstruction unit 8b (image combination unit) reconstructs an image. The image reconstruction unit 8b acquires the multiple adjusted luminance images having different resolutions from the change amount adjustment unit 7b. The image reconstruction unit 8b combines the multiple adjusted luminance images having different resolutions to reconstruct the original-resolution luminance image.

The image reconstruction unit 8b acquires the original-resolution color image from the image input unit 2. The image reconstruction unit 8b combines the reconstructed original-resolution luminance image and the original-resolution color image. The image reconstruction unit 8b outputs an image finally adjusted by using the video magnification as the combination result to a predetermined external device.

Figure 15:
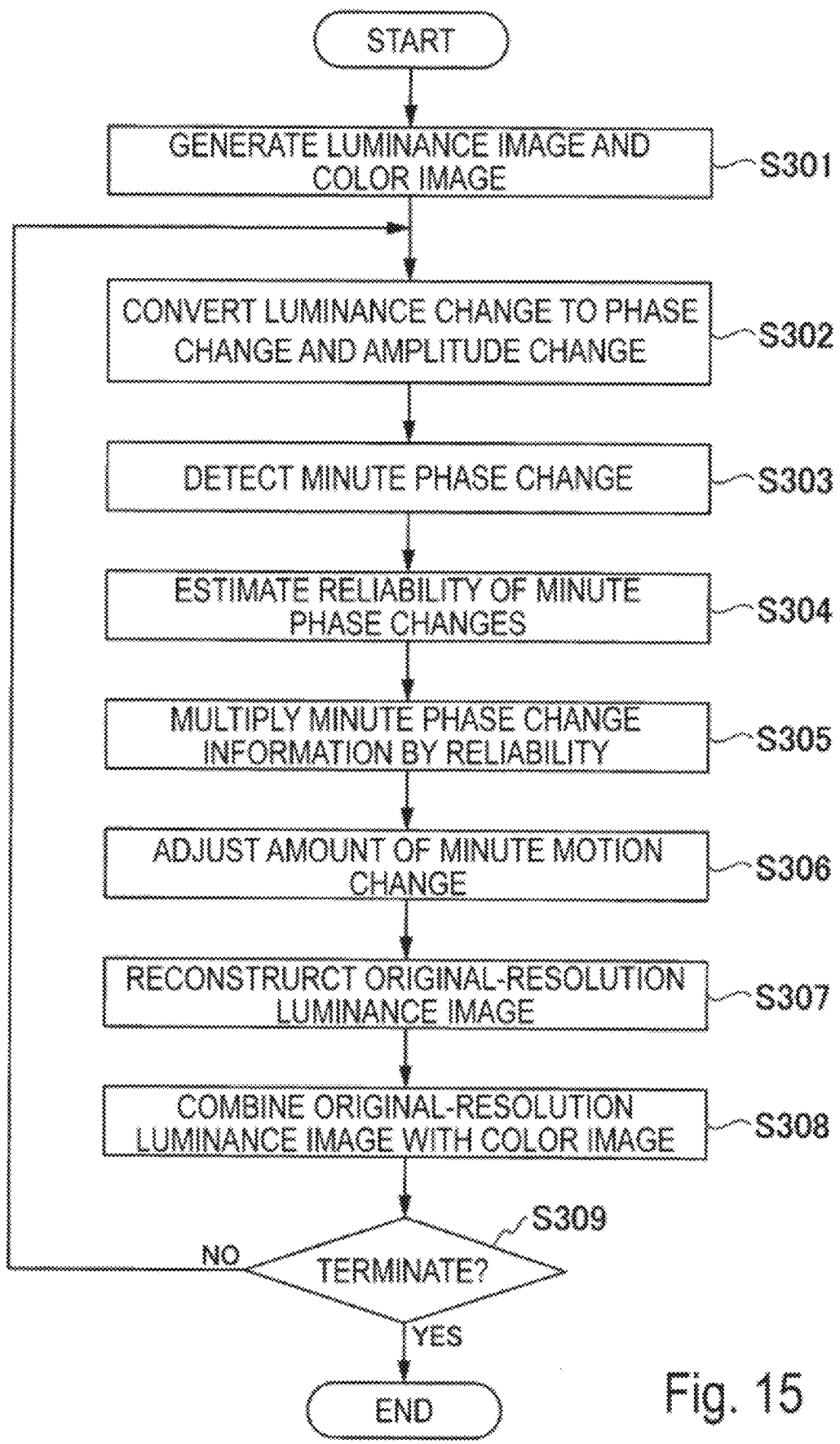
FIG. 15 is a flowchart illustrating an operation example of the image processing apparatus according to the third embodiment.

Next, an operation example of the image processing apparatus 1b will be described. FIG. 15 is a flowchart illustrating an operation example of the image processing apparatus 1b according to the third embodiment. The image input unit 2b generates the luminance images and the color images from the multiple frames of the moving image (step S301). The image input unit 2b outputs a original-resolution luminance image to the decomposition conversion unit 3b. The image input unit 2b outputs a original-resolution color image to the image reconstruction unit 8b. The decomposition conversion unit 3b converts the luminance change to a phase conversion and an amplitude change based on the original-resolution luminance image output from the image input unit 2b, and decomposes the luminance image into multiple resolutions (step S302). The decomposition conversion unit 3b outputs the phase change information of each resolution to the change detection unit 4b.

The change detection unit 4b detects a minute change in the luminance in the luminance image having each resolution based on the phase change information output from the decomposition conversion unit 3b (step S303). The change detection unit 4b outputs minute phase change information of each resolution to the multiplication unit 6b.

The reliability estimation unit 5b estimates the reliability "$FAF_{o,y}''(x, y, t)$" of the minute phase change "$C''(x, y, t)$" based on the phase change information output from the decomposition conversion unit 3b (step S304). The reliability estimation unit 5b outputs the estimated reliability "$FAF_{o,y}''(x, y, t)$" to the multiplication unit 6b.

The multiplication unit 6b multiplies the minute phase change information output from the change detection unit 4b by the reliability "$FAF_{o,y}''(x, y, t)$" output from the reliability estimation unit 5b (step S305). The multiplication unit 6b outputs a multiplication result to the change amount adjustment unit 7b. The change amount adjustment unit 7b uses the multiplication result output from the multiplication unit 6b to adjust the amount of minute motion change multiplied by the reliability through emphasis or attenuation (step S306). The change amount adjustment unit 7b outputs information on the amount of motion change to the image reconstruction unit 8b. The image reconstruction unit 8b reconstructs the original-resolution luminance image based on the multiple adjusted luminance images having different resolutions (step S307). The image reconstruction unit 8b combines the reconstructed original-resolution luminance image with the original-resolution color image (step S308).

The decomposition conversion unit 3b determines whether or not the image processing apparatus 1b terminates the processing based on, for example, an instruction obtained from the user (step S309). In accordance with a determination that the image processing apparatus 1b continues the processing (step S309: NO), each functional unit of the image processing apparatus 1b returns the processing to step S302. In accordance with a determination that the image processing apparatus 1b terminates the processing (step S309: YES), each functional unit of the image processing apparatus 1b ends the processing.

Next, an example of a result of adjusting the amount of motion change (phase change) of the image will be described.

Figure 16:
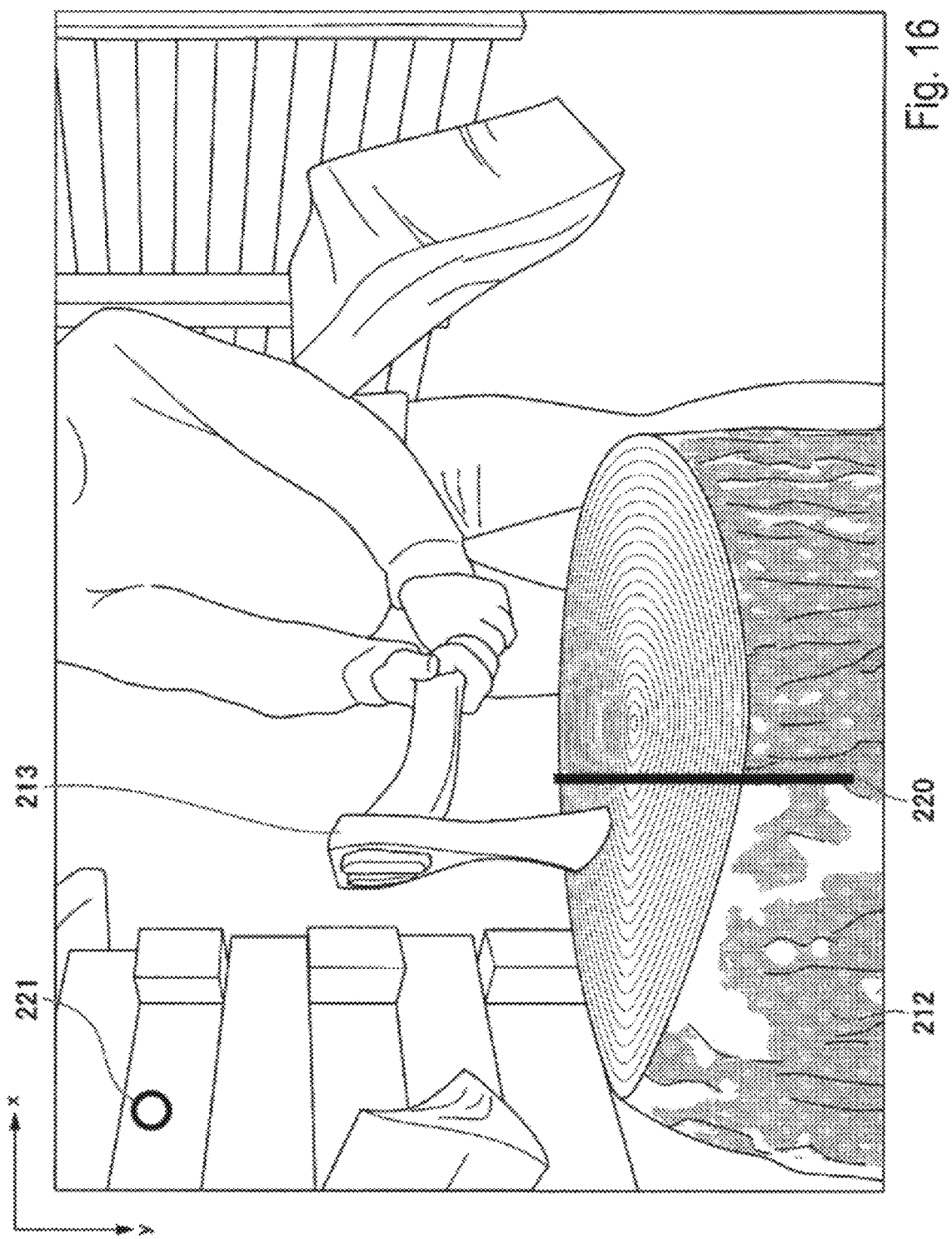
FIG. 16 is a diagram illustrating an example of a moving image frame in the third embodiment.

FIG. 16 is a diagram illustrating an example of a frame of a moving image. In the frame illustrated in FIG. 16, an operation of an ax being lowered onto a stump (an operation of chopping wood) is imaged. In the temporal frame after the time when the ax collides with the stump, the stump vibrates slightly in the y-axis direction.

The frame illustrated in FIG. 16 includes a pixel group 220 and pixels 221. The pixel group 220 consists of pixels arranged in a vertical direction (y-axis direction) in a stump image 212 captured in a first partial region in the frame. The pixel 221 is a pixel included in an image of a wall captured in a second partial region in the frame.

In the frame of the moving image, a minute phase change in a random spatial direction normally occurs due to random noise in a pixel value of the pixel 221 of the image of the wall. When the ax is lowered toward the stump in the y-axis direction, a minute phase change in the y-axis direction mainly occurs due to a vibration of the stump image 212 in the pixel value of the pixel group 220 of the stump image 212 because of the collision between the stump and the ax.

Figure 17:
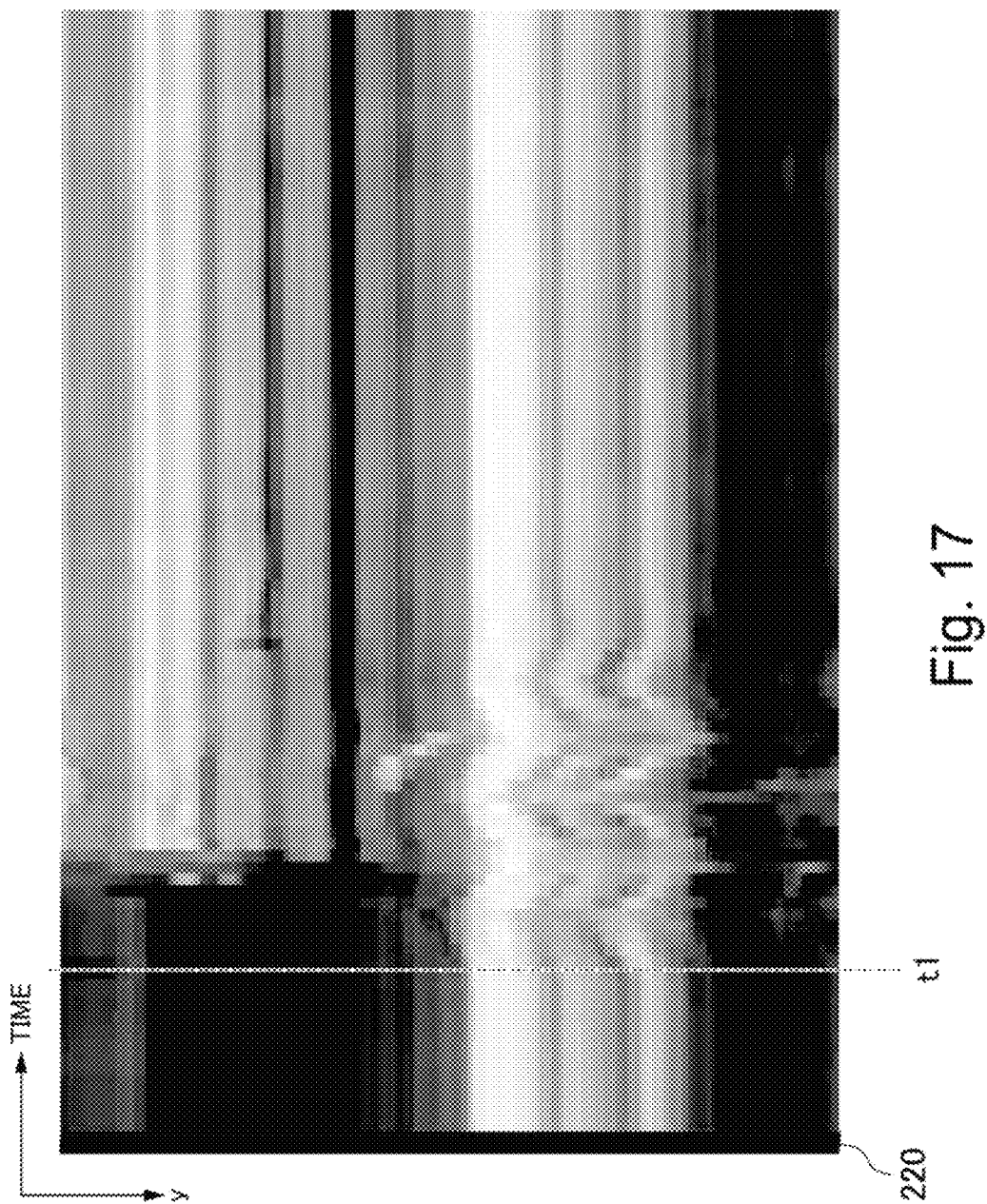
FIG. 17 is a diagram illustrating an example of pixel values of a pixel group in which an amount of motion change has been adjusted based on a diffusion result of phase change in the third embodiment.

FIG. 17 is a diagram illustrating an example of pixel values of the pixel group 220 in which the amount of motion change has been adjusted based on the diffusion result of the phase change. In FIG. 17, by the amount of motion change being adjusted based on the diffusion result of the phase change, a portion to be emphasized can be emphasized and noise is curbed. Thus, after time "t1" when the stump and the ax collide, an amount of change in a pixel value (motion change) of the portion to be emphasized is large.

Figure 18:
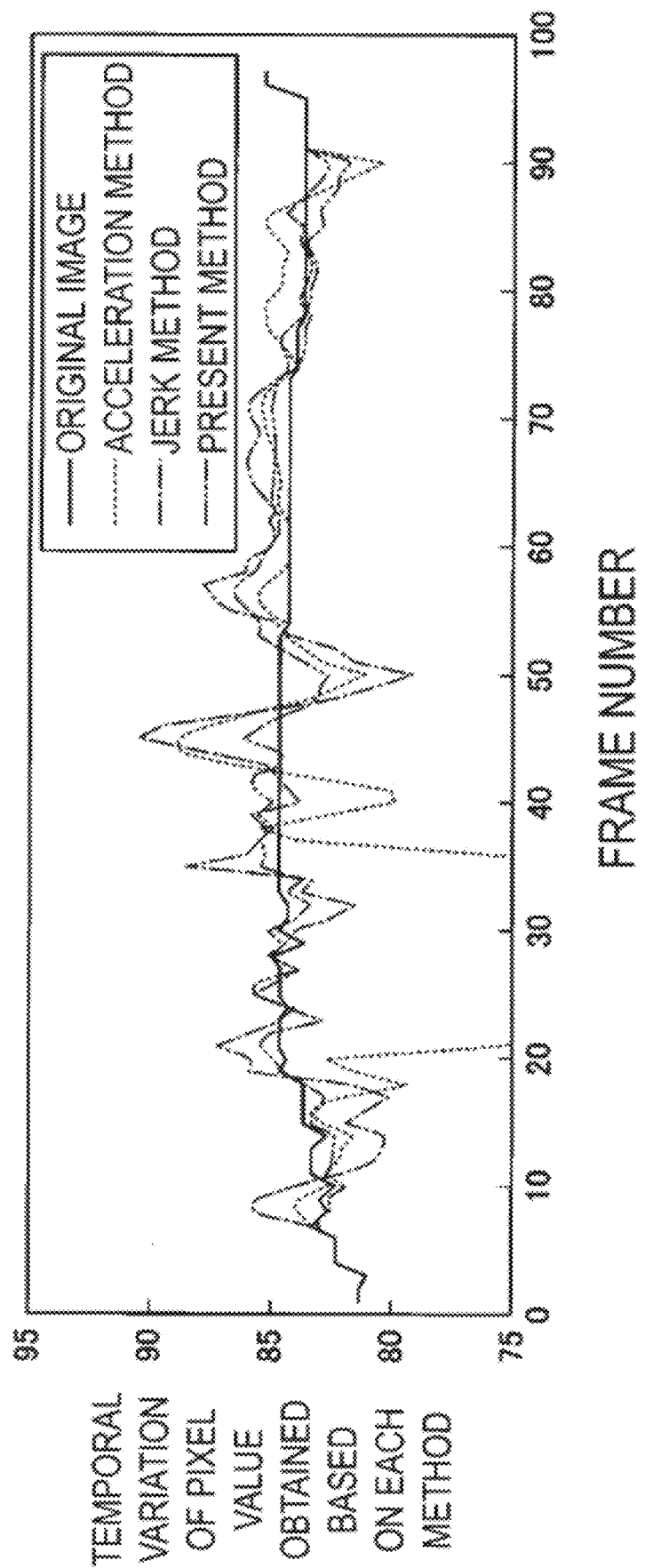
FIG. 18 is a diagram illustrating an example of a pixel value of a pixel of an original image in which an amount of motion change has not been adjusted and a pixel value of a pixel of each image in which the amount of motion change has been adjusted in the third embodiment.

FIG. 18 is a diagram illustrating an example of the pixel value of the pixel 221 of the original image in which the amount of motion change has not been adjusted and the pixel value of the pixel 221 of each image in which the amount of motion change has been adjusted. A horizontal axis indicates a frame number (time). A vertical axis indicates a temporal variation of the pixel value obtained based on each scheme. Here, examples of each scheme may include an acceleration method, a jerk method, and the present scheme. As a comparison target with each of these schemes, the temporal variation of the pixel value of the original image in which the amount of motion change is not adjusted is also shown.

A difference between the pixel value of the pixel 221 of the image adjusted based on the acceleration method or the jerk method and the pixel value of the pixel 221 of the original image is larger than a difference between the pixel value of the pixel 221 of the image adjusted based on the present scheme, that is, the diffusion result of the phase change and the pixel value of the pixel 221 of the original image. Thus, in the image adjusted based on the diffusion result of the phase change, the adjustment of the random noise is reduced even when the amount of minute phase change is adjusted. Thus, with the present scheme, it is possible to reduce the adjustment of the random noise mixed in the moving image based on the diffusion result of the phase change.

As described above, the image processing apparatus 1*b* of the third embodiment includes the change detection unit 4*b* and the reliability estimation unit 5*b*. The change detection unit 4*b* detects predetermined phase change among the phase changes in the luminance image having multiple resolutions. The reliability estimation unit 5*b* estimates the reliability "$FAF_{o,\gamma}''(x, y, t)$" of the detected phase change.

This makes it possible for the image processing apparatus 1*b* to more accurately detect a "meaningful" minute phase change among the detected minute changes in the video. Thus, the image processing apparatus 1*b* can adjust the amount of change in the "meaningful" minute phase change. Thus, the image processing apparatus 1*b* can reduce the adjustment of the random noise mixed in the moving image when adjusting the amount of minute motion change of the moving image.

Figure 19:
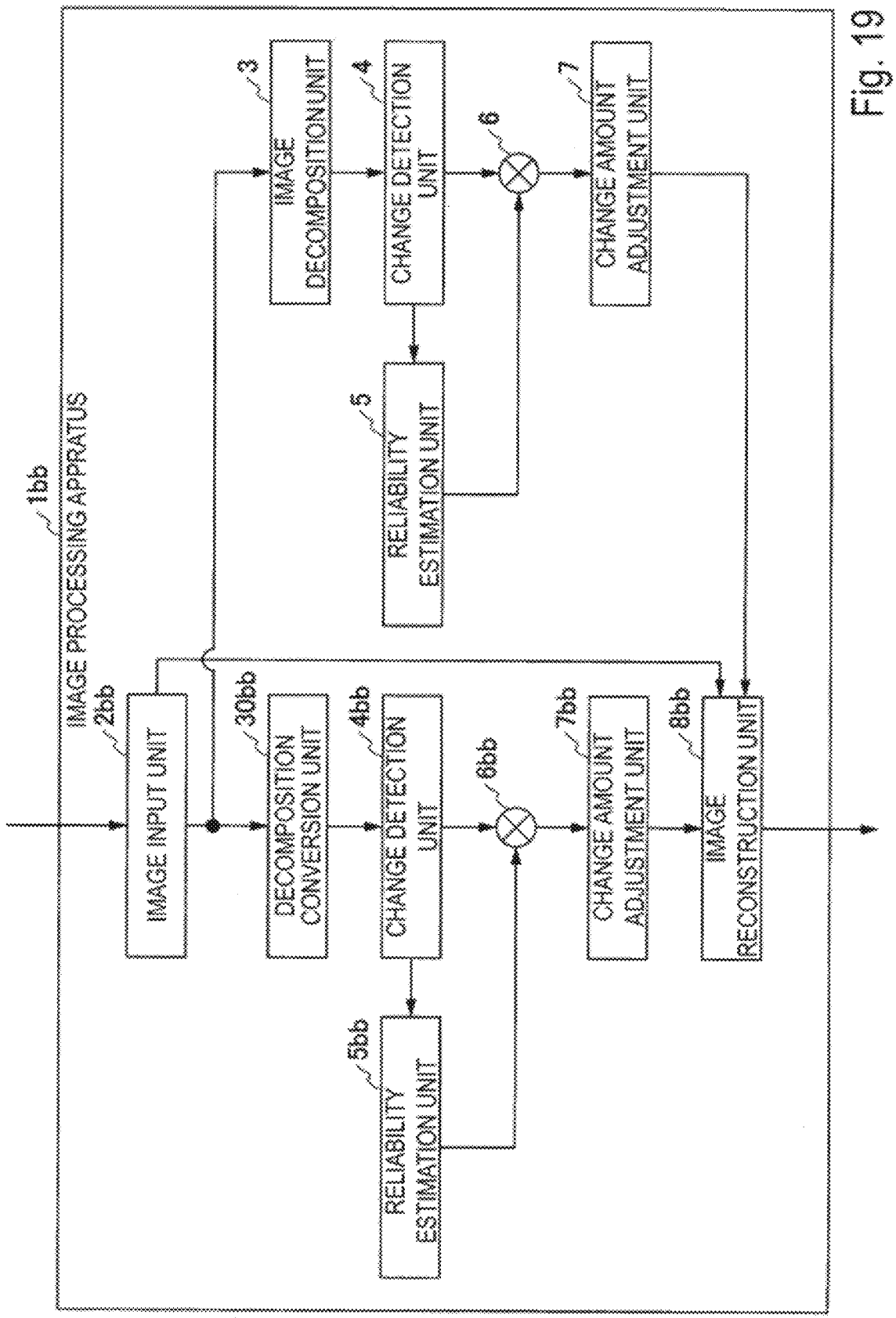
FIG. 19 is a diagram illustrating a configuration example of the image processing apparatus according to the third embodiment.

The image processing apparatus according to the third embodiment may be configured to execute a process of adjusting the amount of minute color or luminance change, which is executed by the image processing apparatus 1 according to the first embodiment, and a process of adjusting a specific minute motion change of the subject, which has been described in the third embodiment, in parallel. FIG. 19 illustrates a configuration in the case of such a configuration. FIG. 19 is a diagram illustrating a configuration example of the image processing apparatus 1*bb* according to the third embodiment. The image processing apparatus 1*bb* includes an image input unit 2*bb*, a decomposition conversion unit 30*bb*, a change detection unit 4*bb*, a reliability estimation unit 5*bb*, a multiplication unit 6*bb*, a change amount adjustment unit 7*bb*, an image reconstruction unit 8*bb*, an image decomposition unit 3, a change detection unit 4, a reliability estimation unit 5, a multiplication unit 6, and a change amount adjustment unit 7.

The image processing apparatus 1*bb* executes the first image processing and the second image processing in parallel. The image processing apparatus 1*bb* executes the first image processing for the moving image to emphasize or attenuate minute color or luminance change of the subject. In the first image processing executed by the image processing apparatus 1*bb*, the image input unit 2*bb*, the image decomposition unit 3, the change detection unit 4, the reliability estimation unit 5, the multiplication unit 6, the change amount adjustment unit 7, and the image reconstruction unit 8*bb* execute the same processing as those of the respective functional units of the image processing apparatus 1 in the first embodiment.

The image processing apparatus 1*bb* executes the second image processing for the moving image to emphasize or attenuate the minute motion change of the subject. In the second image processing executed by the image processing apparatus 1*bb*, the image input unit 2*bb*, the decomposition conversion unit 30*bb*, the change detection unit 4*bb*, the reliability estimation unit 5*bb*, the multiplication unit 6*bb*, the change amount adjustment unit 7*bb*, and the image reconstruction unit 8*bb* execute the same processing as those of the functional units having the same names illustrated in FIG. 11.

The image reconstruction unit 8*bb* acquires multiple images having different resolutions from the change amount adjustment unit 7*bb*. The image reconstruction unit 8*bb* combines the multiple images having different resolutions to reconstruct an original-resolution luminance image. The image reconstruction unit 8*bb* may acquire an original-resolution color image from the image input unit 2*bb*. The image reconstruction unit 8*bb* may combine the reconstructed original-resolution luminance image with the original-resolution color image.

The image reconstruction unit 8*bb* acquires the original-resolution image in which the color or luminance change has been emphasized from the change amount adjustment unit 7. The image reconstruction unit 8*bb* combines the original-resolution image in which the color or luminance change has been emphasized with the reconstructed original-resolution luminance image. For example, the image reconstruction unit 8*bb* generates an average image of the original-resolution image in which the color or luminance change has been emphasized and the reconstructed original-resolution luminance image.

Fourth Embodiment

A fourth embodiment differs from the first to third embodiments in that an image processing apparatus sequentially executes the process of adjusting the specific minute color or luminance change of the subject, which is executed by the image processing apparatus 1 of the first embodiment, the process of emphasizing or attenuating the minute motion change of the subject, which is a executed by the image processing apparatus 1*a* of the second embodiment, and the process of emphasizing or attenuating the minute motion change of the subject, which is executed by the image processing apparatus 1*b* of the third embodiment. Differences between the fourth embodiment and the first to third embodiments will be described.

Figure 20:
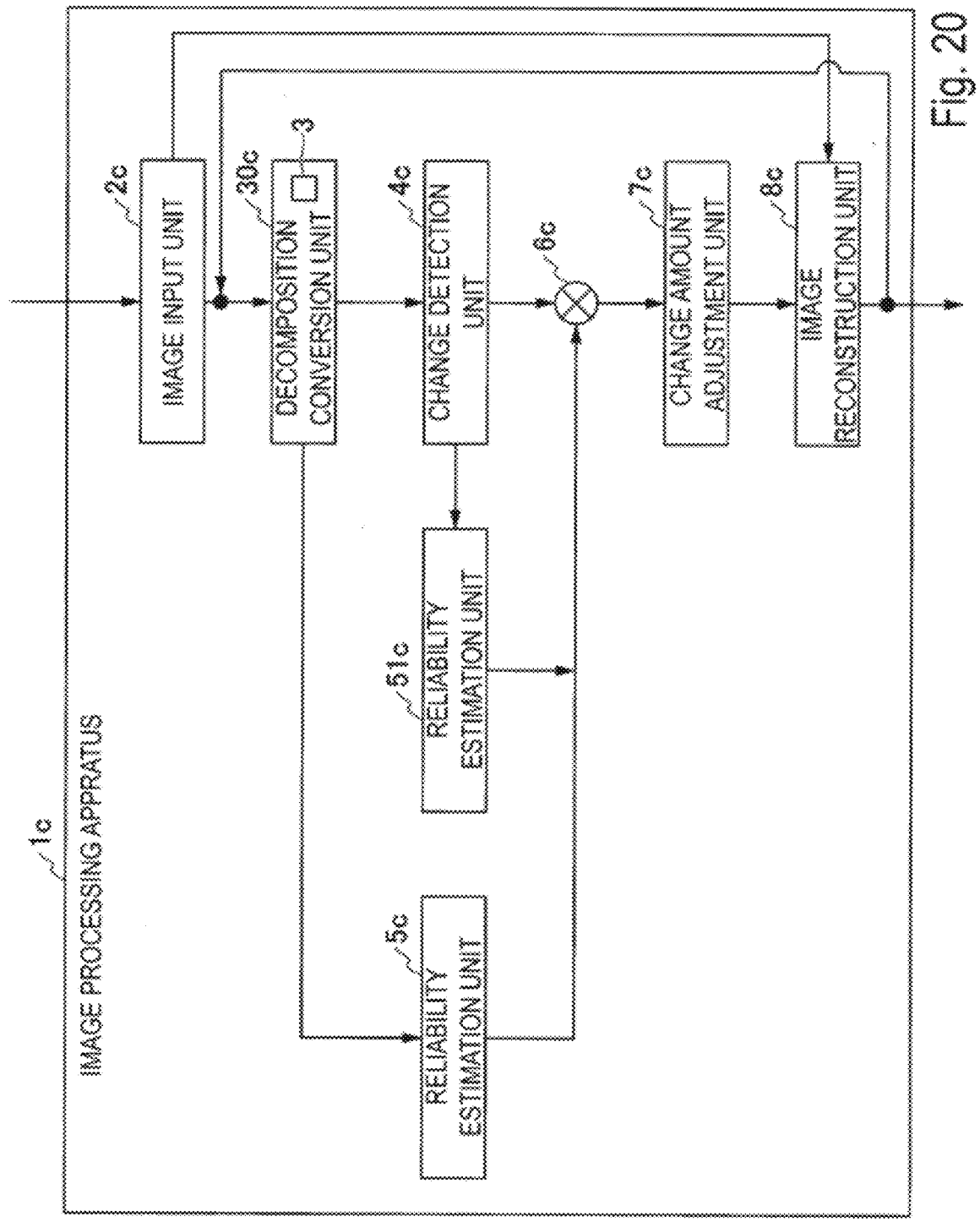
FIG. 20 is a diagram illustrating a configuration example of an image processing apparatus according to a fourth embodiment.

FIG. 20 is a diagram illustrating a configuration example of an image processing apparatus 1*c* according to the fourth embodiment. The image processing apparatus 1*c* is an apparatus that executes a predetermined image processing on a moving image. The image processing apparatus 1*c* executes predetermined image processing on the moving image to emphasize or attenuate a specific minute color or luminance change of the subject and a specific minute motion change of the subject.

The image processing apparatus 1*c* includes an image input unit 2*c*, a decomposition conversion unit 30*c*, a change detection unit 4*c*, a reliability estimation unit 5*c*, a multiplication unit 6*c*, a change amount adjustment unit 7*c*, an image reconstruction unit 8*c*, and a reliability estimation unit 51*c*. The decomposition conversion unit 30*c* includes an image decomposition unit 3.

In the fourth embodiment, the image processing apparatus 1*c* sequentially executes first image processing and second image processing. That is, the image processing apparatus 1*c* executes the first image processing on the moving image, and further executes the second image processing on the moving image. An execution order of the first image processing and the second image processing may be reversed.

In the first image processing, each functional unit of the image processing apparatus 1*c* executes the same processing as each functional unit of the image processing apparatus 1 of the first embodiment. That is, the image processing apparatus 1*c* executes the first image processing on the moving image to emphasize or attenuate a specific minute color or luminance change of the subject.

The image processing apparatus 1c executes the second image processing on the moving image to emphasize or attenuate a specific minute motion change of the subject. In the second image processing, the adjustment rate "α" of the phase change is 0.

Next, a process of emphasizing or attenuating the specific minute motion change of the subject in the fourth embodiment will be described.

In the fourth embodiment, the image processing apparatus 1c executes a first reliability estimation process and a second reliability estimation process. That is, the image processing apparatus 1a executes the first reliability estimation process on the moving image, and further executes the second reliability estimation process on the moving image. An execution order of the first reliability estimation process and the second reliability estimation process may be reversed. The first reliability estimation process is executed by the reliability estimation unit 5c. On the other hand, the second reliability estimation process is executed by the reliability estimation unit 51c.

In the first reliability estimation process, the reliability estimation unit 5c estimates the reliability of the minute phase change using the same scheme as in the second embodiment. Hereinafter, the reliability estimated by the reliability estimation unit 5c is referred to as first reliability.

In the second reliability estimation process, the reliability estimation unit 51c estimates the reliability of the minute phase change using the same scheme as in the third embodiment. Hereinafter, the reliability estimated by the reliability estimation unit 51c is referred to as second reliability.

The multiplication unit 6c multiplies the minute phase change information output from the change detection unit 4c by the first reliability output from the reliability estimation unit 5c and the second reliability output from the reliability estimation unit 51c and outputs a multiplication result to the change amount adjustment unit 7c. The multiplication unit 6c may perform weighted multiplication or weighted addition on the first reliability and the second reliability that have been received. For example, the multiplication unit 6c sets a weight of the reliability that is important in processing among the first reliability and the second reliability to be larger than a weight of the other reliability, and performs weighted multiplication or weighted addition through weighting of values of the first reliability and the second reliability. Because subsequent processing is the same as those of the first to third embodiments, description thereof will be omitted.

Figure 21:
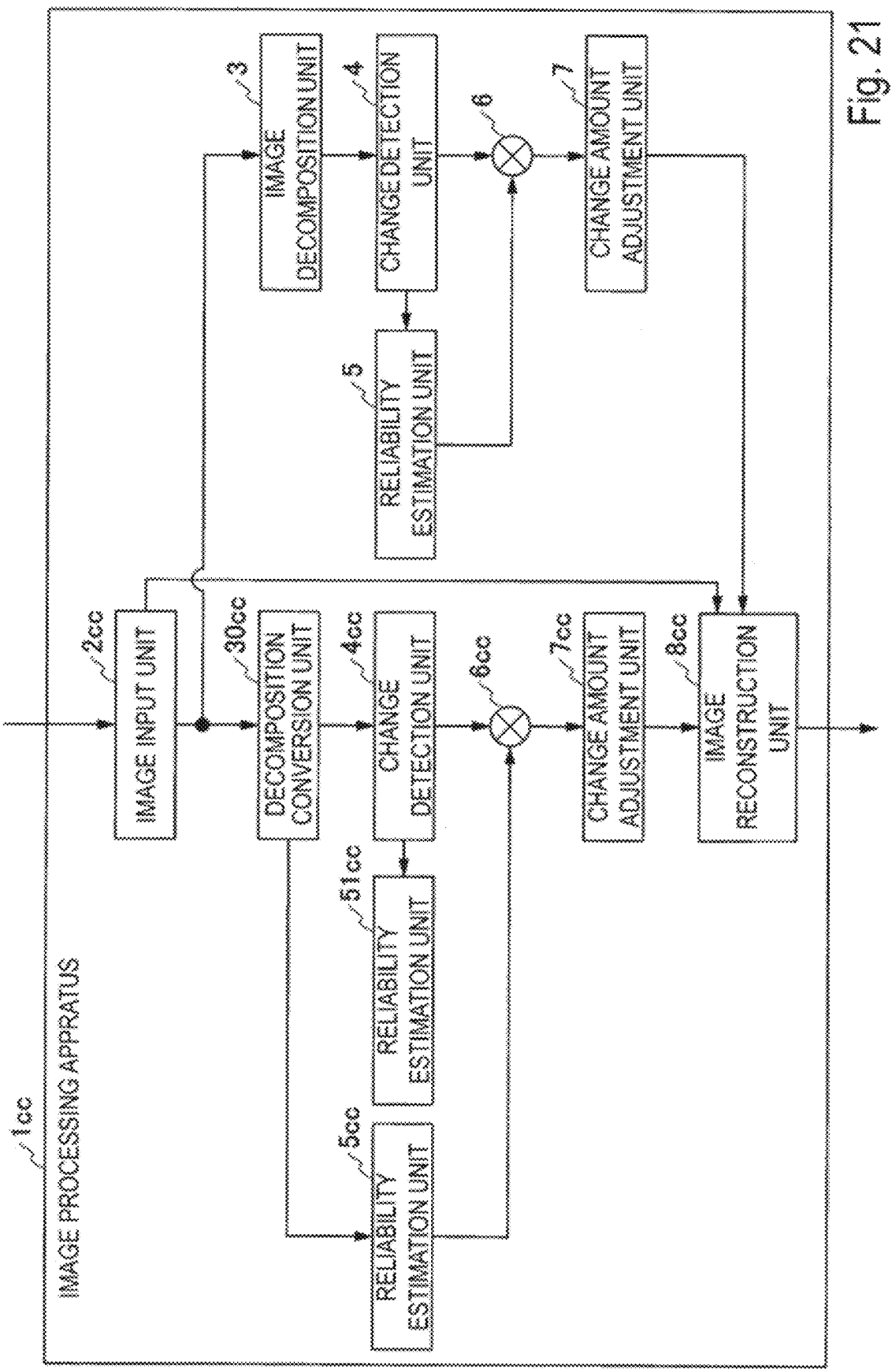
FIG. 21 is a diagram illustrating a configuration example of the image processing apparatus according to the fourth embodiment.

Further, the image processing apparatus 1c according to the fourth embodiment is configured to execute a process of adjusting the amount of minute color or luminance change and a process of adjusting a specific minute change in motion of the subject in parallel. FIG. 21 illustrates a configuration in the case of such a configuration. FIG. 21 is a diagram illustrating a configuration example of the image processing apparatus 1cc according to the fourth embodiment. The image processing apparatus 1cc includes an image input unit 2cc, a decomposition conversion unit 30cc, a change detection unit 4cc, a reliability estimation unit 5cc, a multiplication unit 6cc, a change amount adjustment unit 7cc, an image reconstruction unit 8cc, an image decomposition unit 3, a change detection unit 4, a reliability estimation unit 5, a multiplication unit 6, a change amount adjustment unit 7, and a reliability estimation unit 51cc.

The image processing apparatus 1ce executes the first image processing and the second image processing in parallel. The image processing apparatus 1cc executes the first image processing for the moving image to emphasize or attenuate minute color or luminance change of the subject. In the first image processing executed by the image processing apparatus 1cc, the image input unit 2cc, the image decomposition unit 3, the change detection unit 4, the reliability estimation unit 5, the multiplication unit 6, the change amount adjustment unit 7, and the image reconstruction unit 8cc execute the same processing as those of the respective functional units of the image processing apparatus 1 in the first embodiment.

The image processing apparatus 1cc executes the second image processing for the moving image to emphasize or attenuate the minute motion change of the subject. In the second image processing executed by the image processing apparatus 1cc, the reliability estimation unit 5cc estimates first reliability through a first reliability estimation process, and the reliability estimation unit 51cc estimates second reliability through a second reliability estimation process. The image input unit 2cc, the decomposition conversion unit 30cc, the change detection unit 4cc, the reliability estimation unit 5cc, the multiplication unit 6cc, the change amount adjustment unit 7cc, and the image reconstruction unit 8cc execute the same processing as those of the functional units having the same names illustrated in FIG. 20.

The image reconstruction unit 8cc acquires multiple images having different resolutions from the change amount adjustment unit 7cc. The image reconstruction unit 8cc combines the multiple images having different resolutions to reconstruct an original-resolution luminance image. The image reconstruction unit 8cc may acquire an original-resolution color image from the image input unit 2cc. The image reconstruction unit 8cc may combine the reconstructed original-resolution luminance image with the original-resolution color image.

The image reconstruction unit 8cc acquires the original-resolution image in which the color or luminance change has been emphasized from the change amount adjustment unit 7. The image reconstruction unit 8cc combines the original-resolution image in which the color or luminance change has been emphasized with the reconstructed original-resolution luminance image. For example, the image reconstruction unit 8cc generates an average image of the original-resolution image in which the color or luminance change has been emphasized and the reconstructed original-resolution luminance image.

Fifth Embodiment

The fifth embodiment differs from the first to fourth embodiments in that an image processing apparatus emphasizes or attenuates a minute motion change using a scheme different from the methods in the first to fourth embodiments. Difference between the fifth embodiment and the first to fourth embodiments will be described.

Figure 22:
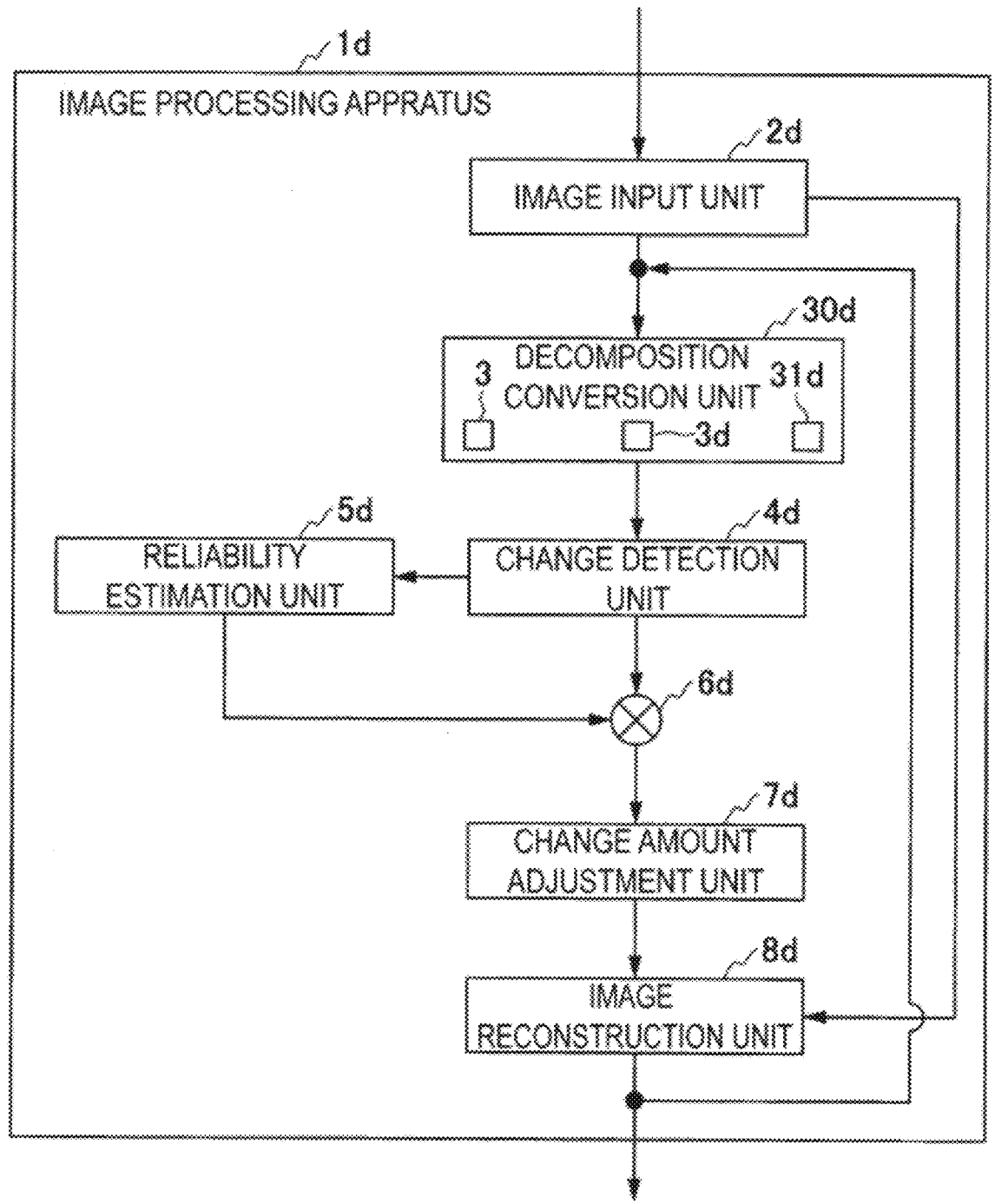
FIG. 22 is a diagram illustrating a configuration example of an image processing apparatus according to a fifth embodiment.

FIG. 22 is a diagram illustrating a configuration example of an image processing apparatus 1d according to the fifth embodiment. The image processing apparatus 1d is an apparatus that executes a predetermined image processing on a moving image. The image processing apparatus 1d executes predetermined image processing on the moving image to emphasize or attenuate a specific minute color or luminance change of the subject and a specific minute motion change of the subject.

The image processing apparatus 1d includes an image input unit 2d, a decomposition conversion unit 30d, a change detection unit 4d, a reliability estimation unit 5d, a multiplication unit 6d, a change amount adjustment unit 7d, and an image reconstruction unit 8d. The decomposition conversion unit 30d includes an image decomposition unit 3, an image decomposition unit 3d, and an image conversion unit 31d.

In the fifth embodiment, the image processing apparatus 1d sequentially executes first image processing and second image processing. That is, the image processing apparatus 1d executes the first image processing on the moving image, and further executes the second image processing on the moving image. An execution order of the first image processing and the second image processing may be reversed.

In the first image processing, each functional unit of the image processing apparatus 1d executes the same processing as each functional unit of the image processing apparatus 1 of the first embodiment. That is, the image processing apparatus 1d executes the first image processing on the moving image to emphasize or attenuate a minute color or luminance change of the subject.

The image processing apparatus 1d executes the second image processing on the moving image to emphasize or attenuate a specific minute motion change of the subject. In the second image processing, the adjustment rate "α" of the phase change is 0.

Next, a process of emphasizing or attenuating the specific minute motion change of the subject will be described.

Figure 23:
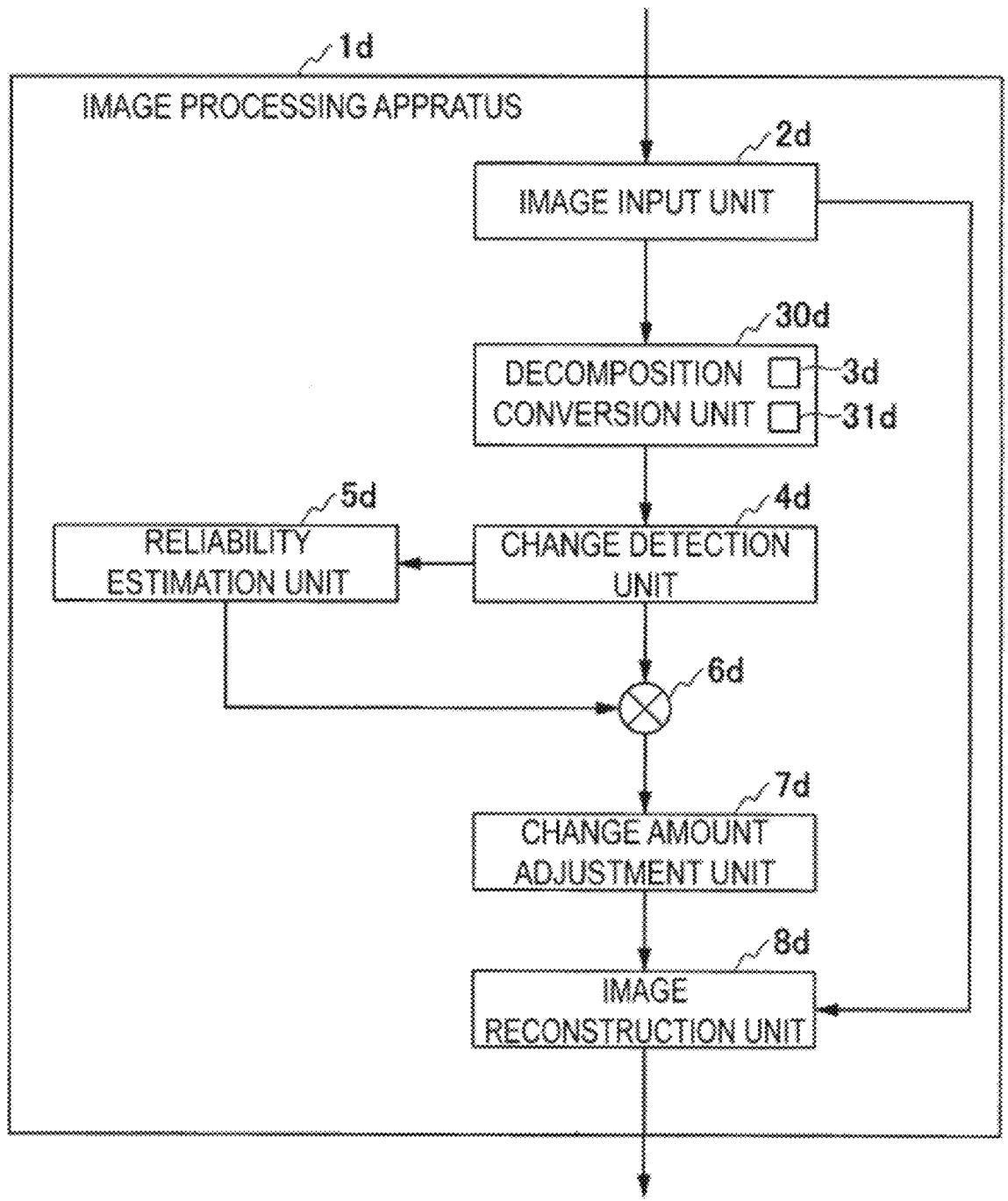
FIG. 23 is a diagram illustrating a configuration example of the image processing apparatus according to the fifth embodiment.

FIG. 23 is a diagram illustrating a configuration example of each functional unit that emphasizes or attenuates the specific minute motion change of the subject. The image processing apparatus 1d includes an image input unit 2d, a decomposition conversion unit 30d, a change detection unit 4d, a reliability estimation unit 5d, a multiplication unit 6d, a change amount adjustment unit 7d, and an image reconstruction unit 8d. Each functional unit may be provided as a single functional unit in combination, or may be divided and provided as multiple functional units.

The image input unit 2d receives multiple frames of the moving image as the image processing target. The image input unit 2d generates the luminance images and the color images from the multiple frames of the moving image. The image input unit 2d outputs an original-resolution luminance image that is an image processing target to the decomposition conversion unit 30d. The image input unit 2d outputs an original-resolution color image that is an image processing target to the image reconstruction unit 8d.

The decomposition conversion unit 30d (edge image generation unit) receives the original-resolution luminance image. The decomposition conversion unit 30d generates an edge image having different resolutions from the original-resolution luminance image. The edge image is an image indicating a spatial frequency component (high frequency component) having a certain frequency or higher in the image that is an image processing target. For example, in the edge image, an outline (edge) of a subject image is extracted. The decomposition conversion unit 30d includes an image decomposition unit 3d and an image conversion unit 31d.

The image decomposition unit 3d receives the original-resolution luminance image. The image decomposition unit 3d generates a luminance image having different resolutions (hereinafter referred to as a "multi-resolution luminance image") from the received original-resolution luminance image. The image decomposition unit 3d generates an edge image having different resolutions (hereinafter referred to as a "multi-resolution edge image") from the multi-resolution luminance image. For example, the image decomposition unit 3d generates a difference image between luminance images having a predetermined resolution among different resolutions as the multi-resolution edge image. The image decomposition unit 3d outputs the multi-resolution edge image (edge image in a resolution direction) to the image conversion unit 31d for each resolution.

Hereinafter, a temporal fluctuation in a plausible direction orthogonal to an edge in the pixel is referred to as "direction change." A direction change "θ(x, y, t)" is determined for each pixel at coordinates (x, y) in the edge image at time "t." The plausible direction orthogonal to the edge is derived as an output of a Riesz transform or the like for an edge image in which an edge represented by a certain amount or more of a luminance component is present. Thus, the direction change "θ(x, y, t)" is temporal data in which a plausible direction θ(x, y), which is the output of the Riesz transform, is held for the frame of the moving image at time "t." Even when the edge is not present in the pixel, the plausible direction is derived as the output of the Riesz transform or the like. Hereinafter, a temporal change in a phase of the high frequency component according to the direction change is referred to as a "phase change."

The image conversion unit 31d receives the multi-resolution edge image (edge image in the resolution direction). The image conversion unit 31d converts luminance change occurring according to the direction change "θ(x, y, t)" for each edge image and for each pixel at the coordinates (x, y) in the edge image at time "t" to a phase change "Φ(x, y, t)" and an amplitude change "A(x, y, t)" of the luminance information according to the same direction change "θ(x, y, t)." That is, in the moving image, the direction change "θ(x, y, t)," the temporal phase change "φ(x, y, t)," and the amplitude change "A(x, y, t)" are derived.

For example, the image conversion unit 31d converts the luminance change occurring according to the direction change "θ(10, 20, 15)=18.3°" in the pixel at coordinates (10, 20) in the edge image to a phase change "Φ(10, 20, 15)=0.4" of the luminance information according to the same direction change "θ(10,20,15)=18.3°" with respect to time t (=15) in a time width "(−)t" of 30 edge images.

A phase change of luminance information in a temporal edge image indicates motion change of the image in the temporal edge image.

The image conversion unit 31d outputs information indicating a phase change according to the direction change and information indicating a direction change (hereinafter referred to as "direction change information") in the multi-resolution edge image to the change detection unit 4 for each pixel in the edge image at time "t" of the moving image. In the fifth embodiment, the information indicating the phase change according to the direction change is referred to as the phase change information.

The change detection unit 4d receives the phase change information and the direction change information of the multi-resolution edge image. For each edge image having the time width "(−)t" (for example, per unit time) around time "t," the change detection unit 4d outputs the direction change information "θ″(x, y, t)" to the reliability estimation unit 5d.

For each edge image having the time width "(−)t" around time "t," the change detection unit 4d detects a minute phase change according to the direction change in the pixels in the multi-resolution edge image. The change detection unit 4d outputs information indicating the minute phase change according to the direction change in the pixel in the multi-resolution edge image to the multiplication unit 6d. In the fifth embodiment, the information indicating the minute phase change according to the direction change is referred to as minute phase change information.

The reliability estimation unit 5d receives direction change information with the time width "(−)t." The reliability estimation unit 5d estimates reliability "maskS′′′" of the minute phase change "C′′(x, y, t)" based on the direction change information. Here, "n" indicates nth resolution. "n=0"th resolution indicates the highest resolution. The reliability estimation unit 5d estimates the reliability so that the reliability of the minute phase change occurring in the pixel value of the image due to random noise mixed in the image due to, for example, thermal noise of the image sensor is lower than the reliability of the minute phase change occurring in the pixel value of the image due to the physical phenomenon other than the random noise. The reliability estimation unit 5d outputs the estimated reliability "maskS′′′" to the multiplication unit 6d.

The multiplication unit 6d receives the minute phase change information and the reliability. The multiplication unit 6d multiplies the minute phase change information (a value indicating the minute phase change) by the reliability estimated by the reliability estimation unit 5d for each pixel in the edge image, and outputs a multiplication result to the change amount adjustment unit 7d. The minute phase change information is multiplied by the reliability so that the minute phase change information is associated with the reliability, Thus, the minute phase change "^C′′(x, y, t)" occurring in the pixel value of the image due to the physical phenomenon other than random noise is detected with high accuracy.

The change amount adjustment unit 7d receives the multiplication result (the phase change multiplied by the reliability) output by the multiplication unit 6d and executes video magnification on a multiplication result. That is, the change amount adjustment unit 7d adjusts the amount of minute phase change (motion change) multiplied by the reliability through emphasis or attenuation. Through the adjustment, the change amount adjustment unit 7d generates an edge image of the luminance image in which the amount of minute motion change has been adjusted (hereinafter referred to as an "adjusted edge image"). The change amount adjustment unit 7d outputs multiple the adjusted edge images having different resolutions to the image reconstruction unit 8d.

The image reconstruction unit 8d (image combination unit) receives the multiple adjusted edge images having different resolutions and reconstructs an image. The image reconstruction unit 8d acquires the multiple adjusted edge images having different resolutions from the change amount adjustment unit 7d. The image reconstruction unit 8d combines the multiple adjusted edge images having different resolutions to reconstruct the original-resolution luminance image.

The image reconstruction unit 8d acquires the original-resolution color image from the image input unit 2d. The image reconstruction unit 8d combines the reconstructed original-resolution luminance image and the original-resolution color image. The image reconstruction unit 8d outputs the combined image as the image finally adjusted by using the video magnification to a predetermined external device.

Next, details of the image processing apparatus 1d that performs a process of emphasizing or attenuating a specific minute motion change of the subject will be described. The image input unit 2d receives multiple frames of the moving image as the image processing target. The image input unit 2d generates, a original-resolution luminance image "I(x, y, t)" and a original-resolution color image from the multiple acquired frames. The image input unit 2d outputs the original-resolution luminance image "I(x, y, t)" to the image decomposition unit 3d. The image input unit 2d outputs a original-resolution color image to the image reconstruction unit 8d.

The image decomposition unit 3d receives a luminance image of multiple frames of the moving image. The image decomposition unit 3d sets the original-resolution luminance image "I(x, y, t)" as a luminance image "I⁰(x, y, t)" having the 0th resolution (highest resolution) as in Equation (23).

$$I^0(x, y, t) = I(x, y, t) \tag{23}$$

The image decomposition unit 3d executes processing of dividing a spatial frequency band (band division processing) on luminance images having multiple resolutions. That is, the image decomposition unit 3d executes edge detection processing on the luminance images having the multiple resolutions. Through the edge detection processing, the image decomposition unit 3d generates edge images (band-divided images) of the luminance images having the multiple resolutions.

The method for generating the edge images is not limited to a particular method. For example, the image decomposition unit 3d generates the edge images by using a band-division filter (edge filter) such as a differential filter or a high-pass filter for the luminance images. For example, the image decomposition unit 3d may generate the edge images by executing wavelet transform (octave division) on the luminance images. Hereinafter, the image decomposition unit 3d generates difference images as an example of the edge images. The image decomposition unit 3d generates a difference image "L$^n$(x, y, t)" by using downsampling and a Gaussian filter as follows.

Figure 24:
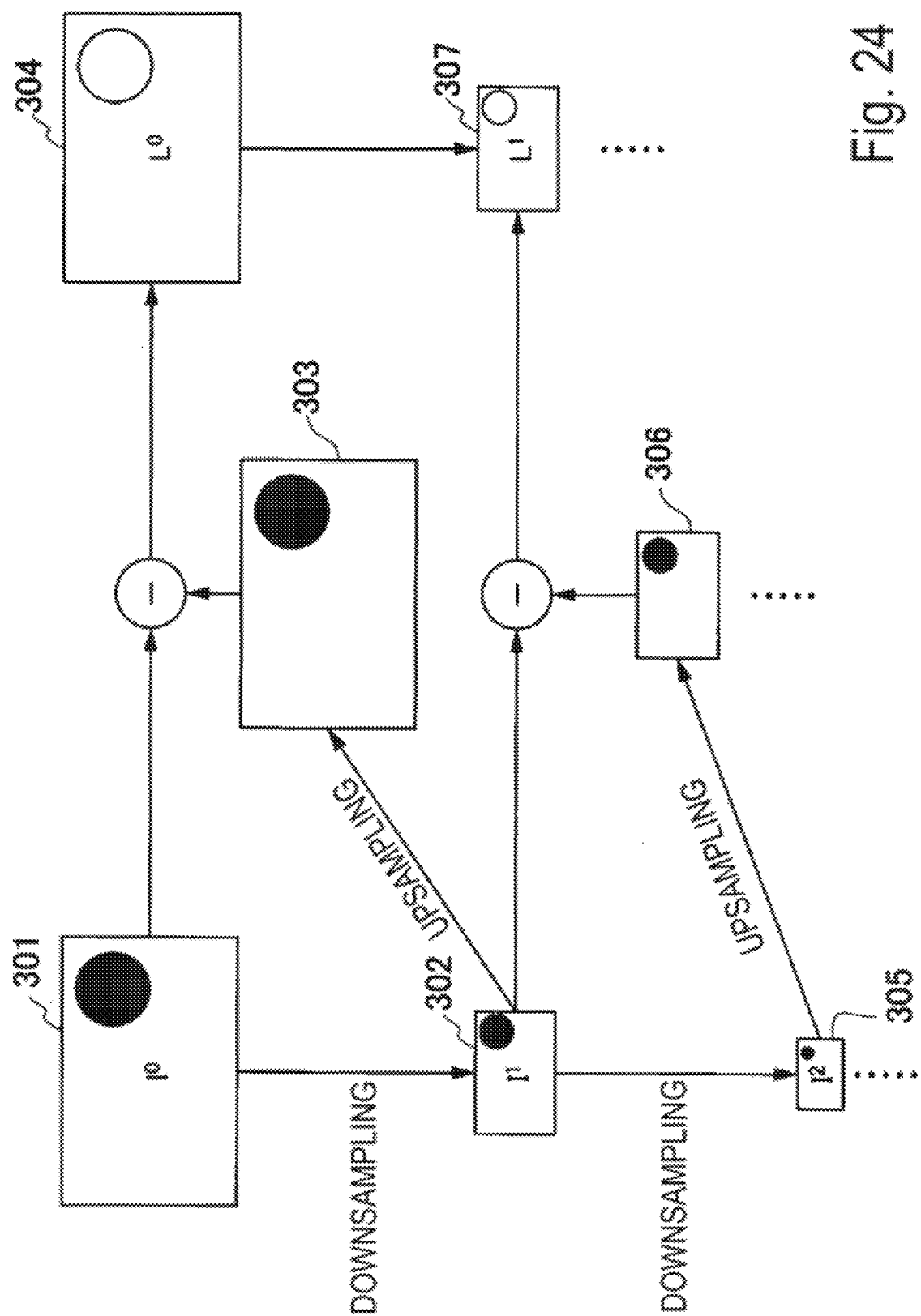
FIG. 24 is a diagram illustrating an example of generation of a difference image in the fifth embodiment.

FIG. 24 is a diagram illustrating an example of generation of a difference image. A luminance image 301 is a luminance image having 0th resolution (highest resolution). The image decomposition unit 3d executes downsampling on the luminance image 301 to generate a luminance image 302. The image decomposition unit 3d executes upsampling on the luminance image 302 to generate a luminance image 303. The image decomposition unit 3d derives a difference between the luminance image 301 and the luminance image 303 having the 0th resolution to generates a 0th resolution difference image 304.

The image decomposition unit 3d executes downsampling on the luminance image 302 to generate a luminance image 305. The image decomposition unit 3d executes upsampling on the luminance image 305 to generate a luminance image 306. The image decomposition unit 3d derives a difference between the luminance image 302 and the luminance image 306 having the 0th resolution to generates a first resolution difference image 307. Thus, the image decomposition unit 3d generates the multi-resolution edge image based on the multi-resolution luminance image.

That is, the image decomposition unit 3d executes downsampling on a luminance image "I$^{n-1}$(x, y, t)" having a (n−1)-th predetermined resolution. The number of levels of resolutions is three or more, for example, eight. When the number of levels of resolution is defined as eight levels, the image decomposition unit 3d executes downsampling on the original-resolution luminance image seven times.

The image decomposition unit 3d convolutes a Gaussian filter "G$_σ$(x, y)" with the downsampling result. The number of levels of the resolution of the luminance image is defined according to a filter size of the Gaussian filter. That is, a minimum size of a block defined in the luminance image is defined according to the filter size of the Gaussian filter. The image decomposition unit $3d$ generates multi-resolution luminance images ("$I^0$ (x, y, t)", . . . , "$I^n$(x, y, t)") by repeating a computation represented in Equation (24) on the luminance images having the first to nth highest resolutions. Hereinafter, an operator including an "x" mark in a mark "○" among operators represented in the equation is a convolutional operator.

$$I^n(x, y, t) = G_\sigma(x, y) \otimes downsample(I^{n-1}(x, y, t)) \quad (24)$$

A right side of Equation (24) represents a convolutional computation of "$G_o(x, y)$" and "downsample ($I^{n-1}(x, y, z)$)". "$G_o(x, y)$" represents a two-dimensional Gaussian filter having a variance "$\sigma^2$". "downsample (Z)" represents processing of reducing an image having a resolution "Z" based on the amount of downsample (downsampling). The amount of downsample is a fraction, for example, ½. Hereinafter, "n" is an integer of 0 or more and N or less. N is a predetermined integer of 2 or more. In this way, the image decomposition unit $3d$ may execute predetermined interpolation processing on the luminance images on which reduction processing is executed.

The image decomposition unit $3d$ executes upsampling on the luminance image "$I^{n+1}$(x, y, t)" having an (n+1)-th highest resolution. Accordingly, the image decomposition unit $3d$ aligns the resolution of the luminance image "$I^{n+1}$(x, y, t)" having the (n+1)-th highest resolution with the nth predetermined resolution. That is, the image decomposition unit $3d$ uses the luminance image "$I^{n+1}$(x, y, t)" having the (n+1)-th highest resolution as the luminance image "upsample ($I^{n+1}$(x, y, t))" having the (n (=n+1−1))-th highest resolution. "upsample (X)" represents processing of magnifying an image having resolution "X" so that the image matches the nth resolution. (upsampling).

The difference image "$L^n$(x, y, t)" (difference image in the resolution direction) between the luminance image "$I_n$(x, y, t)" having the nth highest resolution and the luminance image "upsample ($I^{n+1}$(x, y, t))" having the nth highest resolution represented in Equation (24) is represented as in Equation (25).

$$L^n(x, y, t) = \begin{cases} I^n(x, y, t) - upsample(I^{n+1}(x, y, t)) & (n < N) \\ I^n(x, y, t) & (n = N) \end{cases} \quad (25)$$

Each functional unit of the image processing apparatus $1d$ executes predetermined image processing on the difference image "$L^n$(x, y, t)" having the nth (0≤n<N) resolution.

The image conversion unit $31d$ receives an nth resolution difference image "$L^n$(x, y, t)." The image conversion unit $31d$ converts the luminance change occurring according to the direction change in a processing region (x, y) included in the difference image "$L^n$(x, y, t)" to a phase change and an amplitude change of the luminance information in the same direction change.

For example, the image conversion unit $31d$ detects the phase change in a time direction in the difference image in order from a low (coarse) resolution to a high (fine) resolution. That is, the image conversion unit $31d$ executes processing of detecting the phase change in the time direction in the difference image having the low resolution earlier than processing of detecting the phase change in the difference image having the high resolution.

A method by which the image conversion unit $31d$ converts the luminance change occurring according to the direction change to the phase change and the amplitude change is not limited to a specific method. Hereinafter, the image conversion unit $31d$ converts the luminance change occurring according to the direction change to the phase change and the amplitude change occurring according to the same direction change through the Riesz transform as an example.

The image conversion unit $31d$ executes, for example, a Fourier transform "fft" and an inverse Fourier transform "ifft" for the nth resolution difference image "$L^n$(x, y, t)." That is, the image conversion unit $31d$ executes the Riesz transform on the difference image "$L^n$(x, y, t)" as in Equations (26) to (31).

$$F(\omega_x, \omega_y) = fft(L^n(x, y, t)) \quad (26)$$

$$F_1 = ifft\left(F(\omega_x, \omega_y) * -i\frac{\omega_x}{|\omega|}\right) \quad (27)$$

$$R_2 = ifft\left(F(\omega_x, \omega_y) * -i\frac{\omega_y}{|\omega|}\right) \quad (28)$$

In Equations (26) to (28), relational equations of Equations (29) to (31) are established.

$$L^n(x, y, t) = A^n(x, y, t) \cdot \cos(\phi^n(x, y, t)) \quad (29)$$

$$R_1 = A(x, y, t) \cdot \sin(\phi^n(x, y, t))\cos(\theta^n(x, y, t)) \quad (30)$$

$$R_2 = A(x, y, t) \cdot \sin(\phi^n(x, y, t))\sin(\theta^n(x, y, t)) \quad (31)$$

Here, "$\theta^n$(x, y, t)" indicates a direction change in the pixel at the coordinates (x, y) in the nth resolution difference image "$L^n$(x, y, t)." "Φn(x, y, t)" indicates a phase change occurring according to the direction change "$\theta^n$(x, y, t)." "$A^n$(x, y, t)" indicates an amplitude change occurring according to the direction change "$\theta^n$(x, y, t)." The phase change "Φn(x, y, t)" occurring according to the direction change "$\theta^n$(x, y, t)" is expressed as in Equation (32). The image conversion unit $31d$ outputs information on the phase change "$\Phi^n$(x, y, t)" occurring according to the direction change "$\theta^n$(x, y, t)" to the change detection unit $4d$.

$$\phi^n(x, y, t) = \tan^{-1}\left(\frac{\sqrt{R_1^2 + R_2^2}}{L^n(x, y, t)}\right) \quad (32)$$

The change detection unit $4d$ receives the information on the phase change "$\Phi^n$(x, y, t)" occurring according to the direction change "$\theta^n$(x, y, t)." The change detection unit $4d$ convolutes a time series filter "H(t)" with the phase change "$\Phi^n$(x, y, t)". Accordingly, the change detection unit $4d$ detects a subtle change in the phase change "$\Phi^n$(x, y, t)". The time series filter "H(t)" is not limited to a particular filter as long as a time series filter having a frequency response to the phase change (for example, subtle phase change) according to the direction change as an adjustment target (an emphasis or attenuation target) is used. The temporal filter "H(t)" is, for example, a band-pass filter (see Non Patent Literature 1).

The change detection unit $4d$ may multiply the phase change according to the direction change (for example, a minute phase change) by a spatiotemporal filter "J(x, y, t)."

The multiplication makes it possible for the change detection unit 4d to remove a steep phase change (non-gentle phase change) with respect to time and space in the difference image "L"(x, y, t)" having the nth resolution.

The spatiotemporal filter "J(x, y, t)" is not limited to a particular filter as long as a spatiotemporal filter that removes the sharp phase change is used. The spatiotemporal filter "J(x, y, t)" is, for example, a jerk filter (see Non-Patent Literature 2). For example, the change detection unit 4d detects and normalizes a non-subtle and sharp change by performing third-order differential on the subtle change. The detection and normalization result is 0 when the subtle change appears, and is 1 when the sharp change appears. Accordingly, the inverse of the detection and normalization result is 1 when the subtle change appears, and is 0 when the sharp change appears. The change detection unit 4d uses, as the jerk filter, the inverse of the detection and normalization result.

The change detection unit 4d executes computations on the phase change in order of the third-order differential, the normalization, and the inversion. Accordingly, the change detection unit 4d may generate the jerk filter that removes only the non-subtle and sharp phase change. The change detection unit 4d multiplies an original phase change by the jerk filter.

In other words, the change detection unit 4d executes the computations of the third-order differential and the normalization on the phase change. Accordingly, when the subtle phase change appears in the difference image, the change detection unit 4d obtains a computation result having a value of 0. When the sharp phase change appears in the difference image, the change detection unit 4d obtains a computation result having a value of 1.

The change detection unit 4d generates the jerk filter by inverting the computation result. When the subtle phase change appears in the difference image, the jerk filter has a filter response of a value of 1. When the sharp phase change appears in the difference image, the jerk filter has a filter response of a value of 0. The change detection unit 4d multiplies an original phase change by the jerk filter "J". When the subtle phase change appears in the difference image, the original phase change is multiplied by the value of 1, and thus, the change detection unit 4d may detect only the subtle phase change. When the sharp phase change appears in the difference image, the original phase change is multiplied by the value of 0, and thus, the change detection unit 4d may suppress the sharp phase change.

The gentle and subtle phase change "C"(x, y, t)" is represented as in Equation (33). An operator "∘" represented in Equation (33) represents multiplication (element product).

$$C^n(x, y, t) = J(x, y, t) \circ (H(t) \otimes \phi^n(x, y, t)) \quad (33)$$

Here, the minute phase change "C"(x, y, t)" shown in Equation (33) includes a meaningful minute phase change "^C"(x, y, t)" and a meaningless minute phase change "~C"(x, y, t)", as in Equation (34). Here, the meaningless minute phase change (motion change) is a phase change occurring in the pixel value of the image due to random noise mixed in the image due to thermal noise, camera shake, ground vibration, or the like of the image sensor. A meaningful minute phase change (motion change) is a phase change that occurs in the pixel value of the image due to a physical phenomenon (for example, incidence of light on the image sensor) other than random noise.

$$C^n(x, y, t) = \hat{C}^n(x, y, t) + \tilde{C}^n(x, y, t) \quad (34)$$

The reliability estimation unit 5d receives the direction change information. The reliability estimation unit 5d estimates reliability of the minute phase change "C"(x, y, t)" based on the direction change "θ"(x, y, t)." This makes it possible for the reliability estimation unit 5d to separate the meaningful minute phase change "^C"(x, y, t)" and meaningless minute phase change "~C"(x, y, t)" in the minute phase change "C"(x, y, t)."

In the time width "(-)t" including time t, the meaningful minute phase change occurs in a limited spatial direction in the edge image as compared to the meaningless minute phase change. Thus, a variance value of a temporal direction change "θ"(x, y, (-)t)" in the pixel at the coordinates (x, y) is small.

Thus, the reliability estimation unit 5d estimates the reliability "mask"(x, y, t)" of the minute phase change as in Equation (35) based on the variance value of the temporal direction change "θ"(x, y, (-)t)" in the time width "(-)t." The reliability of the minute phase changes is higher when the variance value of the temporal direction change becomes smaller.

$$mask^n(x, y, t) = (1 - \text{Norm}(G_\sigma \otimes \text{Var}(\theta^n(x, y, \bar{t}))))^\gamma \quad (35)$$

In Equation (35), Norm (X)" indicates that a value of the argument "X" is normalized to a range from 0 to 1. The method of normalization is not limited to a specific method. "Var(X)" indicates a variance value of the argument "X" in the time width "(-)t." "G_σ" indicates a function for spatially smoothing Var(θ"(x, y, (-)t)). The parameter "6" indicates a strength of spatial smoothing. A parameter "y" indicates the reliability.

In the reliability "mask"(x, y, t)", only the variance value of the temporal direction change "θ"(x, y, (-)t)" at the coordinates (x, y) that is not a region is considered. Thus, when momentary noise is mixed in the pixel value of the pixel at the coordinates (x, y), estimation accuracy of the variance value is likely to be lowered. Thus, the reliability estimation unit 5 estimates a variance-covariance matrix as in Equations (36) and (37) for a region including the pixel at the coordinates (x, y). That is, the reliability estimation unit 5d estimates the reliability based on a behavior of the direction change "0(x, y, t)" in the region including the pixel at the coordinates (x, y).

$$D = \text{cov}(\theta^n(\bar{x}, \bar{t})) \quad (36)$$

$$\bar{x} \in \mathbb{R}^{h \times w} = \mathbb{R}^d \neg \quad (37)$$

In Equation (36) and Equation (37), "(-)x" indicates the region including the pixel at the coordinates (x, y). "cov(X)" indicates a function for generating the variance-covariance matrix "D" of the matrix "X" (a function for extending a dimension). "d" indicates the number of pixels (number of samples) in the region. "w" indicates a length of the region in a horizontal direction (x-axis direction). "h" indicates a length of the region in a vertical direction (y-axis direction).

The reliability estimation unit 5d executes eigenvalue decomposition for the variance-covariance matrix "D." The reliability estimation unit 5d estimates, as shown in Equation (38), the reliability "$maskS^n(x, y, t)$" of the minute phase change in the region including the coordinates (x, y) as shown in Equation (37) based on the average "(−)X" of the eigenvalues "$\lambda_1, \ldots, \lambda_d$" of the variance-covariance matrix "D." The reliability "$maskS^n(x, y, t)$" indicates the reliability of the minute phase change in the region "S" including the coordinates (x, y) in a range of 0 to 1.

$$maskS^n(x, y, t) = (1 - \text{Norm}(G_\sigma \otimes \bar{\lambda}))^\gamma \qquad (38)$$

As shown in Equation (39), the multiplication unit 6d multiplies the reliability "$maskS^n(x, y, t)$" shown in Equation (38) by "$C^n(x, y, t)$" shown in Equation (33).

$$\hat{C}^n(x, y, t) = maskS^n(x, y, t) \circ C^n(x, y, t) \qquad (39)$$

The multiplication unit 6d may multiply the reliability "$mask^n(x, y, t)$" of the minute phase change at the coordinates (x, y) of the pixel by "$C^n(x, y, t)$" shown in Equation (33).

Through the multiplication, the minute phase change "$\hat{C}^n(x, y, t)$" occurring in the pixel value of the pixel in the image due to the physical phenomenon other than the random noise is detected with high accuracy. The multiplication unit 6d can detect the minute phase change "$\hat{C}^n(x, y, t)$" in which the variance values are uniform.

The change amount adjustment unit 7d acquires information on the gentle and minute phase change "$\hat{C}^n(x, y, t)$" in the difference image "$L^n(x, y, t)$" having the nth resolution from the multiplication unit 6d as a meaningful phase change. The change amount adjustment unit 7d multiplies the gentle and minute phase change "$\hat{C}^n(x, y, t)$" by a predetermined adjustment rate (emphasis rate) "α." That is, the change amount adjustment unit 7d multiplies the minute phase change derived with high accuracy as in Equation (39) by the predetermined adjustment rate (emphasis rate) a as in Equation (40). The change amount adjustment unit 7d adds the original phase change "$\Phi^n(x, y, t)$" to the multiplication result to derive the phase change "$\hat{\Phi}^n(x, y, t)$" in which an amount of gentle and minute phase change in the direction change determined for each pixel in a temporal edge image has been adjusted, as in Equation (40).

$$\hat{\phi}^n(x, y, t) = \phi^n(x, y, t) + \alpha \cdot \hat{C}^n(x, y, t) \qquad (40)$$

Thus, the change amount adjustment unit 7d adjusts an amount of detected minute phase change. The adjustment rate may be the same or different for each resolution, direction, time, or position.

The image reconstruction unit 8d generates a difference image "$\hat{L}^n(x, y, t)$" having the nth highest resolution in which the amount of change of the gentle and subtle motion change is adjusted based on the phase change "$\hat{\Phi}^n(x, y, t)$" in which the amount of change is adjusted as in Equation (41). That is, the image reconstruction unit 8d generates the adjusted difference image "$\hat{L}^n(x, y, t)$" having the nth (0≤n≤N) highest resolution based on the phase change "$\hat{\Phi}^n(x, y, t)$" in which the amount of change is adjusted and the amplitude change "$A^n(x, y, t)$" as in Equation (41).

$$\hat{L}^n(x, y, t) = A^n(x, y, t) \cdot \cos\left(\hat{\phi}^n(x, y, t)\right) \qquad (41)$$

The image reconstruction unit 8d acquires the color image from the image input unit 2d. The image reconstruction unit 8d sequentially executes the processing represented in Equation (42) for the resolution number "n" based on Equations (25) and (41). The image reconstruction unit 8d reconstructs the luminance image "$\hat{I}^{n-1}(x, y, t)$" having the (n−1)-th highest resolution based on the adjusted difference image "$\hat{L}^{n-1}(x, y, t)$" having the (n−1)-th highest resolution and the luminance image "$\hat{I}^n(x, y, t)$" having the nth highest resolution as in Equation (42).

$$\hat{I}^{n-1}(x, y, t) = \hat{L}^{n-1}(x, y, t) + \text{upsample}\left(\hat{I}^n(x, y, t)\right) \qquad (42)$$

In Equation (42), "upsample(X)" indicates a process (upsampling) of magnifying an image having resolution "X" so that the image matches the nth resolution. The image reconstruction unit 8d reconstructs the luminance image having the original resolution (0th highest resolution) by sequentially executing the processing represented in Equation (42) for "n". The image reconstruction unit 8d combines the reconstructed original-resolution luminance image "$\hat{I}^0(x, y, t)$" and the original-resolution color image. The image reconstruction unit 8d outputs the combination result (image finally adjusted by using the video magnification) to a predetermined external device.

The image reconstruction unit 8d combines the original-resolution image in which the color or luminance change has been emphasized with the reconstructed original-resolution luminance image. For example, the image reconstruction unit 8d generates an average image of the original-resolution image in which the color or luminance change has been emphasized and the reconstructed original-resolution luminance image.

Figure 25:
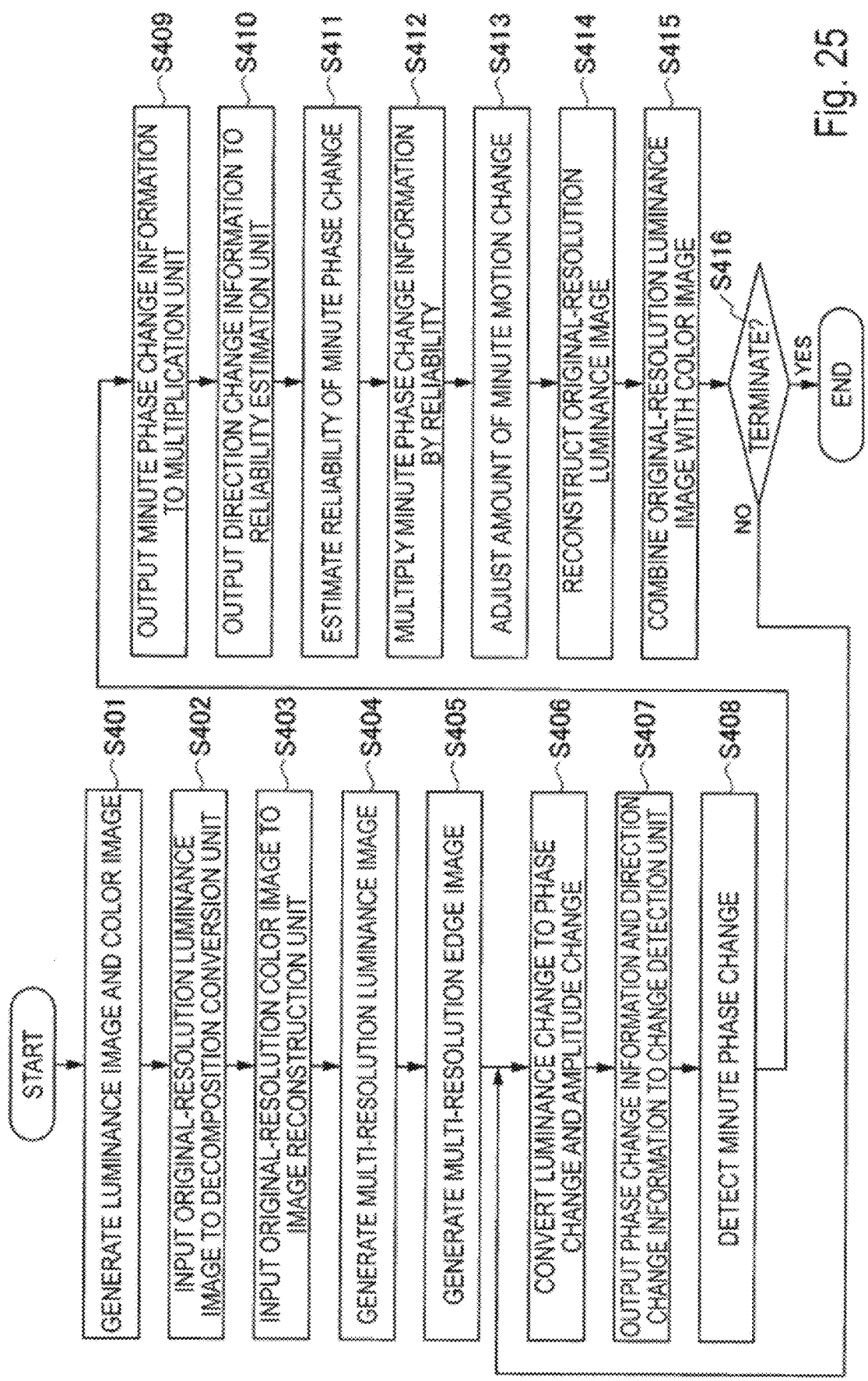
FIG. 25 is a flowchart illustrating an operation example of the image processing apparatus according to the fifth embodiment.

Next, an operation example of the image processing apparatus 1d will be described. FIG. 25 is a flowchart illustrating an operation example of the image processing apparatus 1d according to the fifth embodiment. The image input unit 2d generates the luminance images and the color images from the multiple frames of the moving image (step S401). The image input unit 2d outputs the original-resolution luminance image to the decomposition conversion unit 30d (step S402). The image input unit 2d outputs the original-resolution color image to the image reconstruction unit 8d (step S403).

The image decomposition unit 3d generates a multi-resolution luminance image from the original-resolution luminance image (step S404). The image decomposition unit 3d generates the multi-resolution edge image from the multi-resolution luminance image (step S405).

The image conversion unit 31d converts the luminance change occurring according to the direction change in the pixel in the edge image having a time width including time t to the phase change and the amplitude change occurring according to the same direction change (step S406). The image conversion unit 31d outputs the phase change information and the direction change information of the multi-resolution edge image to the change detection unit 4d for each pixel in the edge image (step S407).

The change detection unit 4d detects a minute phase change occurring according to the direction change in the pixels in the edge image (step S408). The change detection unit 4d outputs minute phase change information to the multiplication unit 6d (step S409). The change detection unit 4d outputs the direction change information to the reliability estimation unit 5d (step S410).

The reliability estimation unit 5d estimates the reliability "maskS'''" of the minute phase change "C''(x, y, t)" occurring according to the direction change based on the variance value of the temporal direction change (step S411). The multiplication unit 6d multiplies the minute phase change information by the estimated reliability (step S412). The change amount adjustment unit 7d adjusts the amount of minute motion change multiplied by the reliability as in Equation (39) through emphasis or attenuation as in Equation (40) (step S413).

The image reconstruction unit 8d reconstructs the original-resolution luminance image based on the multiple adjusted edge images having different resolutions from each other (step S414). The image reconstruction unit 8d combines the reconstructed original-resolution luminance image and the original-resolution color image (step S415).

The image conversion unit 31d determines whether or not the image processing apparatus 1d terminates the processing based on, for example, an instruction obtained from the user (step S416). In accordance with a determination that the image processing apparatus 1d continues the processing (step S416: NO), each functional unit of the image processing apparatus 1d returns the processing to step S406. In accordance with a determination that the image processing apparatus 1d ends the processing (step S416: YES), each functional unit of the image processing apparatus 1d terminates the processing.

Next, an example of a result of adjusting the amount of motion change (phase change) of the image will be described.

Figure 26:
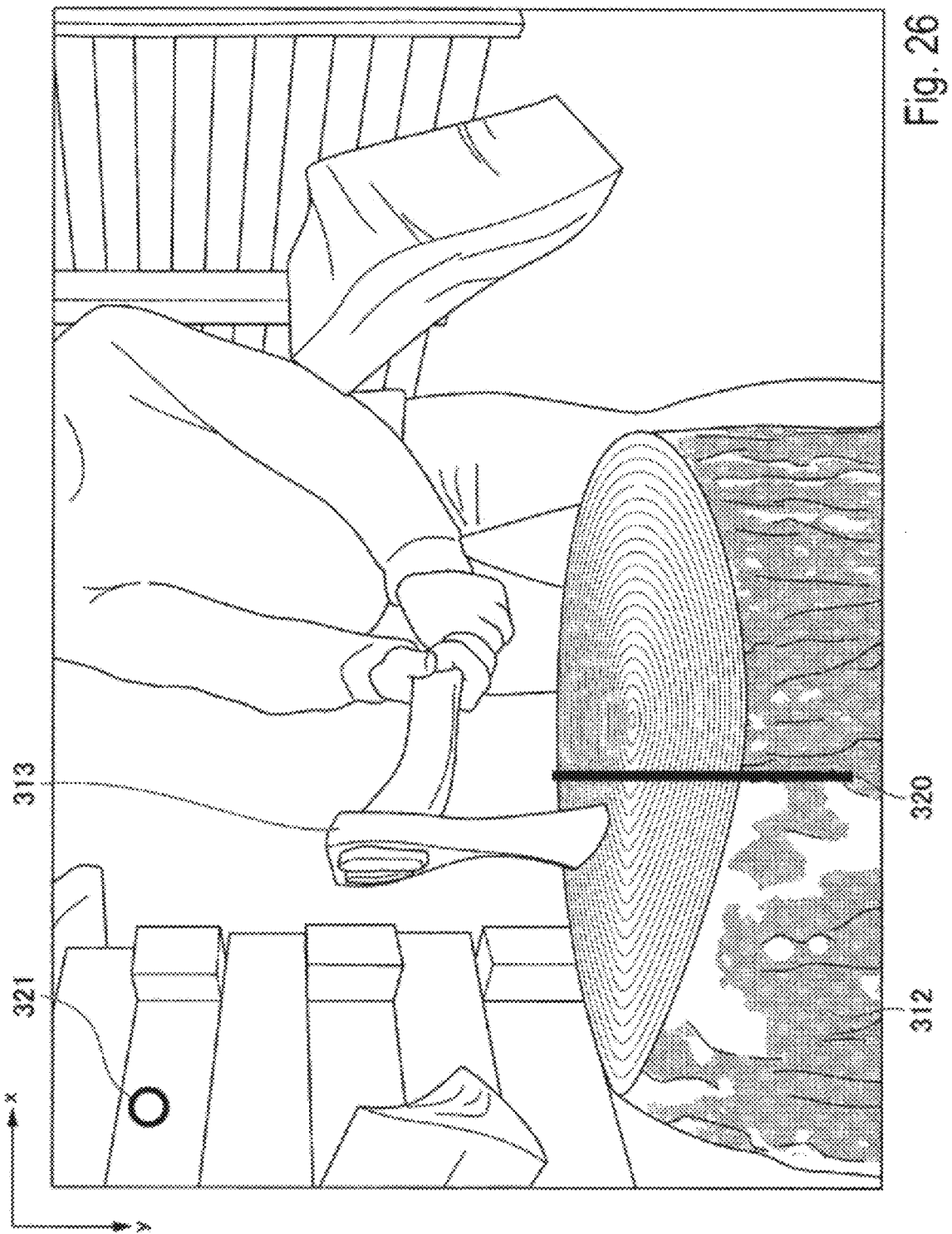
FIG. 26 is a diagram illustrating an example of a frame of a moving image in the fifth embodiment.

FIG. 26 is a diagram illustrating an example of a frame of a moving image. In the frame illustrated in FIG. 26, an operation of an ax being lowered onto a stump (an operation of chopping wood) is imaged. In the temporal frame after the time when the ax collides with the stump, the stump vibrates slightly in the y-axis direction.

The frame illustrated in FIG. 26 includes a pixel group 320 and pixels 321. The pixel group 320 consists of pixels arranged in a vertical direction (y-axis direction) in a stump image 312 captured in a third partial region in the frame. The pixel 321 is a pixel included in an image of a wall captured in a fourth partial region in the frame.

In the frame of the moving image, a minute phase change in a random spatial direction normally occurs due to random noise in a pixel value of the pixel 321 of the image of the wall. When the ax is lowered toward the stump in the y-axis direction, a minute phase change in the y-axis direction mainly occurs due to a vibration of the stump image 312 in the pixel value of the pixel group 320 of the stump image 312 because of the collision between the stump and the ax.

Figure 27:
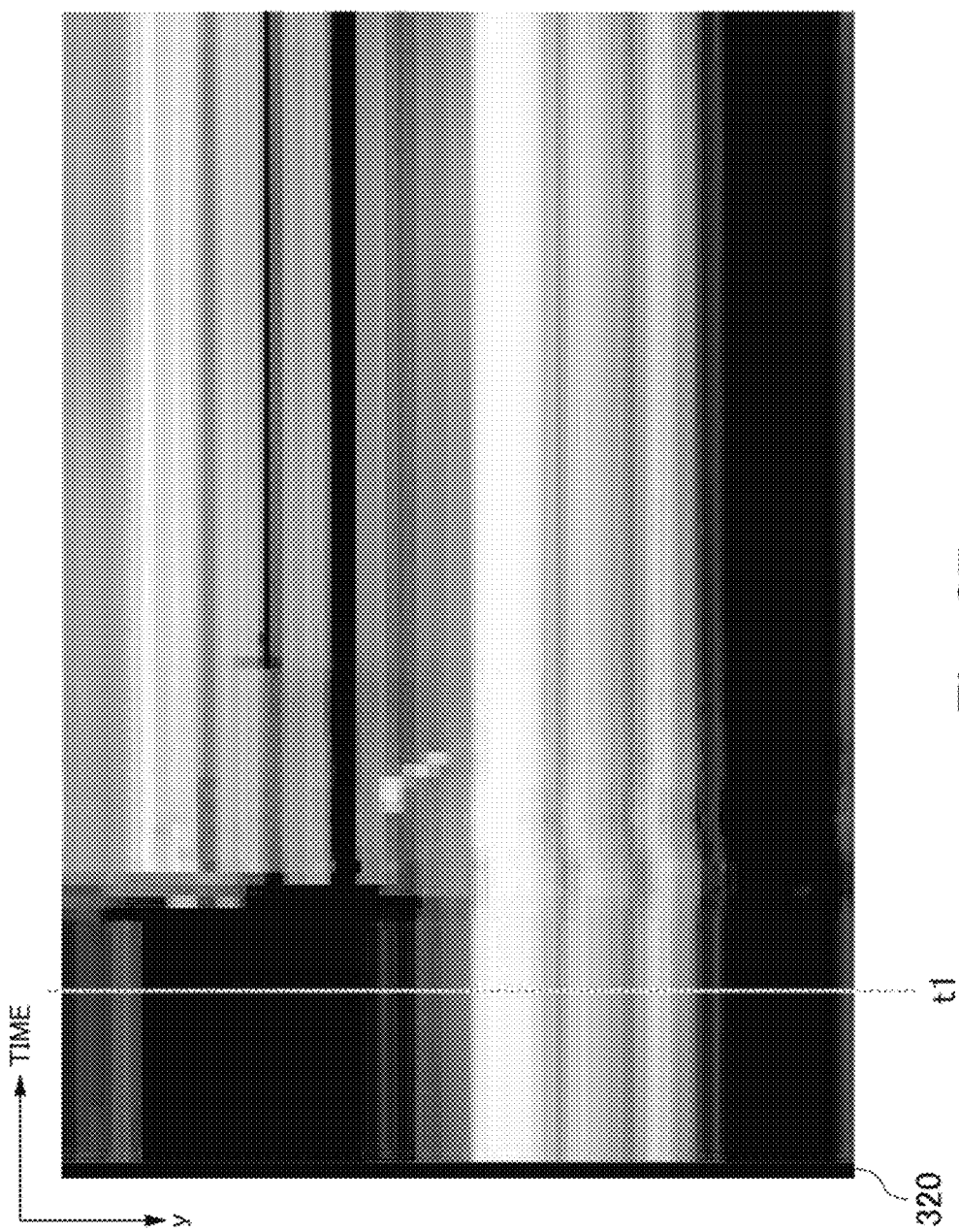
FIG. 27 is a diagram illustrating an example of change in a pixel value of a pixel group of an original image in the fifth embodiment.
Figure 28:
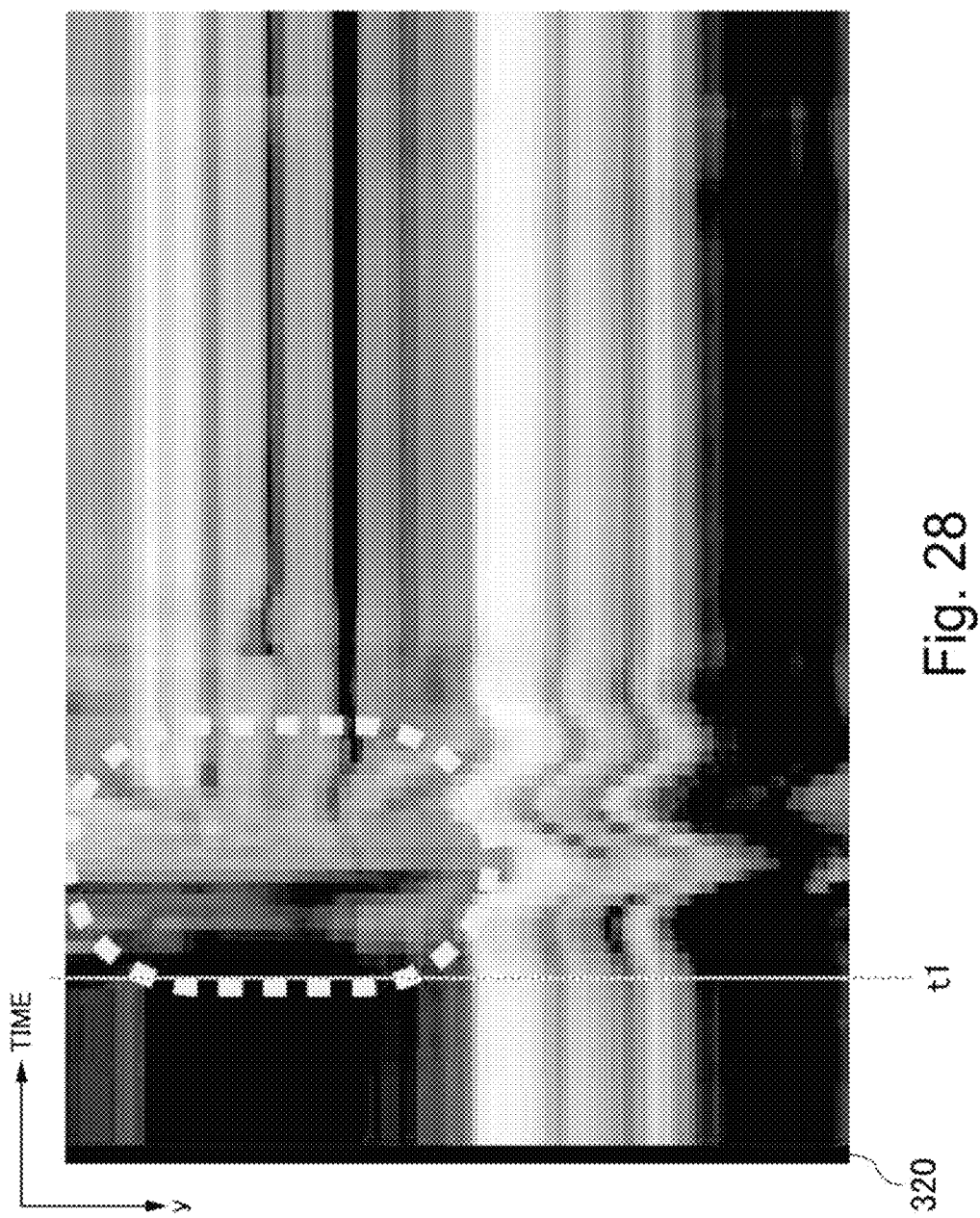
FIG. 28 is a diagram illustrating an example of pixel values of a pixel group in which an amount of motion change has been adjusted based on an acceleration method in the fifth embodiment.
Figure 29:
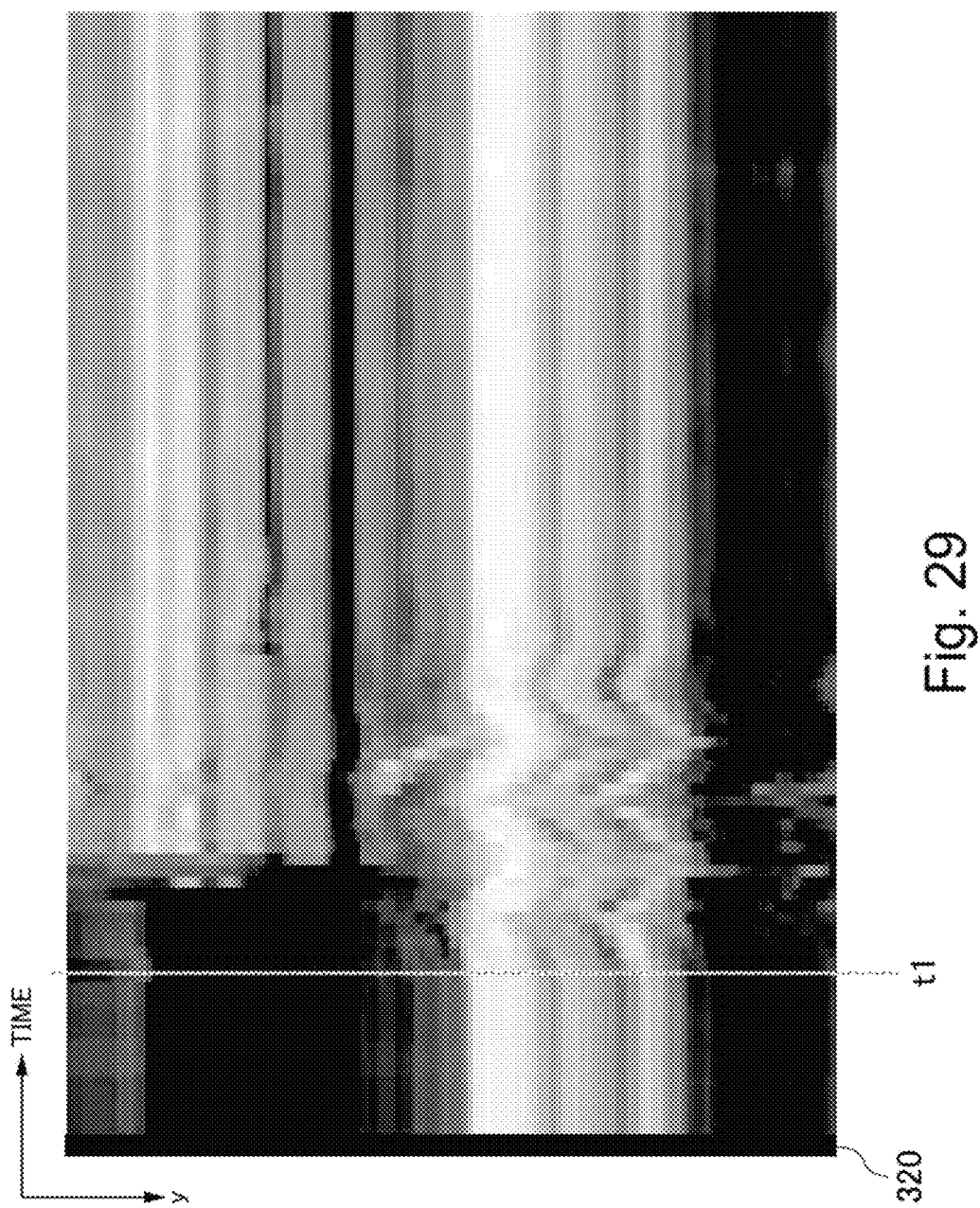
FIG. 29 is a diagram illustrating an example of pixel values of a pixel group in which an amount of motion change has been adjusted based on the jerk method in the fifth embodiment.

FIGS. 27, 28 and 29 illustrate images for comparison with FIG. 30. A horizontal axis indicates time. A vertical axis indicates each pixel value of the pixel group 320 in the frame of the moving image illustrated in FIG. 26.

FIG. 27 is a diagram illustrating an example of change in the pixel value of the pixel group 320 of the original image. In FIG. 27, an amount of change in minute motion change is not adjusted. Thus, the amount of change in each pixel value (motion change) of the pixel group 320 is small before and after time "t1" when the stump and the ax collide.

FIG. 28 is a diagram illustrating an example of a pixel value of the pixel group 320 in which the amount of motion change has been adjusted based on the acceleration method. In FIG. 28, the amount of motion change is adjusted based on the acceleration method, and the random noise is magnified based on an acceleration. Thus, the amount of change in the pixel value (motion change) is large after time "t1" when the stump and the ax collide (a region surrounded by a broken line). In this case, quality of the moving image deteriorates due to the magnified (emphasized) random noise.

FIG. 29 is a diagram illustrating an example of a pixel value of the pixel group 320 in which the amount of motion change has been adjusted based on a jerk method. In FIG. 29, the amount of motion change is magnified based on the jerk method. Thus, the amount of change in the pixel value (motion change) is large after time "t1" when the stump and the ax collide.

FIG. 30 is a diagram illustrating an example of the pixel value of the pixel group 320 in which the amount of motion change has been adjusted based on the variance value of the direction change per unit time. In FIG. 30, the amount of motion change is magnified based on the variance value. Thus, the amount of change in the pixel value (motion change) is large after time "t1" when the stump and the ax collide.

As described above, the image processing apparatus 1d of the fifth embodiment includes the change detection unit 4d and the reliability estimation unit 5d. The change detection unit 4d may execute the process to be executed by the decomposition conversion unit 30d instead of the decomposition conversion unit 30d. The change detection unit 4d detects a direction change that is a temporal fluctuation in a plausible direction orthogonal to an edge determined for each pixel in an edge image indicating a high frequency component in an image that is an image processing target and a phase change that is a temporal fluctuation of the phase of the high frequency component according to the direction change (a plausible direction). The change detection unit 4d may detect a minute phase change having a predetermined amount of change. The reliability estimation unit 5d estimates the reliability "maskS'''" indicating that the detected phase change is not a change caused by noise based on the variance value of the direction change per unit time. The reliability estimation unit 5d may estimate the reliability "mask'''" based on the variance value of the direction change per unit time.

This makes it possible to reduce the adjustment of the random noise mixed in the moving image when the image processing apparatus adjusts the amount of minute motion change of the moving image.

The reliability estimation unit 5d of the fifth embodiment may estimate the reliability of the detected phase change based on the variance value of the direction change in the pixel showing the detected phase change. The reliability becomes higher when the variance value of the direction change becomes smaller. The reliability estimation unit 5d may estimate the reliability for each pixel based on the phase change in the region including the pixels of the edge image.

The image processing apparatus according to the fifth embodiment may be configured to execute the process of adjusting the amount of minute color or luminance change, which is executed by the image processing apparatus 1 according to the first embodiment, and a process of adjusting a specific minute motion change of the subject, which has been described in the fifth embodiment, in parallel. FIG. 31 illustrates a configuration in the case of such a configuration. FIG. 31 is a diagram illustrating a configuration example of the image processing apparatus 1dd according to the fifth embodiment. The image processing apparatus 1dd includes an image input unit 2dd, a decomposition conversion unit 30dd, a change detection unit 4dd, a reliability estimation unit 5dd, a multiplication unit 6dd, a change amount adjustment unit 7dd, and an image reconstruction unit 8dd, an image decomposition unit 3, a change detection unit 4, a reliability estimation unit 5, a multiplication unit 6, and a change amount adjustment unit 7.

The image processing apparatus 1dd executes the first image processing and the second image processing in parallel. The image processing apparatus 1dd executes the first image processing for the moving image to emphasize or attenuate minute color or luminance change of the subject. In the first image processing executed by the image processing apparatus 1dd, the image input unit 2dd, the image decomposition unit 3, the change detection unit 4, the reliability estimation unit 5, the multiplication unit 6, the change amount adjustment unit 7, and the image reconstruction unit 8dd execute the same processing as those of the respective functional units of the image processing apparatus 1 in the first embodiment.

The image processing apparatus 1dd executes the second image processing for the moving image to emphasize or attenuate the minute motion change of the subject. In the second image processing executed by the image processing apparatus 1dd, the image input unit 2dd, the decomposition conversion unit 30dd, the change detection unit 4dd, the reliability estimation unit 5dd, the multiplication unit 6dd, the change amount adjustment unit 7dd, and the image reconstruction unit 8dd execute the same processing as those of the functional units having the same names illustrated in FIG. 23.

The image reconstruction unit 8dd acquires multiple images having different resolutions from the change amount adjustment unit 7dd. The image reconstruction unit 8dd combines the multiple images having different resolutions to reconstruct an original-resolution luminance image. The image reconstruction unit 8dd may acquire an original-resolution color image from the image input unit 2dd. The image reconstruction unit 8dd may combine the reconstructed original-resolution luminance image with the original-resolution color image.

The image reconstruction unit 8dd acquires the original-resolution image in which the color or luminance change has been emphasized from the change amount adjustment unit 7. The image reconstruction unit 8dd combines the original-resolution image in which the color or luminance change has been emphasized with the reconstructed original-resolution luminance image. For example, the image reconstruction unit 8dd generates an average image of the original-resolution image in which the color or luminance change has been emphasized and the reconstructed original-resolution luminance image.

The above embodiments may be combined with each other.

The embodiments of the present disclosure have been described above in detail with reference to the drawings. However, specific configurations are not limited to those embodiments, and include any design or the like within the scope not departing from the gist of the present disclosure.

INDUSTRIAL APPLICABILITY

The present disclosure is applicable to the image processing apparatus.

REFERENCE SIGNS LIST 1, 1a, 1aa, 1b, 1bb, 1c, 1cc, 1d, 1dd Image processing apparatus
2, 2a, 2aa, 2b, 2bb, 2c, 2cc, 2d, 2dd Image input unit
3 Image decomposition unit
4, 4a, 4aa, 4b, 4bb, 4c, 4cc, 4d, 4dd Change detection unit
5, 5a, 5aa, 5b, 5bb, 5c, 51c, 5cc, 51cc, 5d, 5dd Reliability estimation unit
6, 6a, 6aa, 6b, 6bb, 6c, 6cc, 6d, 6dd Multiplication unit
7, 7a, 7aa, 7b, 7bb, 7c, 7cc, 7d, 7dd Change amount adjustment unit
8, 8a, 8aa, 8b, 8bb, 8c, 8cc, 8d, 8dd Image reconstruction unit
30a, 30aa, 30b, 30bb, 30c, 30cc, 30d, 30dd Decomposition conversion unit
31d Image conversion unit

The invention claimed is:

1. An image processing apparatus comprising:
a change detector configured to receive a color or luminance image and, for each pixel of the color or luminance image, detect color or luminance change for each of different resolutions among changes in color or luminance in the color or luminance image;
a reliability estimator configured to, for each pixel of the color or luminance image, estimate reliability of the detected color or luminance change based on temporal color or luminance change in the color or luminance image,
wherein the reliability estimator obtains a feature quantity that indicates whether a diffusion result of the color or luminance change in a time series in the color or luminance image indicates anisotropy or not, and estimates the reliability using the feature quantity obtained,
a multiplier configured to, for each pixel of the color or luminance image, multiply the detected color or luminance change for a given pixel by the reliability of the given pixel; and
a change amount adjuster configured to execute video magnification by adjusting an amount of color or luminance change in the color or luminance image using output from the multiplier, wherein the reliability has a greater value when the diffusion result shows anisotropy,
wherein each of the change detector, and the reliability estimator, and the change amount adjuster is implemented by:
i) computer executable instructions executed by at least one processor,
ii) at least one circuitry or
iii) a combination of computer executable instructions executed by at least one processor and at least one circuitry.

2. An image processing method executed by an image processing apparatus, the image processing method comprising:
detecting color or luminance change for each of different resolutions among changes in color or luminance in a color or luminance image;

obtaining a feature quantity that indicates whether a diffusion result of a color or luminance change in a time series in the color or luminance image indicates anisotropy or not;

estimating, for each pixel of the color or luminance image, reliability of the detected color or luminance change using the feature quantity obtained wherein the reliability has a greater value when the diffusion result shows anisotropy;

for each pixel of the color or luminance image, multiplying the detected color or luminance change for a given pixel by the reliability for the given pixel to yield a multiplication result; and performing video magnification by adjusting an amount of color or luminance change in the color or luminance image using the multiplication result.

3. A non-transitory storage medium that stores a program for making a computer perform processes, the processes comprising:

detecting color or luminance change for each of different resolutions among changes in color or luminance in a color or luminance image;

obtaining a feature quantity that indicates whether a diffusion result of a color or luminance change in a time series in the color luminance image indicates anisotropy or not;

estimating, for each pixel of the color or luminance image, reliability of the detected color or luminance change using the feature quantity obtained wherein the reliability has a greater value when the diffusion result shows anisotropy for each pixel of the color or luminance image, multiplying the detected color or luminance change for a given pixel by the reliability for the given pixel to yield a multiplication result; and performing video magnification by adjusting an amount of color or luminance change in the color or luminance image using the multiplication result.

* * * * *